United States Patent
Dosaka et al.

[11] Patent Number: 5,897,968
[45] Date of Patent: Apr. 27, 1999

[54] SLIDE SURFACE CONSTRUCTION AND PROCESS FOR PRODUCING THE SAME

[75] Inventors: Kenji Dosaka; Yusuke Toyoda; Masamune Tabata; Hiroshi Koinuma, all of Saitama, Japan

[73] Assignee: Honda Giken Kogyo Kabushiki Kaisha, Tokyo, Japan

[21] Appl. No.: 08/616,874

[22] Filed: Mar. 15, 1996

Related U.S. Application Data

[63] Continuation-in-part of application No. 08/236,901, Apr. 29, 1994, Pat. No. 5,503,942.

[30] Foreign Application Priority Data

| Mar. 31, 1995 | [JP] | Japan | 7-099593 |
| Mar. 31, 1995 | [JP] | Japan | 7-099604 |
| Mar. 31, 1995 | [JP] | Japan | 7-099754 |

[51] Int. Cl.$^6$ .................. B32B 15/18; F16C 33/12
[52] U.S. Cl. .................. 428/687; 428/681; 428/615; 428/935; 148/320; 384/912
[58] Field of Search .................. 428/544, 687, 428/681, 935, 653, 680, 615; 384/912, 913; 148/320, 319

[56] References Cited

U.S. PATENT DOCUMENTS

| 5,322,743 | 6/1994 | Fujisawa et al. | 428/687 |
| 5,324,596 | 6/1994 | Fujisawa et al. | 428/687 |
| 5,401,585 | 3/1995 | Fujisawa et al. | 428/653 |
| 5,427,633 | 6/1995 | Fujisawa et al. | 148/320 |
| 5,445,684 | 8/1995 | Gunji et al. | 148/320 |
| 5,503,942 | 4/1996 | Tabata | 428/687 |
| 5,547,771 | 8/1996 | Gunji et al. | 428/687 |

FOREIGN PATENT DOCUMENTS

| 670 402 | 1/1939 | Germany. | |
| 6174089 | 6/1994 | Japan. | |
| 2257759 | 1/1993 | United Kingdom | 33/12 |
| 2273748 | 6/1994 | United Kingdom | 33/12 |

OTHER PUBLICATIONS

Partial Translation of German Pat. No. 670,402 of Jan. 1939.
Search Report of GB Patent Office of May 24, 1996.

*Primary Examiner*—John J. Zimmerman
*Assistant Examiner*—Michael LaVilla
*Attorney, Agent, or Firm*—Lyon & Lyon LLP

[57] ABSTRACT

A slide surface construction of a slide bearing is formed of an aggregate of two different metal crystals. The sliding condition of a first region of the slide bearing is more severe than that of a second region. The (2hhh) oriented metal crystals having a body-centered cubic structure with their (2hhh) planes (by Miller indices) oriented toward a slide surface exist in the first region. The content $S_{2hhh}$ of the (2hhh) oriented metal crystals is set in a range of $S_{2hhh} \geq 20\%$. These crystals have a high hardness and are in the form of fish-like metal crystals in the slide surface and hence, an aggregate of these metal crystals has a good oil retention. The (hhh) oriented metal crystals having a body-centered cubic structure with their (hhh) planes (by Miller indices) oriented toward a slide surface exist in the second region. The content $S_{hhh}$ of the (hhh) oriented metal crystals is set in a range of $S_{hhh} \geq 40\%$. These crystals are in the form of hexagonal pyramid-shaped metal crystals and hence, an aggregate of these metal crystals has a good oil retention. Thus, it is possible for the two regions with different sliding conditions to exhibit an excellent sliding characteristic.

8 Claims, 50 Drawing Sheets

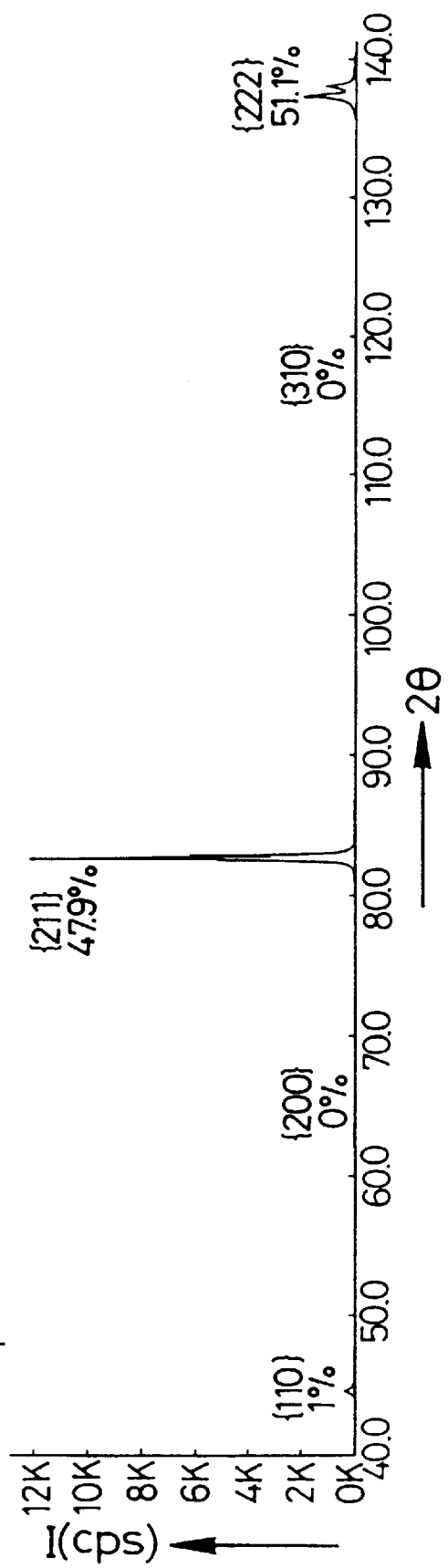

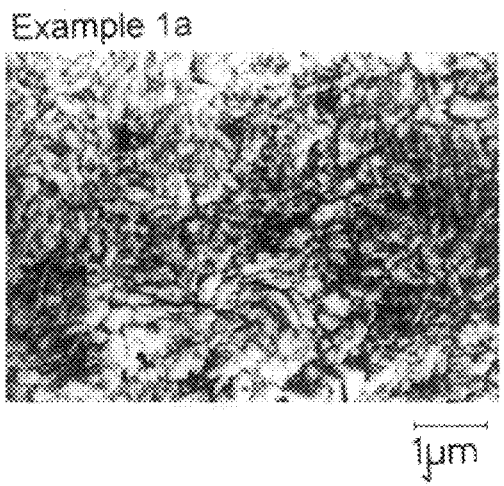
FIG. 13 Example 1a
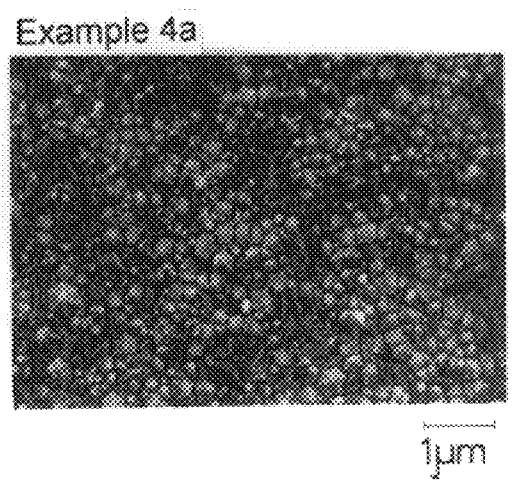
FIG. 14 Example 4a
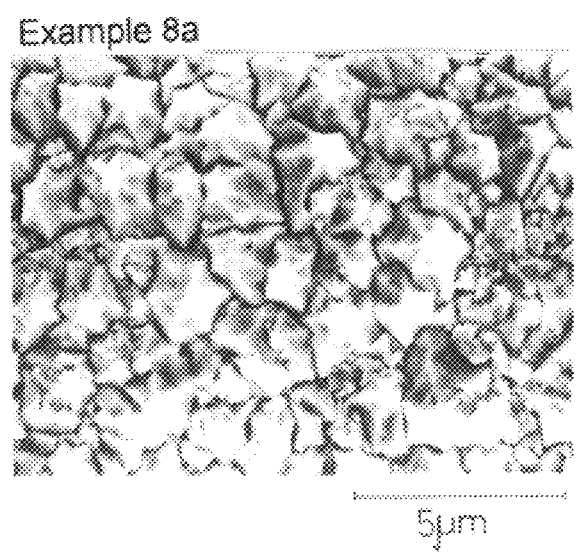
FIG. 15 Example 8a

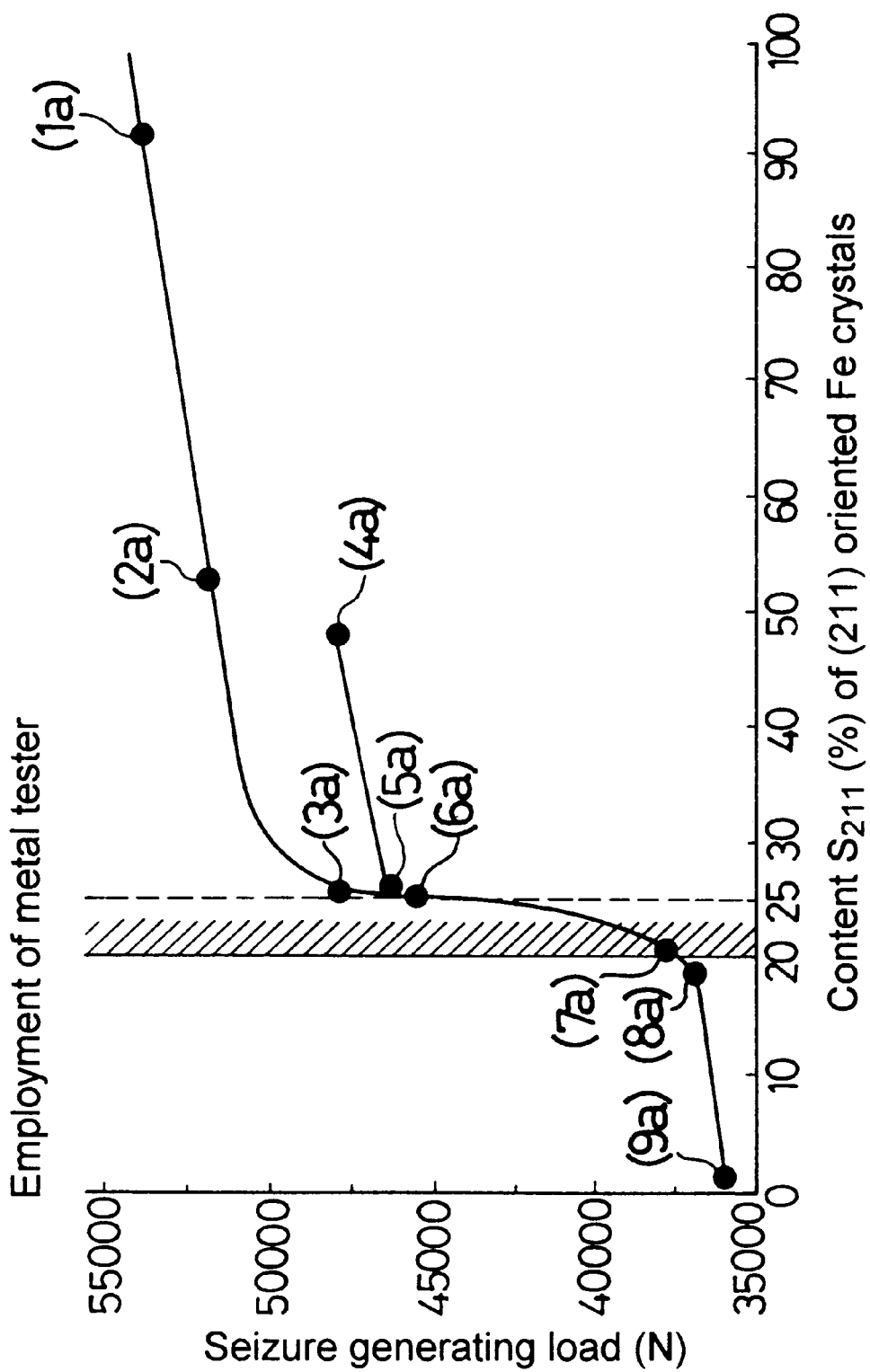

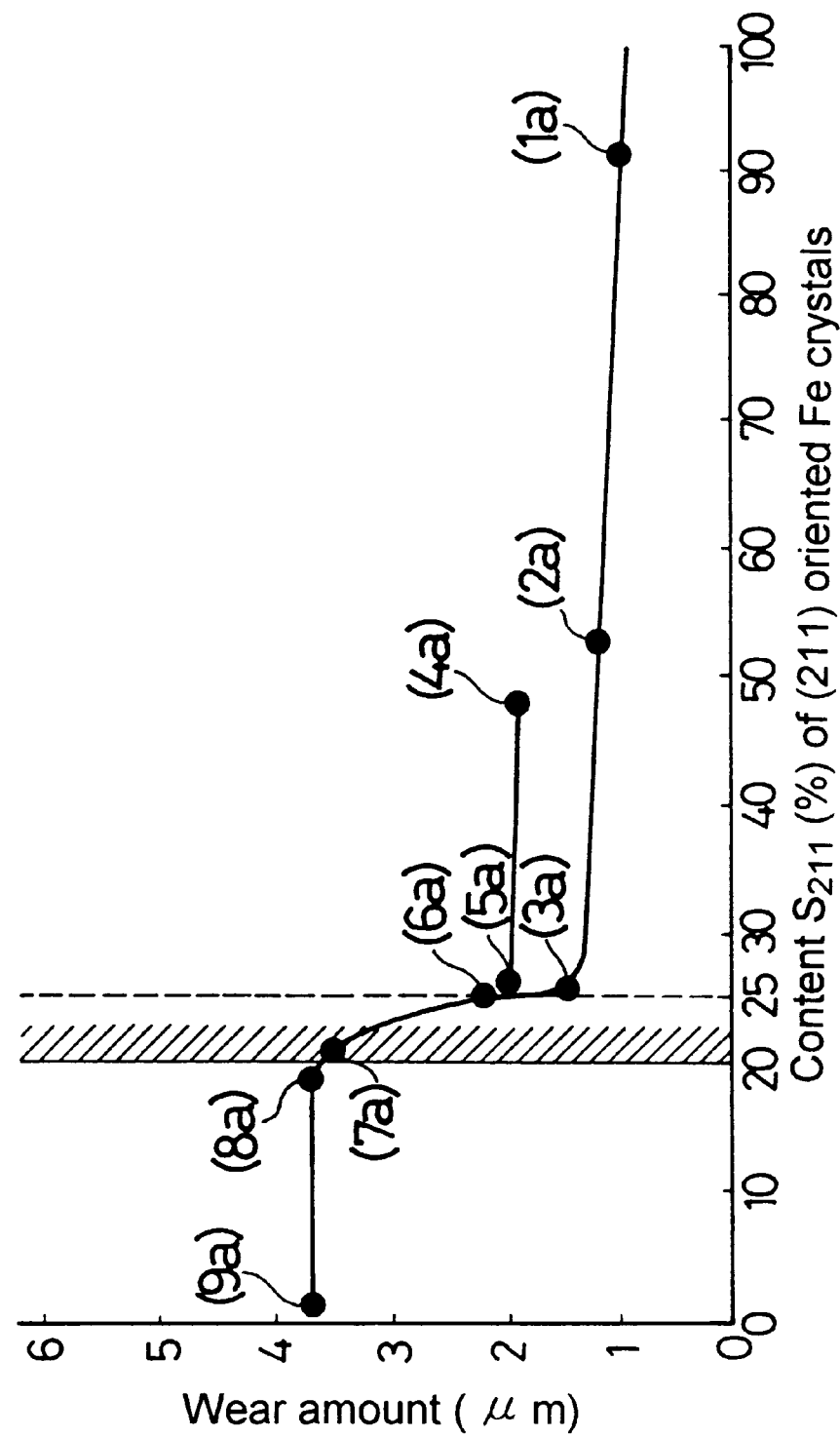

Example 1b

5μm

Example 5b

1μm

Example 11

10μm

Example 15

10μm

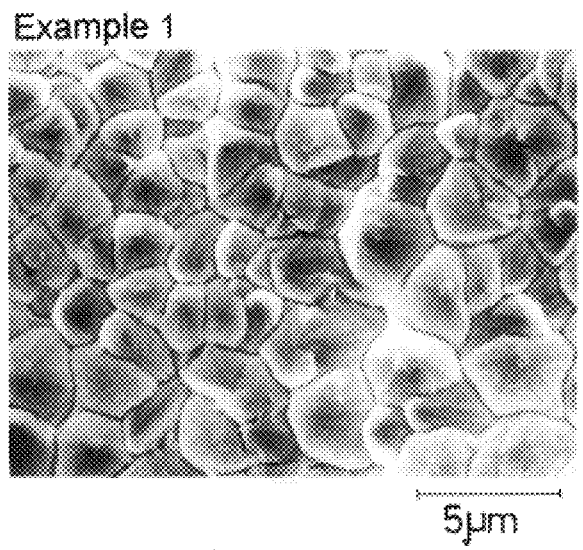
FIG.48A Example 1 5μm
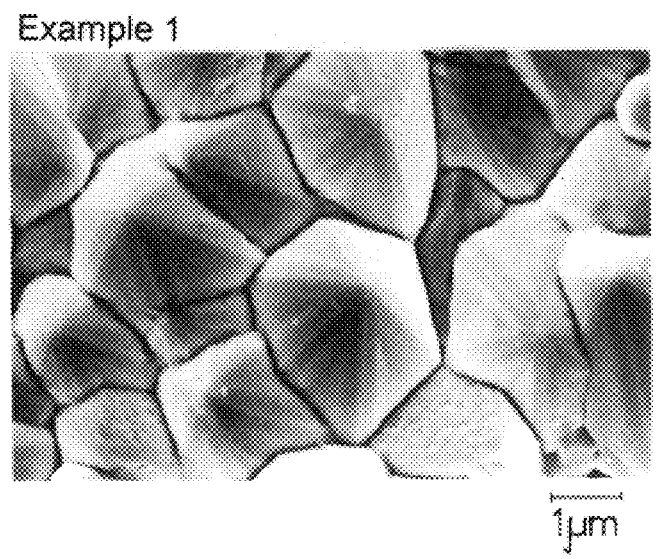
FIG.48B Example 1 1μm
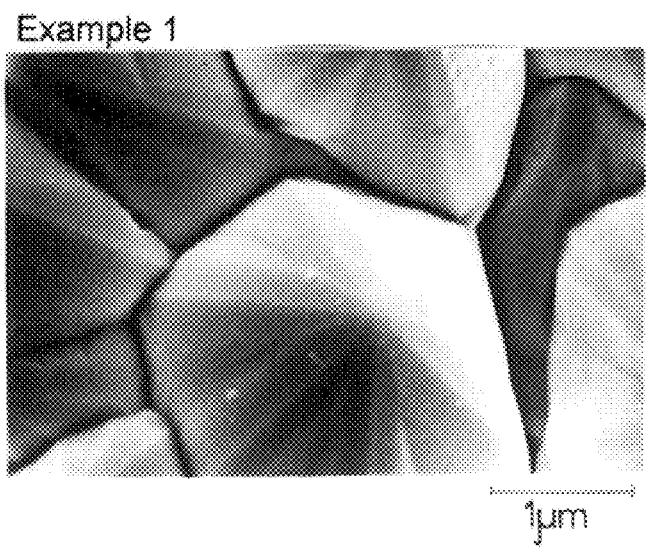
FIG.48C Example 1 1μm Example 3

Example 4

Example 8

Example 1a

3μm

SLIDE SURFACE CONSTRUCTION AND PROCESS FOR PRODUCING THE SAME

This is a Continuation-In-Part of Ser. No. 08/236,901, filed Apr. 29, 1994, issued as U.S. Pat. No. 5,503,942 on Apr. 2, 1996.

BACKGROUND OF THE INVENTION

1. Field of the Invention

The present invention relates to a slide surface construction and particularly, to a slide surface construction formed of an aggregate of metal crystals and a process for producing the same.

2. Description of the Related Art

There are conventionally known slide surface constructions. Typical examples of such known slide surface constructions are: 1) a Pb alloy plated layer provided on the inner peripheral surface of a rolled-steel back plate of a slide bearing for an internal combustion engine, which is opposed to a rotary shaft, for the purpose of enhancing the seizure resistance; 2) various plated layers provided on an inner peripheral surface of a cylinder sleeve made of a cast iron in a combination of a piston made of an aluminum alloy and such cylinder sleeve in an internal combustion engine for the purpose of enhancing the slide characteristic; and 3) an Fe-plated layer provided on outer peripheral surfaces of a land portion and a skirt portion of a piston body made of an aluminum alloy in a piston for an internal combustion engine for purpose of enhancing the wear resistance.

However, the above known slide surface constructions suffer from a problem that under existing circumstances where speed and output of the internal combustion engine have tended to increase, the known slide surface construction is not sufficient in oil retaining property, namely, oil retention and poor in seizure resistance due to a relatively smooth slide surface thereof.

There is also a conventionally known slide surface construction which is formed on an engagement surface of a gear in a gearing device by roughening the engagement surface by machining or the like, and then applying a solid lubricating agent such as molybdenum disulfide, graphite and the like, or a semi-solid lubricating agent such as grease onto the roughened engagement surface, so that latter retains the lubricating agent.

However, the known engagement surface is simple in view of microstructure and has a problem that it is low in solid lubricating agent retention and the like and, as a result, is poor in seizure resistance under a high load condition.

Therefore, the present assignee has previously developed a slide surface construction which is formed on an inner peripheral surface of a backing plate, an inner peripheral surface of a cylinder sleeve, an outer peripheral surface of a piston body, an engagement surface of a gear and the like, and which includes a large number of pyramid-shaped metal crystals in the slide surface thereof (see Japanese Patent Application Laid-open No.174089/94).

If the slide surface construction is formed in the above manner, adjacent pyramid-shaped metal crystals assume mutually biting states and hence, the slide surface takes on an intricate aspect comprising a large number of fine crests, a large number of fine valleys formed between the crests, and a large number of swamps formed due to the mutual biting of the crests. Therefore, the slide surface construction is improved in oil retention and in solid lubricating agent retention and the like and thus, has an enhanced seizure resistance.

In the above-described slide bearing, however, the following situation has been encountered: when two regions suitable under different sliding conditions are produced in the slide surface construction, even if one of the two regions exhibits a good sliding characteristic under a severe sliding environment, it cannot be expected that the other region exhibits such a good sliding characteristic, because the slide characteristic of the slide surface construction is substantially constant over the entire region thereof.

As for the gearing device, it has been ascertained that in order to accommodate the severe sliding environment, for example, where a sudden and excessively large variation in load occurs in the gear, it is necessary to further enhance the solid lubricating agent retention of the slide surface construction.

As for the cylinder sleeve, it has been ascertained that when the viscosity of the oil is high, for example, at a lower temperature, the flow of the oil lacks a smoothness, resulting in a relatively high dynamic friction coefficient $\mu$ and for this reason, the friction loss tends to be increased.

Further, as for the piston, it has been also ascertained that in order to accommodate the severe sliding environment, it is necessary to further enhance the oil retention of the slide surface construction to reduce the solid contact to the utmost, thereby further enhancing the seizure resistance, and to reduce the dynamic friction coefficient $\mu$ to further enhance the wear resistance.

SUMMARY OF THE INVENTION

It is an object of the present invention to provide a slide surface construction of the above-described type, wherein it is possible for two regions suitable under different sliding conditions to exhibit excellent sliding characteristics, respectively.

To achieve the above object, according to the present invention, there is provided a slide surface construction formed of an aggregate of metal crystals, comprising first and second regions suitable under different sliding conditions, the first region including (2hhh) oriented metal crystals existing therein, which have a body-centered cubic structure with their (2hhh) planes (by Miller indices) oriented toward a slide surface, the content $S_{2hhh}$ of the (2hhh) oriented metal crystals being set in a range of $20\% \leq S_{2hhh} \leq 100\%$, and the second region including (hhh) oriented metal crystals existing therein, which have a body-centered cubic structure with their (hhh) planes (by Miller indices) oriented toward a slide surface, the content $S_{hhh}$ of the (hhh) oriented metal crystals being set in a range of $40\% \leq S_{hhh} \leq 100\%$.

In the first region, the (2hhh) oriented metal crystals are grown into a columnar shape, with their tip ends being formed of fish-shaped metal crystals such as sardine-shaped metal crystals in the slide surface. If the content of the (2hhh) oriented metal crystals is set in the above-described range, the slide surface takes on a very intricate aspect due to the large number of fish-shaped metal crystals existing in the slide surface and therefore, it has a good oil retention. Moreover, the (2hhh) planes of the (2hhh) oriented metal crystals form a secondary slide surface and hence, they have a high hardness and a high strength.

The second region is most suitable for use in a site of a severe sliding condition.

On the other hand, in the second region, the (hhh) oriented metal crystals are grown into a columnar shape, with their tip ends being formed of hexagonal or trigonal pyramid-shaped metal crystals in the slide surface. If the content of the (hhh) oriented metal crystals is set in the above-described range, the slide surface takes on a very intricate aspect due to the large number of hexagonal or trigonal pyramid-shaped metal crystals existing in the slide surface and therefore, it has a good oil retention. However, the (hhh) oriented metal crystals has a low hardness, as compared with the (2hhh) oriented metal crystals.

The first region is most suitable for use in a site of a sliding condition in which a seizure resistance is preferentially required and which is more moderate than that of the first region.

In this way, according to the present invention, it is possible to provide a slide surface construction in which the two region suitable under different sliding conditions can exhibit excellent slide characteristics, respectively by the fact that the slide surface construction has a specified structure as described above.

However, if the content $S_{2hhh}$ is lower than 20%, or if the content $S_{hhh}$ is lower than 40%, the above-described function and effect cannot be provided.

It is another object of the present invention to provide a slide surface construction of the above-described type, which has a further enhance retention to the slide lubricating agent and the like.

To achieve the above object, according to the present invention, there is provided a slide surface construction formed of an aggregate of metal crystals, wherein the area rate A of pyramid-shaped metal crystals in a slide surface is in a range of $40\% \leq A \leq 100\%$, at least some of the pyramid-shaped metal crystals being heteromorphic pyramid-shaped metal crystals having at least one notched recess in at least one ridgeline section, the pseudo-area rate B of the heteromorphic pyramid-shaped metal crystals in the slide surface being in a range of $20\% \leq B \leq 100\%$.

If the area rate A of pyramid-shaped metal crystals in a slide surface is set in the above-described range, the adjacent pyramid-shaped metal crystals assume mutually biting states and hence, the slide surface takes on an intricate aspect comprising a large number of fine crests, a large number of fine valleys formed between the crests, and a large number of fine swamps formed due to the mutual biting of the crests. Thus, the slide surface construction exhibits a good retention to the slide and semi-solid lubricating agents. Moreover, since the pseudo-area rate B of the different pyramid-shaped metal crystals is set in the above-described range, the notched recess in the metal crystal exhibits an anchoring effect to the solid and semi-solid lubricating agents, thereby doubling the retention.

In the slide surface construction, even if it is placed in a severe sliding environment, the lubricant retention of the slide surface construction is maintained at a high degree under lubrication, while the dispersion of a sliding load is provided by the large number of fine pyramid-shaped metal crystals under non-lubrication. Thus, the slide surface construction exhibits an excellent seizure resistance both under lubrication and under non-lubrication.

In this way, according to the present invention, it is possible to provide a slide surface construction which has a good retention of the solid and semi-solid lubricating agents and exhibits an excellent sliding characteristic under a severe sliding environment, for example, where a sudden and excessively large variation in load occurs, by the fact that the slide surface construction has a specified structure as described above.

However, if the area rate A of the pyramid-shaped metal crystals is lower than 40%, the slide surface tends to be simplified and hence, such a range is not desirable. If the pseudo-area rate B of the different pyramid-shaped metal crystals is lower than 20%, the anchoring effect cannot be expected.

It is a further object of the present invention to provide a process for producing a slide surface construction of the above-described type, which is capable of producing a slide surface construction having a further enhanced retention to the solid lubricating agent and the like.

To achieve the above object, according to the present invention, there is provided a process for producing a slide surface construction formed of an aggregate of metal crystals by an electrolytic plating treatment utilizing a pulse current process, wherein the electrolytic plating treatment is divided into a plurality of steps, an energization stopping step being interposed between a step of the last time and a step of the current time, the time $T_2$ required for the energization stopping step and the minimum electric current maintaining time $T_1$ in the step of the last time being in a relationship of $T_2 \geq 100\, T_1$, and the average cathode electric-current density $CD_2$ in the step of the current time and the average cathode electric-current density $CD_1$ in the step of the last time being in a relationship of $CD_2 \geq 1.2\, CD_1$.

With the above producing process, a slide surface construction including pyramid-shaped metal crystals and different pyramid-shaped metal crystals in the slide surface can be easily mass-produced. However, if $T_2 < 100\, T_1$, or if $CD_2 < 1.2\, CD_1$, the pseudo-area rate. B of the different pyramid-shaped metal crystals is lower than 20%.

Further, it is another object of the present invention to provide a slide surface construction of the above-described type, wherein the friction loss can be reduced even when the oil has a high density.

To achieve the above object, according to the present invention, there is provided a slide surface construction formed of an aggregate of metal crystals, wherein the area rate A of rounded pyramid-shaped metal crystals in a slide surface is in a range of $40\% \leq A \leq 100\%$, each of the rounded pyramid-shaped metal crystals having a ridgeline which assumes a convex arcuate shape, a slope-correspondence area (which means an area corresponding to a slope) being defined between the adjacent ridgelines and comprising two band-like regions each of which is one of slopes forming each ridgeline, and a V groove-like region connected to the two band-like regions, the opening width of the V groove-like region being gradually reduced from a skirt portion toward an apex.

If the area rate A of the rounded pyramid-shaped metal crystals is set in such range, the adjacent rounded pyramid-shaped metal crystals assumes mutually biting states. Therefore, the slide surface takes on an intricate aspect comprising a large number of fine crests, a large number of fine valleys formed between the crests, and a large number of fine swamps formed due to the mutual biting of the crests.

In this case, if each of the ridgelines of the pyramid-shaped metal crystal is rectilinear and the apex of the pyramid-shaped metal crystal is pointed, and if the slope-correspondence area between the adjacent ridgelines is formed into a relatively deep V shape such that the opening width is gradually reduced from the skirt potion toward the apex, namely, if the pyramid-shaped metal crystal is angular, the following problem is encountered: when the viscosity of an oil is high at a low temperature, the flow of the oil lacks a smoothness, because the angular pyramid-shaped metal crystals perform an occluding effect.

In contrast, if the rounded pyramid-shaped metal crystals as described above exist in the slide surface, the flow resistance of the oil having a high viscosity is reduced on the slide surface and therefore, it is possible for the oil to flow smoothly. Thus, it is possible to reduce the shear resistance of an oil film formed on the slide surface reduce the friction loss.

Since the slide surface takes on the intricate aspect, as described above, the slide surface construction has a good oil retention, substantially irrespective of the viscosity of the oil. Thus, the slide surface construction exhibits an excellent seizure resistance, even if it is placed in a severe sliding environment. On the other hand, even under non-lubrication, the dispersion of a sliding load is provided by the large number of fine rounded pyramid-shaped metal crystals and hence, the seizure resistance of the slide surface construction is relatively good.

If the area rate A of the rounded pyramid-shaped metal crystals is lower than 40%, the slide surface tends to be simplified and hence, such an area rate A lower than 40% is undesirable.

It is a yet further object of the present invention to provide a slide surface construction of the above-described type, wherein the seizure resistance can be further enhanced and the dynamic friction coefficient $\mu$ can be lowered to further enhance the wear resistance by further enhancing the oil retention to reduce the solid contact to the utmost.

To achieve the above object, according to the present invention, there is provided a slide surface construction formed of an aggregate of metal crystals, comprising a large number of truncated hexagonal pyramid-shaped metal crystals in a slide surface, the area rate A of the truncated hexagonal pyramid-shaped metal crystals being in a range of $40\% \leq A \leq 100\%$, a top face of each of the truncated hexagonal pyramid-shaped metal crystals comprising a plurality of flat face portions, with a step provided between adjacent ones of the flat face portions.

If the area rate A of the truncated hexagonal pyramid-shaped metal crystals in the slide surface is set in such range, a complicated valley extending at random is defined by the adjacent truncated hexagonal pyramid-shaped metal crystals and therefore, the slide surface takes on an intricate aspect. Moreover, the intricateness is doubled by the fact that the top face of each truncated hexagonal pyramid-shaped metal crystal comprises the plurality of flat face portions and the step is provided between the adjacent flat face portions. As a result, the flow resistance of the oil on the slide surface is remarkably increased.

Thus, it is possible to remarkably enhance the oil retention of the slide surface construction and hence, even in a severe sliding environment, the solid contact can be reduced to the utmost, causing the slide surface construction to exhibit an excellent seizure resistance. In addition, since the top face has the flat face portions, the dynamic friction coefficient $\mu$ can be lowered, causing the slide surface construction to exhibit an excellent wear resistance in the severe sliding environment.

Yet further, it is an object of the present invention to provide a process for producing a slide surface construction of the above-described type, by which the slide surface construction can be mass-produced.

To achieve the above object, according to the present invention, there is provided a process for producing a slide surface construction, comprising: a step for forming a deposit layer including a large number of pyramid-shaped metal crystals in a surface serving as a slide surface and having an area rate A of the pyramid-shaped metal crystals in the surface in a range of $40\% \leq A \leq 100\%$; a step for subjecting a surface of the deposit layer to a polishing to form the pyramid-shaped metal crystals into truncated pyramid-shaped metal crystals; and a step for subjecting the surface of the polished deposit layer to an etching to divide a top face of each of the truncated pyramid-shaped metal crystals into a plurality of flat face portions and to provide a step between the adjacent flat face portions.

With the above producing process, a slide surface construction as described above can be mass-produced.

The above and other objects, features and advantages of the following detailed description of preferred embodiments taken in conjunction with the accompanying drawings.

BRIEF DESCRIPTION OF THE DRAWINGS

FIG. 12 is an X-ray diffraction pattern for an example 4a of the first region of a slide surface;

FIG. 13 is a photomicrograph showing the crystal structure of the slide surface of the example 1a;

FIG. 14 is a photomicrograph showing the crystal structure of the slide surface of the example 4a;

FIG. 15 is a photomicrograph showing the crystal structure of the slide surface of an example 8a;

FIG. 16 is a graph illustrating the relationship between the content $S_{211}$ of {211} oriented Fe crystals and the seizure generating load;

FIG. 17 is a graph illustrating the relationship between the content $S_{211}$ of {211} oriented Fe crystals and the wear resistance;

FIG. 48A is a photomicrograph showing the crystal structure of the slide surface of the example 1;

FIG. 48B is an enlarged photomicrograph taken from FIG. 48A;

FIG. 48C is an enlarged photomicrograph taken from FIG. 48B;

DETAILED DESCRIPTION OF THE PREFERRED EMBODIMENTS

FIRST EMBODIMENT

Figure 1:
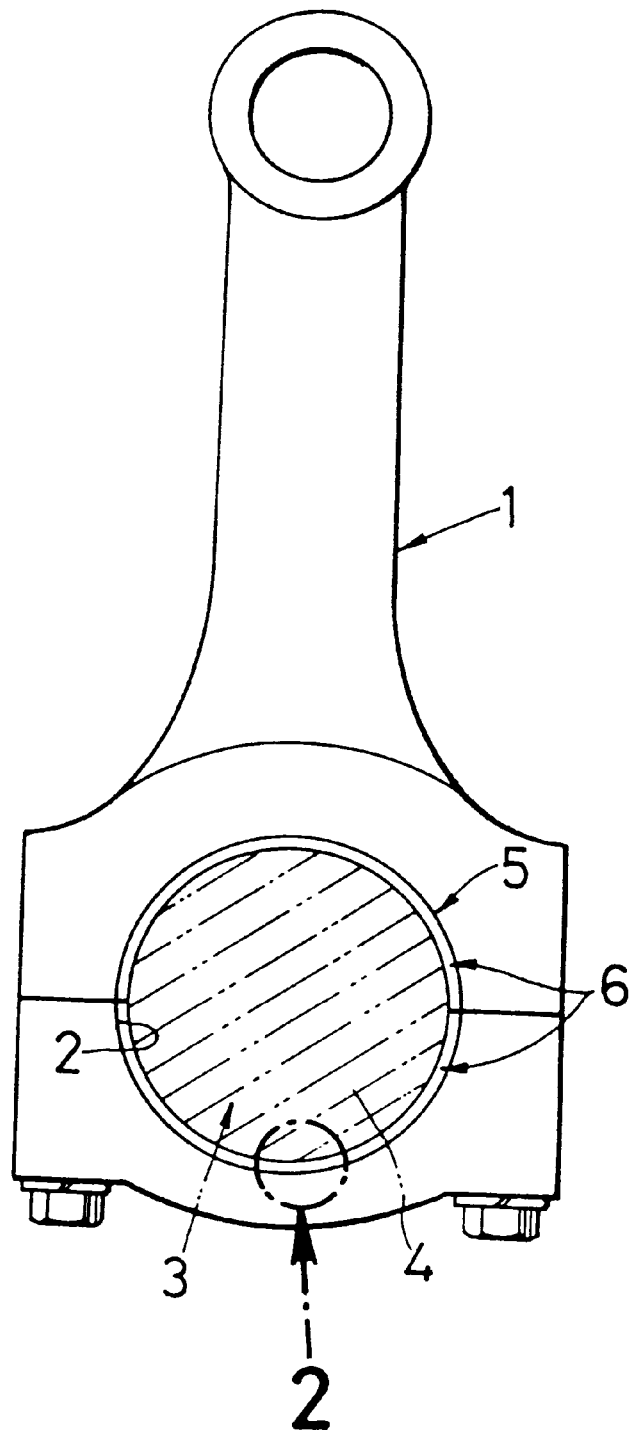
FIG. 1 is a front view of a connecting rod including a slide bearing.

Referring to FIG. 1, a slide bearing 5 is disposed between a larger end hole 2 in a connecting rod 1 for an internal combustion engine and a crankpin 4 of a crankshaft 3. The slide surface bearing 5 is formed of a pair of semi-annular halves 6 which have the same structure.

Figure 2:
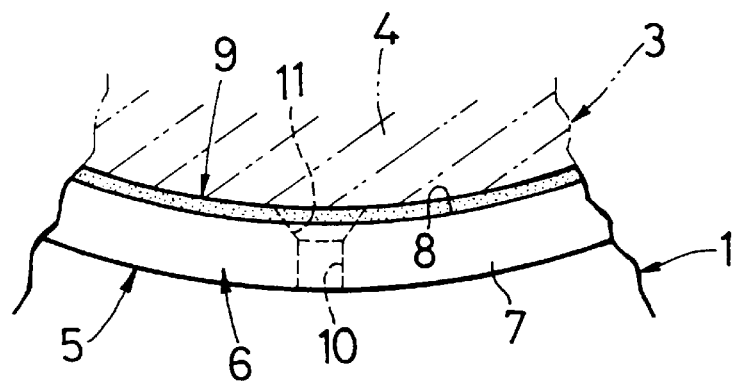
FIG. 2 is an enlarged view of a portion indicated by the arrow 2 in FIG. 1.

As shown in FIG. 2, in a backing plate 7 of each of the semi-annular halves 6, a lamellar slide surface construction 9 is formed on an inner peripheral surface opposed to the crankpin 4 by plating.

Figure 3:
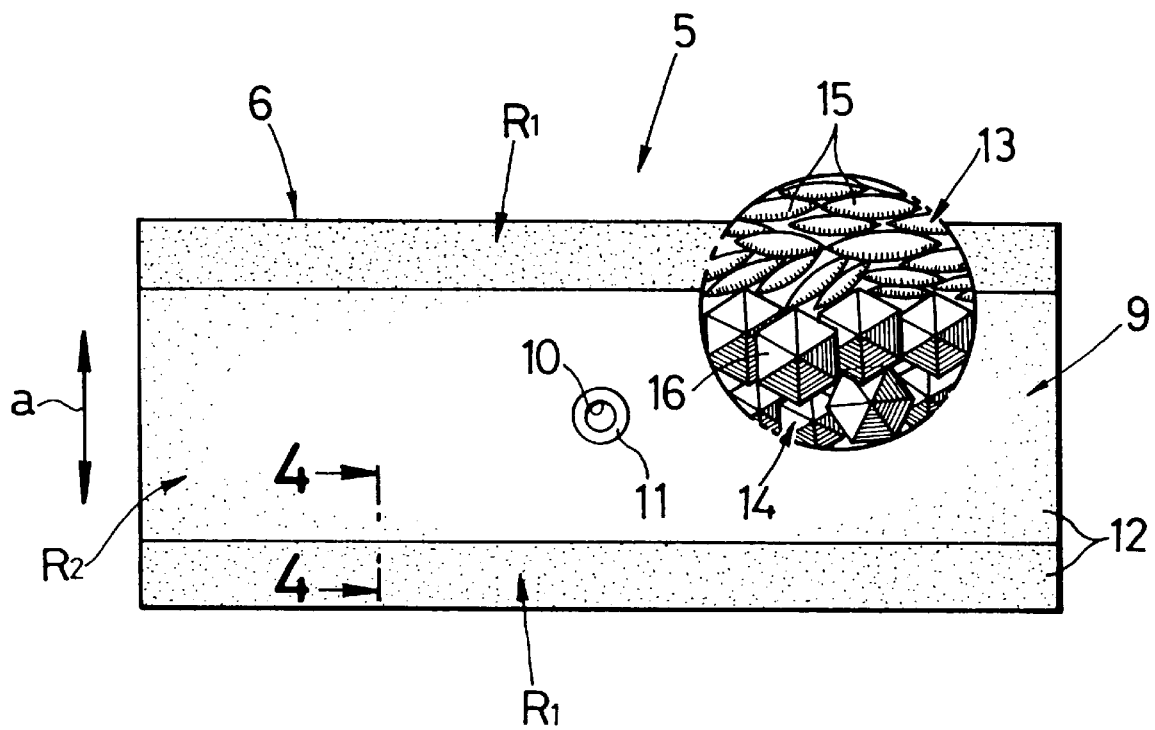
FIG. 3 is a developed view of a semi-annular half of the slide bearing.

FIG. 3 shows the developed semi-annular half 6 as flat. The slide surface construction 9 includes a pair of narrow band-shaped first regions $R_1$ extending over the entire length of opposite ends in an axial direction "a" of the crankpin, and a wider band-shaped second region $R_2$ located between the two first regions $R_1$. The first regions $R_1$ are placed under a sliding condition more severe than that under which the second region $R_2$ is placed, due to the flexing of the crankpin 4. As shown in FIGS. 2 and 3, an oil hole 10 is defined in a central portion of the semi-annular half 6. A chamfer 11 is provided in a portion of the oil hole 10 adjacent the slide surface construction 9.

Figure 4:
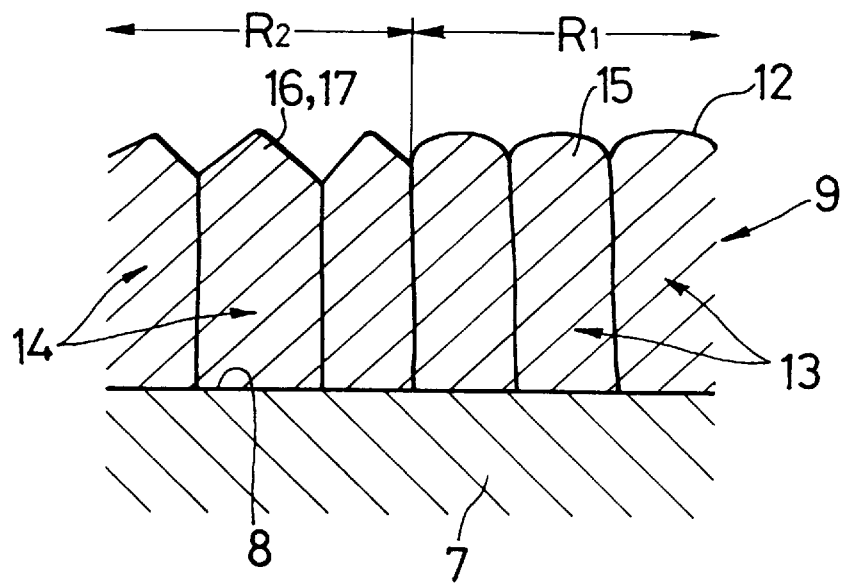
FIG. 4 is an enlarged sectional view taken along a line 4—4 in FIG. 3.
Figure 5:
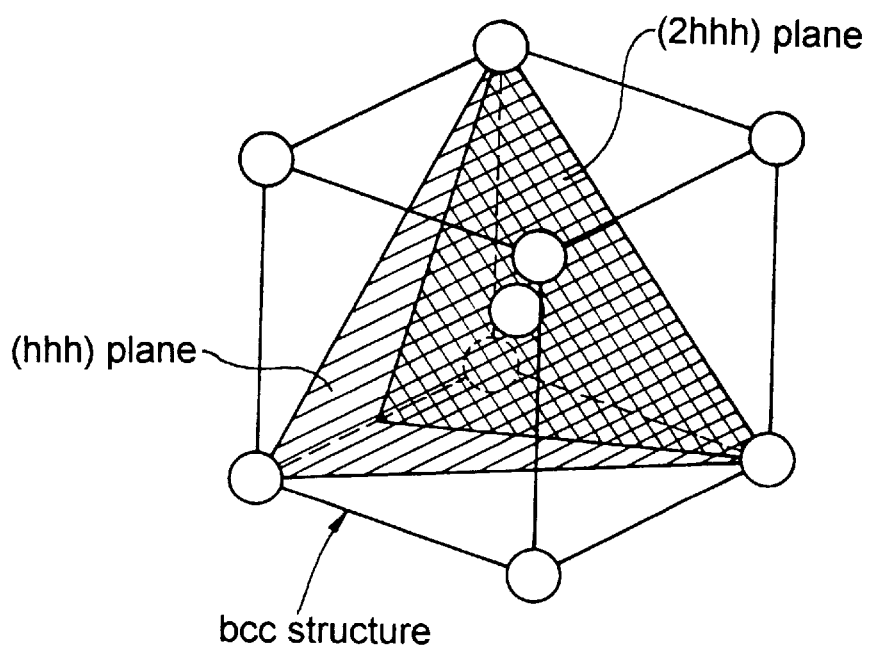
FIG. 5 is a perspective view showing a body-centered cubic (bcc) structure and its (hhh) plane and (2hhh) plane.

As best shown in FIGS. 3 and 4, the slide surface construction 9 is formed of an aggregate of metal crystals. Preferably (2hhh) oriented metal crystals 13 having a body-centered cubic (bcc) structure as shown in FIG. 5 with their (2hhh) planes (by Miller indices) oriented toward a slide surface 12 exist in the first region $R_1$. The content (which indicates a presence or existing amount) $S2_{hhh}$ of the (2hhh) oriented metal crystals is set in a range of $20\% \leq S2_{hhh} \leq 100\%$ in the first region $R_1$. The lower limit value of the content $S2_{hhh}$ is preferably equal to 25%.

Preferably (hhh) oriented metal crystals 14 having a body-centered cubic structure as shown in FIG. 5 with their (hhh) planes (by Miller indices) oriented toward a slide surface 12 exist in the second region $R_2$. The content (which indicates a presence or existing amount) $S_{hhh}$ of the (hhh) oriented metal crystals is set in a range of $40\% \leq S_{hhh} \leq 100\%$ in the second region $R_2$.

In the first region $R_1$, the (2hhh) oriented metal crystals 13 are grown into a columnar shape from the inner peripheral surface 8 of the backing plate 7, with tip ends of the (2hhh) oriented metal crystals 13 being formed of fish-shaped metal crystals 15 such as sardine-shaped metal crystals in the slide surface 12. If the content $S2_{hhh}$ of the (2hhh) oriented metal crystals 13 is set in the above-described range, the slide surface 12 takes on a very intricate aspect due to the large number of fish-shaped metal crystals existing in the slide surface 12, and hence, has a good oil retention. Moreover, the (2hhh) planes of the (2hhh) oriented metal crystals 13 are secondary slide faces and for this reason, the crystals 13 have a high hardness and a high strength.

Such first region $R_1$ has excellent seizure and wear resistances and therefore, even if the sliding condition is severe, the first region $R_1$ can withstand such severe sliding condition.

Figure 6:
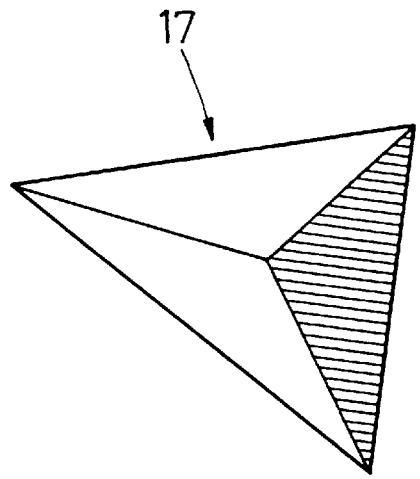
FIG. 6 is a plan view of a trigonal pyramid-shaped metal crystal.

In the second region $R_2$, the (hhh) oriented metal crystals 14 are grown into a columnar shape from the inner peripheral surface of the backing plate 7, with tip ends of the (hhh) oriented metal crystals 14 being formed of hexagonal pyramid-shaped metal crystals 16 as clearly shown in FIG. 3, or trigonal pyramid-shaped metal crystals 17 as clearly shown in FIG. 6, in the slide surface 12. If the content $S_{hhh}$ of the (hhh) oriented metal crystals 14 is set in the above-described range, the slide surface 12 takes on a very intricate aspect due to the large number of hexagonal pyramid-shaped metal crystals 16 and/or the large number of trigonal pyramid-shaped metal crystals 17 existing in the slide surface 12, and hence, has a good oil retention. However, the (hhh) oriented metal crystals 14 have a lower hardness, as compared with the (2hhh) oriented metal crystals 13.

Such second region $R_2$ has an excellent seizure resistance and hence, is most suitable for use in a site where the seizure resistance is preferentially required.

Figure 7:
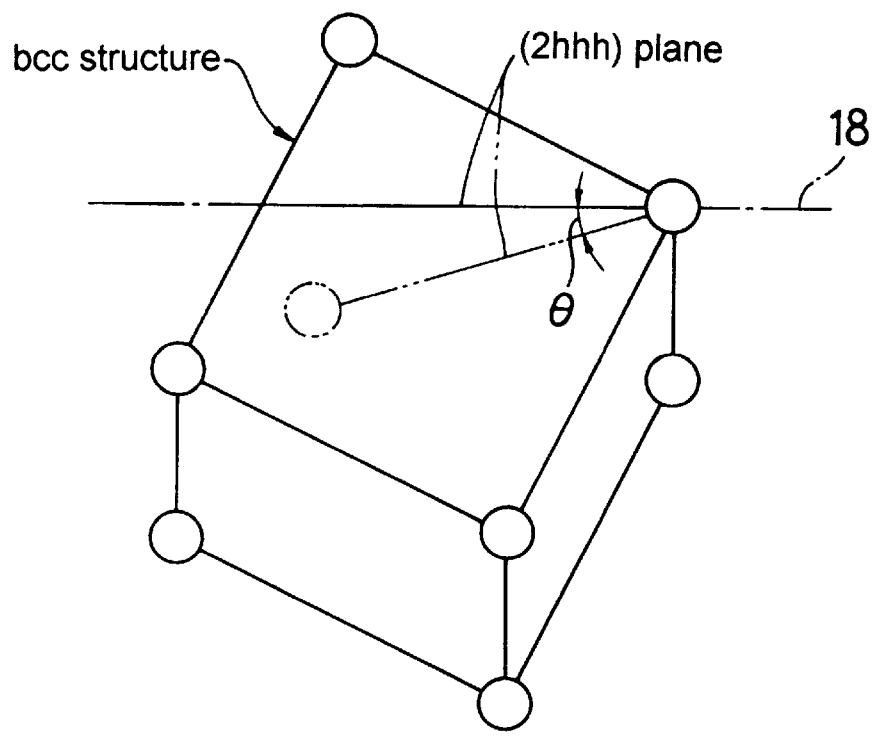
FIG. 7 is a diagram showing the inclination of the (2hhh) plane in the body-centered cubic structure.
Figure 8:
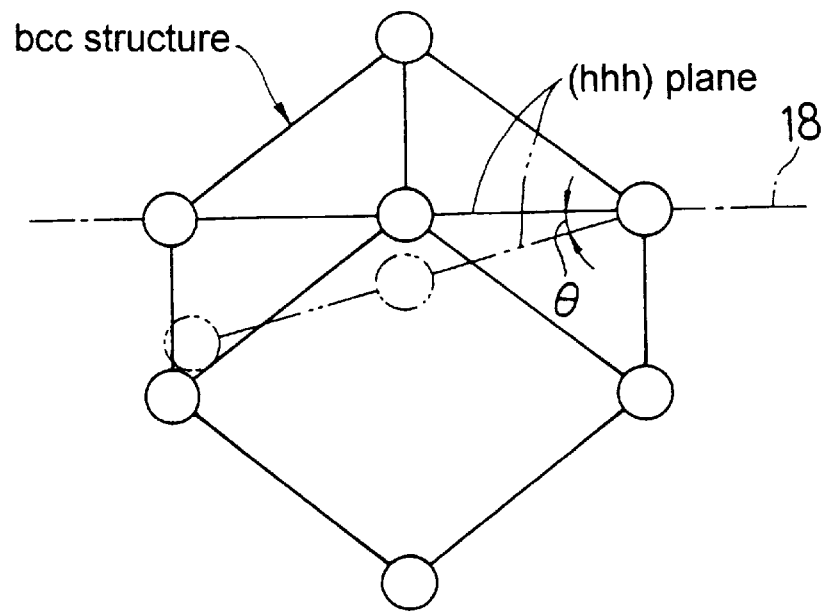
FIG. 8 is a diagram showing the inclination of the (hhh) plane in the body-centered cubic structure.

As clearly shown in FIG. 7, the inclination of the (2hhh) plane with respect to a phantom plane 18 along the slide surface 12 appears as the inclination of the fish-shaped metal crystal 15 and hence, an influence is imparted to the oil retention and wear resistance of the first region $R_1$. The inclination angle θ formed by the (2hhh) plane with respect to the phantom plane 18 preferably is set in a range of $0° \leq θ \leq 15°$. In this case, the direction of inclination of the (2hhh) plane is not limited. If the inclination angle θ is larger than 15°, the oil retention and the wear resistance of the first region $R_1$ are reduced. The preferred inclination angle also applies to the (hhh) plane, as shown in FIG. 8.

Examples of the metal crystals having the bcc structure are those of simple metals such as Fe, Cr, Mo, W, Ta, Zr, Nb, V and the like, or those of alloys thereof.

In the plating treatment for forming the first and second regions $R_1$ and $R_2$ of the slide surface construction, the range of conditions for a plating bath in carrying out an electrolytic Fe plating are as shown in Table 1. In this case, when one of the regions is formed, a portion corresponding to the other region, or the other region is masked.

TABLE 1

| Slide surface construction | Plating bath | | |
| --- | --- | --- | --- |
| | Ferrous sulfate (g/liter) | pH | Temperature (°C.) |
| First and second regions | 100–400 | 5–7 | 40–60 |

The adjustment of pH is carried out using ammonia water.

Figure 9:
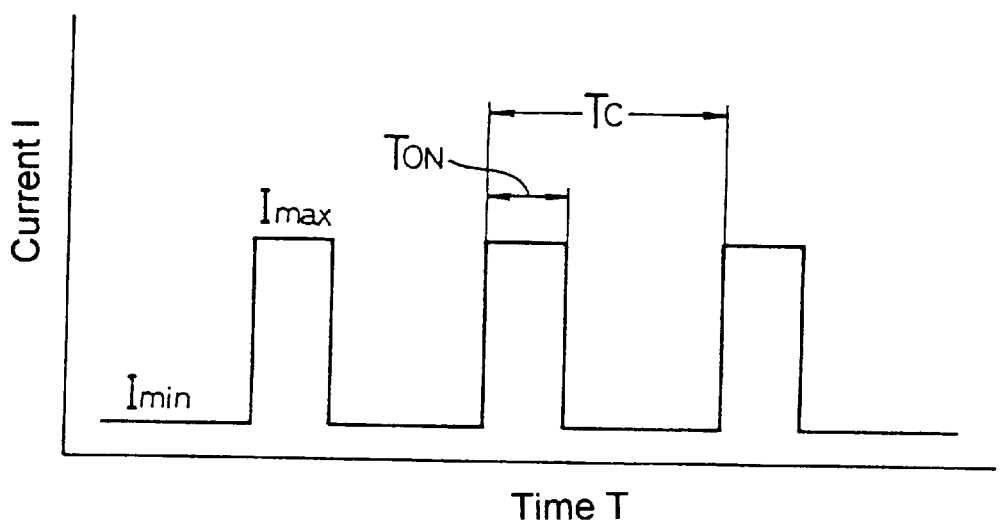
FIG. 9 is a graph of a waveform of an output from a power source for electrolytic plating.

A pulse current process is mainly utilized as an energizing method. In the pulse current process, the electric current I from a plating power source is controlled to describe a pulse waveform with the passage of time T, so that the current I is increased from a minimum current value Imin and reaches a maximum current value Imax, and is then dropped to the minimum current value Imin, as shown in FIG. 9. In FIG. 9, $T_{ON}$ is an energization time from the start of the increase of the electric and current and $T_C$ is a cycle time, wherein one cycle is defined as being from the start of an earlier increase to the start of a subsequent increase.

TABLE 2

| Slide surface construction | Pulse current process | | | |
| --- | --- | --- | --- | --- |
| | CDmax (A/dm²) | CDm (A/dm²) | $T_{ON}/T_C$ | $T_{ON}$ (msec) |
| First and second regions | ≧2.2 | ≧1.0 | ≦0.45 | ≦100 |

Table 2 shows the minimum or maximum conditions for carrying out the pulse current process. In Table 2, CDmax represents a maximum cathode current density; CDm represents an average cathode current density; and $T_{ON}/T_C$ represents a ratio of the energization time $T_{ON}$ to the cycle time $T_C$, i.e., a time ratio.

If the pulse current process is utilized, the ion concentration in the vicinity of a cathode is uniformized due to the fact that the maximum electric current alternately flows and does not flow in the plating bath. Thus, the composition of the first and second regions $R_1$ and $R_2$ can be stabilized.

In the above-described electrolytic Fe plating process, the precipitation and content of the (2hhh) oriented Fe crystals or the (hhh) oriented Fe crystals are controlled by changing the plating bath conditions and the energizing conditions, as described below. This control is easy under the utilization of the pulse current process and hence, the slide surface 12 is easily formed into an intended form.

In addition to the electrolytic Fe plating, other examples of a plating process are a PVD process, a CVD process, a sputtering process, an ion plating and the like, which are gas-phase plating processes.

Example-1
(a) Sliding Characteristic of First Region $R_1$

For each test example, a backing plate 7 made of a rolled sheet steel (JIS SPCC) and having an outside diameter of 51 mm (52.3 mm in a free state), a width of 19.5 mm, a thickness of 1.485 mm and an oil hole 10 diameter of 3 mm was prepared. Those portions of the inner peripheral surface 8 of the backing plate 7 which correspond to the two first regions $R_1$ were subjected to an electrolytic Fe plating to form first regions $R_1$ formed of an aggregate of Fe crystals and having a width of 2 mm and a thickness of 15 μm. During this time, that portion of the backing plate 7 which corresponds to the second region $R_2$ was masked using a steel sheet as a conductive jig.

Then, the two first regions $R_1$ were masked in the same manner as that described above, and that portion of the backing plate 7 which corresponds to the second region $R_2$ was subjected to the electrolytic Fe plating to form a second region $R_2$ having a thickness of 15 μm.

Table 3 shows the electrolytic Fe plating conditions for examples 1a to 5a of the first regions, and Table 4 shows electrolytic Fe plating conditions for examples 6a to 9a of the first regions and an example 1b of the second region. The plating time was varied within a range of 5 to 60 minutes in order to set the thickness for the examples 1a to 9a and 1b at 15 μm, as described above.

TABLE 3

| First region | Plating bath | | | Pulse current process | | | |
|---|---|---|---|---|---|---|---|
| | Ferrous sulfate (g/liter) | pH | Temperature (° C.) | CDmax (A/dm$^2$) | CDm (A/dm$^2$) | $T_{ON}/T_C$ | $T_{ON}$ (msec) |
| Example 1a | 400 | 6.5 | 41.5 | 40 | 8 | 0.2 | 2 |
| Example 2a | 400 | 6.5 | 41.5 | 30 | 6 | 0.2 | 2 |
| Example 3a | 400 | 6.3 | 41.5 | 25 | 5 | 0.2 | 2 |
| Example 4a | 400 | 6.5 | 43 | 30 | 6 | 0.2 | 2 |
| Example 5a | 400 | 6.3 | 43 | 25 | 5 | 0.2 | 2 |

TABLE 4

| | Plating bath | | | Pulse current process | | | |
|---|---|---|---|---|---|---|---|
| | Ferrous sulfate (g/liter) | pH | Temperature (° C.) | CDmax (A/dm$^2$) | CDm (A/dm$^2$) | $T_{ON}/T_C$ | $T_{ON}$ (msec) |
| First region | | | | | | | |
| Example 6a | 400 | 6.3 | 45 | 25 | 5 | 0.2 | 2 |
| Example 7a | 400 | 6.2 | 48 | 25 | 5 | 0.2 | 2 |
| Example 8a | 400 | 6.1 | 48 | 25 | 5 | 0.2 | 2 |
| Example 9a | 400 | 6 | 48 | 25 | 5 | 0.2 | 2 |
| Second region | | | | | | | |
| Example 1b | 400 | 6 | 48 | 25 | 5 | 0.2 | 2 |

Tables 5 and 6 show the crystal form of the slide surface, the content of the oriented Fe crystals and the hardness of a section of the slide surface construction for the examples, with Table 5 corresponding to the examples 1a to 5a, and Table 6 corresponding to the examples 6a to 9a and 1b.

TABLE 5

| First region | Crystal form of slide surface | Content S (%) of oriented Fe crystals | | | | | Hardness |
|---|---|---|---|---|---|---|---|
| | | $S_{110}$ | $S_{200}$ | $S_{211}$ | $S_{310}$ | $S_{222}$ | HmV |
| Example 1a | Fish-shaped | 5.4 | 0.9 | 91.3 | 0 | 2.4 | 675 |
| Example 2a | Fish-shaped | 15.2 | 7.9 | 52.7 | 8.6 | 15.6 | 634 |
| Example 3a | Fish-shaped and granular | 20.8 | 15 | 25.7 | 16.4 | 22.1 | 584 |
| Example 4a | Fish-shaped and hexagonal pyramid-shaped | 1 | 0 | 47.9 | 0 | 51.1 | 581 |

TABLE 5-continued

| First region | Crystal form of slide surface | Content S (%) of oriented Fe crystals | | | | | Hardness |
|---|---|---|---|---|---|---|---|
| | | $S_{110}$ | $S_{200}$ | $S_{211}$ | $S_{310}$ | $S_{222}$ | HmV |
| Example 5a | Fish-shaped and hexagonal pyramid-shaped | 14.8 | 3.3 | 25.9 | 3.6 | 52.4 | 579 |

TABLE 6

| | Crystal form of slide surface | Content S (%) of oriented Fe crystals | | | | | Hardness |
|---|---|---|---|---|---|---|---|
| | | $S_{110}$ | $S_{200}$ | $S_{211}$ | $S_{310}$ | $S_{222}$ | HmV |
| First region | | | | | | | |
| Example 6a | Fish-shaped and hexagonal pyramid-shaped | 0 | 0 | 25.2 | 0 | 74.8 | 523 |
| Example 7a | Fish-shaped and hexagonal pyramid-shaped | 0.1 | 0 | 20.6 | 0 | 79.3 | 491 |
| Example 8a | Hexagonal pyramid-shaped and granular | 0 | 0 | 19.5 | 0 | 80.5 | 475 |
| Example 9a | Hexagonal pyramid-shaped | 0.5 | 0 | 1.4 | 0 | 98.1 | 420 |
| Second region | | | | | | | |
| Example 1b | Hexagonal pyramid-shaped | 0.5 | 0 | 1.4 | 0 | 98.1 | 420 |

Figure 10:
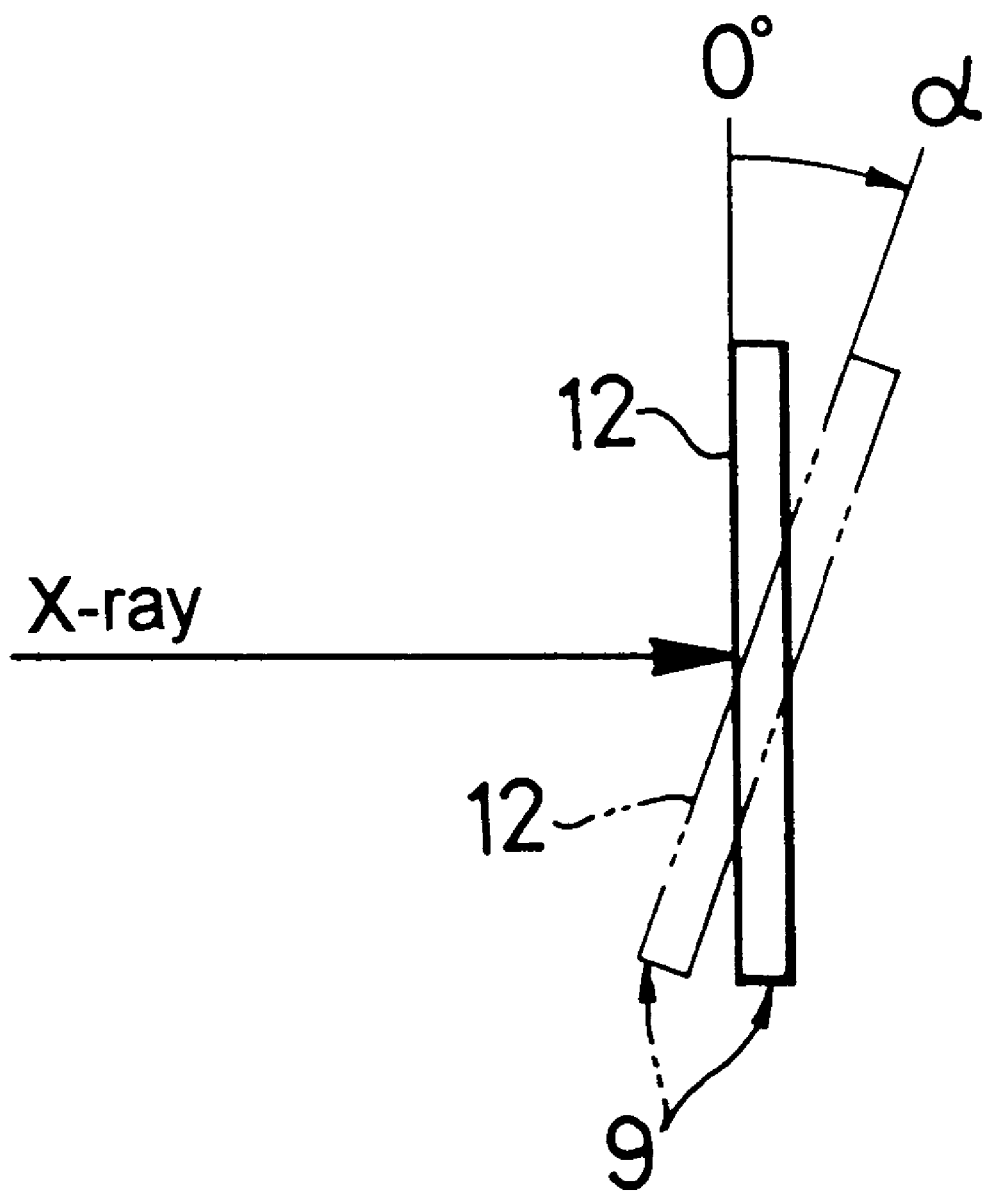
FIG. 10 is a diagram illustrating how X-ray is applied to the slide surface.
Figure 11:
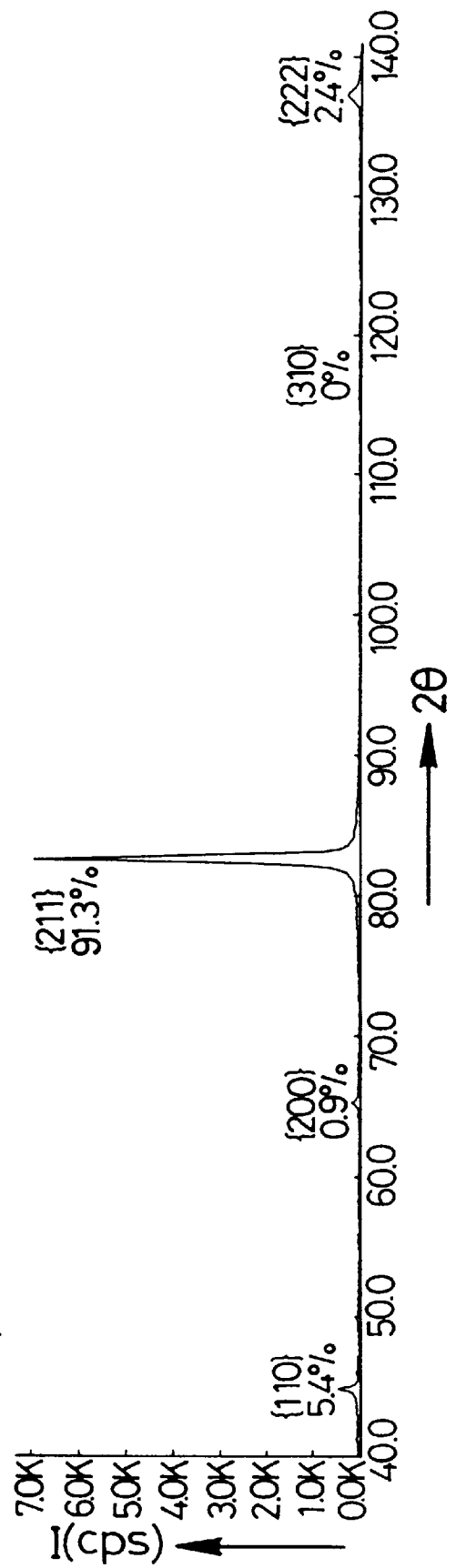
FIG. 11 is an X-ray diffraction pattern for an example 1a of a first region of a slide surface.

The content of the oriented Fe crystals was determined using equations which will be described below, based on the X-ray diffraction patterns for the examples 1a to 9a and 1b. As shown in FIG. 10, the X-ray diffraction was carried out at a 0° position where X-ray was applied at right angles to the slide surface 12, and a position where the slide surface 12 was inclined at an inclination angle α, taking the inclination of the fish-shaped metal crystals and the like into consideration. In this case, α was set at 5°, 10° and 15°. The result of measurement at the 0° position and the result of measurement at the 5°, 10° and 15° position are substantially identical to each other and hence, the X-ray diffraction pattern at the 0° position was used for the calculation of the content. FIGS. 11 and 12 show the X-ray diffraction patterns for the examples 1a and 4a at the 0° position. In the following equations, for example, the {110} oriented Fe crystal means an oriented Fe crystal with its {110} plane oriented toward the slide surface.

{110} oriented Fe crystals: $S_{110} = \{(I_{110}/IA_{110})/T\} \times 100$
{200} oriented Fe crystals: $S_{200} = \{(I_{200}/IA_{200})/T\} \times 100$
{211} oriented Fe crystals: $S_{211} = \{(I_{211}/IA_{211})/T\} \times 100$
{310} oriented Fe crystals: $S_{310} = \{(I_{310}/IA_{310})/T\} \times 100$
{222} oriented Fe crystals: $S_{222} = \{(I_{222}/IA_{222})/T\} \times 100$ wherein each of $I_{110}$, $I_{200}$, $I_{211}$, $I_{310}$ and $I_{222}$ is a measurement (cps) of an intensity of X-ray reflected from each crystal plane; each of $IA_{110}$, $IA_{200}$, $IA_{211}$, $IA_{310}$ and $IA_{222}$ is an intensity ratio of X-rays reflected from crystal planes in an ASTM card, $IA_{110}=100$; $IA_{200}=20$, $IA_{211}=30$; $IA_{310}=12$; and $IA_{222}=6$. Further, $T=(I_{110}/IA_{110})+(I_{200}/IA_{200})+(I_{211}/IA_{211})+(I_{310}/IA_{310})+(I_{222}/IA_{222})$.

FIG. 13 is a photomicrograph showing the crystal structure of the slide surface in the example 1a. In FIG. 13, a large number of fish-shaped Fe crystals are observed. The fish-shaped Fe crystal is a {211} oriented Fe crystal with its {211} plane oriented toward the slide surface. The content $S_{211}$ ($S2_{hhh}$) of the {211} oriented Fe crystals is equal to 91.3%, as shown in Table 5 and FIG. 11.

FIG. 14 is a photomicrograph showing the crystal structure of the slide surface in the example 4a. In FIG. 14, a large number of fish-shaped Fe crystals and a large number of hexagonal pyramid-shaped Fe crystals are observed. The fish-shaped Fe crystal is a {211} oriented Fe crystal with its {211} plane oriented toward the slide surface. The content $S_{211}$ of the {211} oriented Fe crystals is equal to 47.9%, as shown in Table 5 and FIG. 12. The hexagonal pyramid-shaped Fe crystal is a {222} oriented Fe crystal with its (hhh) plane, i.e., {222} plane oriented toward the slide surface. The content $S_{222}$ ($S_{hhh}$) of the {222} oriented Fe crystals is equal to 51.1%, as shown in Table 5 and FIG. 12.

FIG. 15 is a photomicrograph showing the crystal structure of the slide surface in the example 8a. In FIG. 15, a large number of hexagonal pyramid-shaped Fe crystals and a large number of granular Fe crystals are observed. The hexagonal pyramid-shaped Fe crystal is likewise a {222} oriented Fe crystal with its {222} plane oriented toward the slide surface. The content $S_{222}$ of the {222} oriented Fe crystals is equal to 80.5%, as shown in Table 6.

In Tables 5 and 6, the examples 1a to 7a are high in hardness, as compared with the examples 8a, 9a and 1b. This is attributable to the content $S_{211}$ of the {211} oriented Fe crystals being equal to or higher than 20%. In this case, if $S_{211} \geq 25\%$, the degree of increase in hardness is remarkable.

In order to carry out a seizure test, a rotary shaft made of a carbon steel (JIS S48C, a soft nitrided material) and having a diameter of 47.94 mm and a length of 140 mm was placed in a housing (with a clearance of 30 μm) of a metal tester in such a manner that it was clamped by a pair of slide bearings of semi-annular halves having the construction of example 1a for the first region and 1b for the second region. Then, the seizure test was carried out under conditions of the number of rotations of the rotary shaft being equal to 6000 rpm and the amount of oil supplied being equal to 600 ml/min, and by a method for applying load to the slide bearings in such a manner that a load of 2,000 N was first applied to the slide bearings and maintained for 2 minutes, and after that, the load was increased in sequence by 2,000 N while maintaining it for 2 minutes each time the load was increased. During this time, the temperature of those portions of the backing plate of the slide bearing corresponding to the two first regions was measured, and the load at the time when the temperature exceeded 180° C. was defined as a seizure generating load. A similar seizure test was carried out for the slide bearings each comprised of a pair of semi-annular halves having the construction of examples 2a to 9a in the first regions $R_1$ and the example 1b in the second region $R_2$.

Then, chips having the examples 1a to 9a were fabricated and subjected to a wear test in a chip-on-disk manner under lubrication to measure a wear amount. Conditions for the wear test are as follows: the material for the disk was a carbon steel (JIS S48C, a soft nitrided material); the peripheral speed of the disk was 12.5 m/sec; the amount of oil supplied was 5 ml/min; the area of the slide surface of the chip was 1 cm², the urging load on the chip was 300 N; the sliding time was 30 minutes; and the wear amount was the difference between the thickness of the chip before the test and the thickness of the chip after the test.

Table 7 shows results of the seizure test and the wear test for the examples 1a to 9a along with the ratio $S_{211}/S_{222}$ of the content $S_{211}$ of the {211} oriented Fe crystals to the content $S_{222}$ of the {222} oriented Fe crystals.

TABLE 7

| First region | Ratio $S_{211}/S_{222}$ | Seizure generating load (N) | Wear amount (μm) |
| --- | --- | --- | --- |
| Example 1a | 38.0 | 54000 | 1.0 |
| Example 2a | 3.4 | 52000 | 1.2 |
| Example 3a | 1.2 | 48000 | 1.5 |
| Example 4a | 0.9 | 48000 | 1.9 |
| Example 5a | 0.5 | 46500 | 2.0 |
| Example 6a | 0.3 | 46000 | 2.2 |
| Example 7a | 0.3 | 37500 | 3.5 |
| Example 8a | 0.2 | 37000 | 3.7 |
| Example 9a | 0.01 | 36000 | 3.7 |

FIG. 16 shows the relationship between the content $S_{211}$ of the {211} oriented Fe crystals and the seizure generating load for the examples 1a to 9a. In FIG. 16, points (1a) to (9a) correspond to the examples 1a to 9a, respectively. The relationship between the points and the examples applies to Figures which will be described hereinafter.

FIG. 17 shows the relationship between the content $S_{211}$ of the {211} oriented Fe crystals and the wear amount for the examples 1a to 9a.

In FIGS. 16 and 17, the enhancement in seizure resistance and in wear resistance in examples 1a to 6a is distinct from the examples 7a, 8a and 9a. From this, it can be seen that the content $S_{211}$ in the first region $R_1$ may be set in a range of $S_{211} \geq 20\%$. Preferably, the content $S_{211}$ is in a range of $S_{211} \geq 25\%$.

If the ratio $S_{211}/S_{222}$ is set in a range of $S_{211}/S_{222} \geq 1$ when the content $S_{211}$ is equal to or higher than 25%, the seizure and wear resistances are enhanced remarkably, as in the examples 1a to 3a. In the case of the example 4a, the content $S_{211}$ is relatively high, but the seizure resistance is equivalent to that of the example 3a having the relatively low content $S_{211}$, and the wear resistance is equivalent to that of the example 5a having the relatively low content $S_{211}$, because the ratio $S_{211}/S_{222}$ is lower than 1.

(b) Sliding Characteristic of Second Region $R_2$

For each test example, a backing plate 7 made of a rolled sheet steel (JIS SPCC) and having an outside diameter of 51 mm (52.3 mm in a free state), a width of 19.5 mm, a thickness of 1.485 mm and an oil hole diameter of 3 mm was prepared. That portion of the inner peripheral surface 8 of the backing plate 7 which corresponds to the second regions $R_2$ was subjected to an electrolytic Fe plating to form a second region $R_2$ formed of an aggregate of Fe crystals and having a width of 15.5 mm and a thickness of 15 μm. During this time, those portions of the backing plate 7 which corresponds to the two first regions $R_1$ were masked using a steel sheet as a conductive jig.

Then, the second region $R_2$ was masked in the same manner as that described above, and those portions of the backing plate 7 which correspond to the two first regions $R_1$ were subjected to the electrolytic Fe plating to form two first regions $R_1$ having a thickness of 15 μm.

Table 8 shows the electrolytic Fe plating conditions for examples 1b to 5b of the second region and an example 1a of the first regions $R_1$. The plating time was varied within a range of 5 to 60 minutes in order to set the thickness for the examples 1b to 5b and 1a at 15 μm, as described above.

TABLE 8

| | Plating bath | | | Pulse current process | | | |
| --- | --- | --- | --- | --- | --- | --- | --- |
| | Ferrous sulfate (g/liter) | pH | Temperature (° C.) | CDmax (A/dm²) | CDm (A/dm²) | $T_{ON}/T_C$ | $T_{ON}$ (msec) |
| Second region | | | | | | | |
| Example 1b | 400 | 6 | 48 | 25 | 5 | 0.2 | 2 |
| Example 2b | 300 | 6 | 48 | 17.5 | 3.5 | 0.2 | 2 |
| Example 3b | 300 | 6 | 48 | 15 | 3 | 0.2 | 2 |
| Example 4b | 400 | 4 | 50 | 20 | 4 | 0.2 | 2 |
| Example 5b | 400 | 3 | 50 | 20 | 4 | 0.2 | 2 |
| First regions | 400 | 6.5 | 41.5 | 40 | 8 | 0.2 | 2 |
| Example 1a | | | | | | | |

Table 9 shows the crystal form of the slide surface, the content of the oriented Fe crystals, and the hardness of a section of the slide surface construction for the examples 1b to 5b and 1a.

TABLE 9

| | Crystal form of slide surface | Content S (%) of oriented Fe crystals | | | | | Hardness |
|---|---|---|---|---|---|---|---|
| | | $S_{110}$ | $S_{200}$ | $S_{211}$ | $S_{310}$ | $S_{222}$ | HmV |
| Second region | | | | | | | |
| Example 1b | Hexagonal pyramid-shaped | 0.5 | 0 | 1.4 | 0 | 98.1 | 420 |
| Example 2b | Hexagonal pyramid-shaped, Fish-shaped and granular | 11.3 | 3.8 | 22.2 | 2 | 60.7 | 384 |
| Example 3b | Hexagonal pyramid-shaped, Fish-shaped and granular | 17.5 | 9.7 | 20.3 | 11.8 | 40.7 | 333 |
| Example 4b | Hexagonal pyramid-shaped and granular | 8.5 | 15 | 18.9 | 20.5 | 37.1 | 318 |
| Example 5b | Granular | 14.4 | 19.7 | 18.9 | 24.5 | 22.5 | 285 |
| First regions | Fish-shaped | 5.4 | 0.9 | 91.3 | 0 | 2.4 | 675 |
| Example 1a | | | | | | | |

Figure 19:
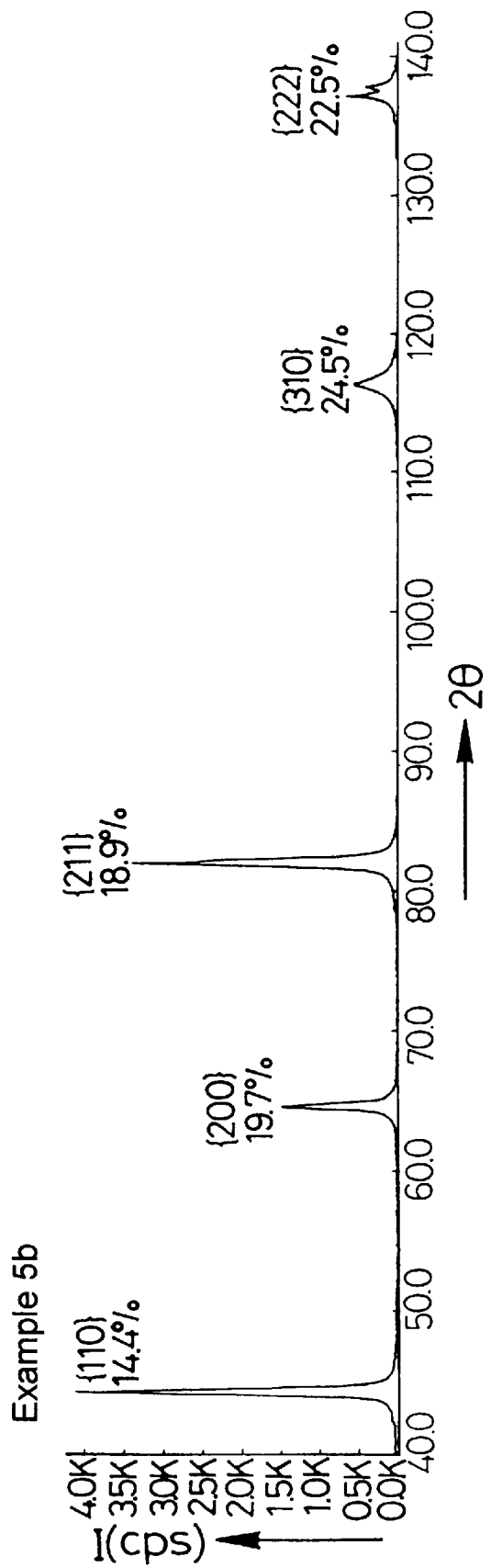
FIG. 19 is an X-ray diffraction pattern for an example 5b of the second region of a slide surface.

The content of the oriented Fe crystals was determined in the same manner as that described above, based on the X-ray diffraction patterns for the examples 1b to 5b and 1a. FIG. 19 is an X-ray diffraction pattern at the 0° position for the example 5b.

Figure 18:
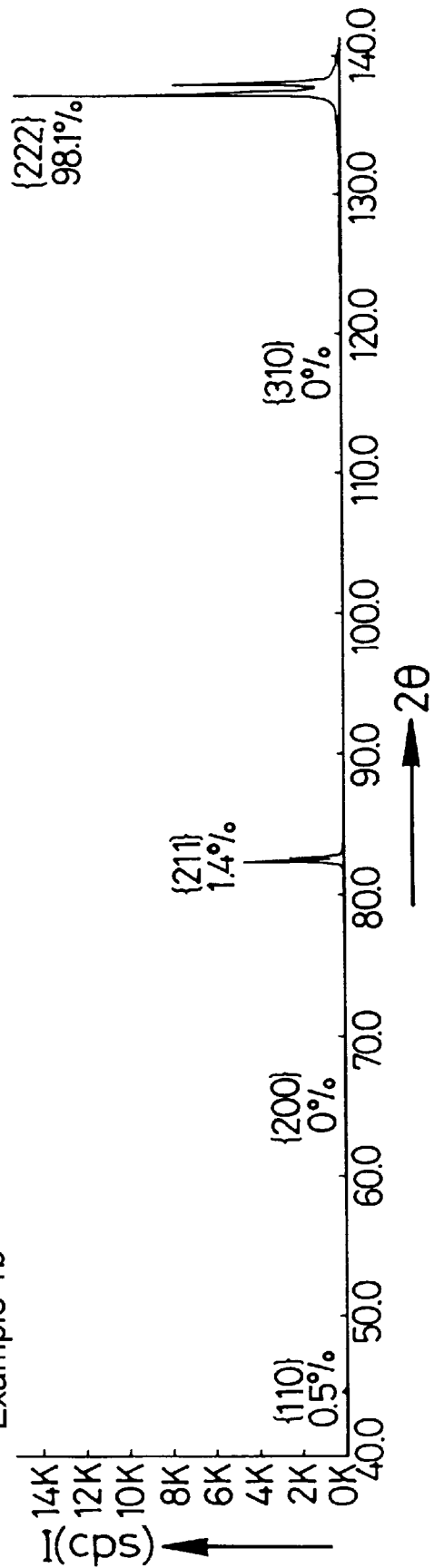
FIG. 18 is an X-ray diffraction pattern for an example 1b of a second region of a slide surface.
Figure 20:
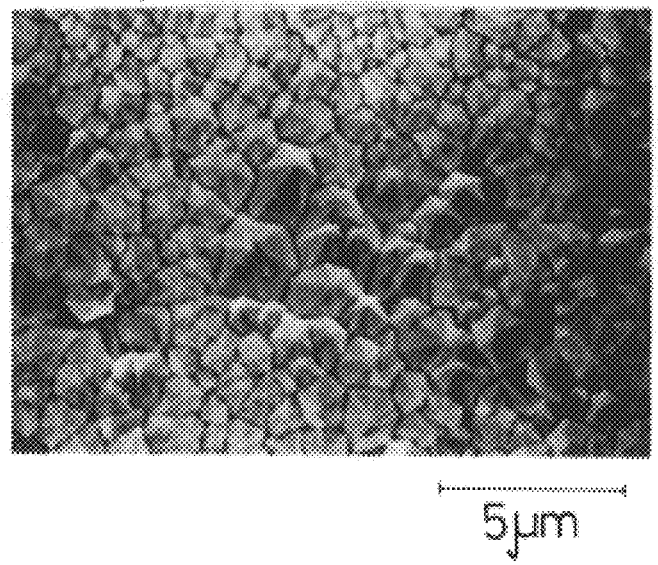
FIG. 20 is a photomicrograph showing the crystal structure of the slide surface of the example 1b.

FIG. 20 is a photomicrograph showing the crystal structure of the slide surface in the example 1b. In FIG. 20, a large number of hexagonal pyramid-shaped Fe crystals are observed. The hexagonal pyramid-shaped Fe crystal is a {222} oriented Fe crystal with its (hhh) plane, i.e., {222} plane oriented toward the slide surface. The content $S_{222}$ ($S_{hhh}$) of the {222} oriented Fe crystals is equal to 98.1%, as shown in Table 9 and FIG. 18.

Figure 21:
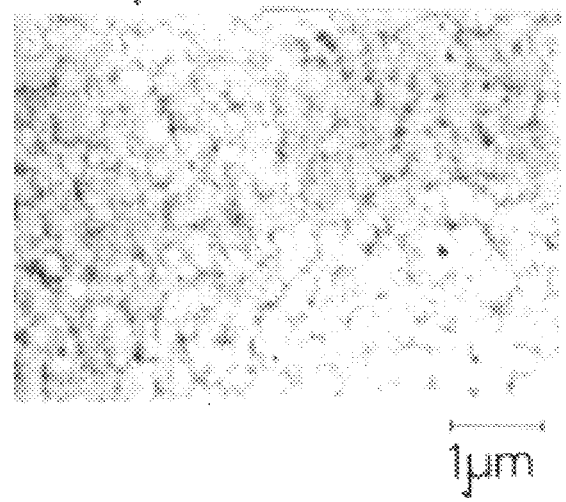
FIG. 21 is a photomicrograph showing the crystal structure of the slide surface of the example 5b.

FIG. 21 is a photomicrograph showing the crystal structure of the slide surface in the example 5b. In FIG. 21, a large number of granular Fe crystals are observed. In this case, the content of the differently oriented Fe crystals is substantially averaged or equal, as shown Table 9 and FIG. 19.

Then, a seizure test was carried out under the same conditions as those described above, using a slide bearing comprised of a pair of semi-annular halves having the construction of the examples 1b and 1a for the second and first regions, respectively, and using the above-described metal tester. The measurement of the temperature corresponding to the seizure generating load was carried out for that portion of the outer peripheral surface of the backing plate of the slide bearing which corresponds to the second region. A similar seizure test was carried out using a slide bearing comprised of a pair of semi-annular halves having the construction of each of the examples 2b to 5b for the second region and 1a for the first region. Table 10 shows results of the seizure test.

TABLE 10

| Second region | Seizure generating load (N) |
|---|---|
| Example 1b | 36000 |
| Example 2b | 35000 |
| Example 3b | 32000 |
| Example 4b | 22000 |
| Example 5b | 21000 |

Figure 22:
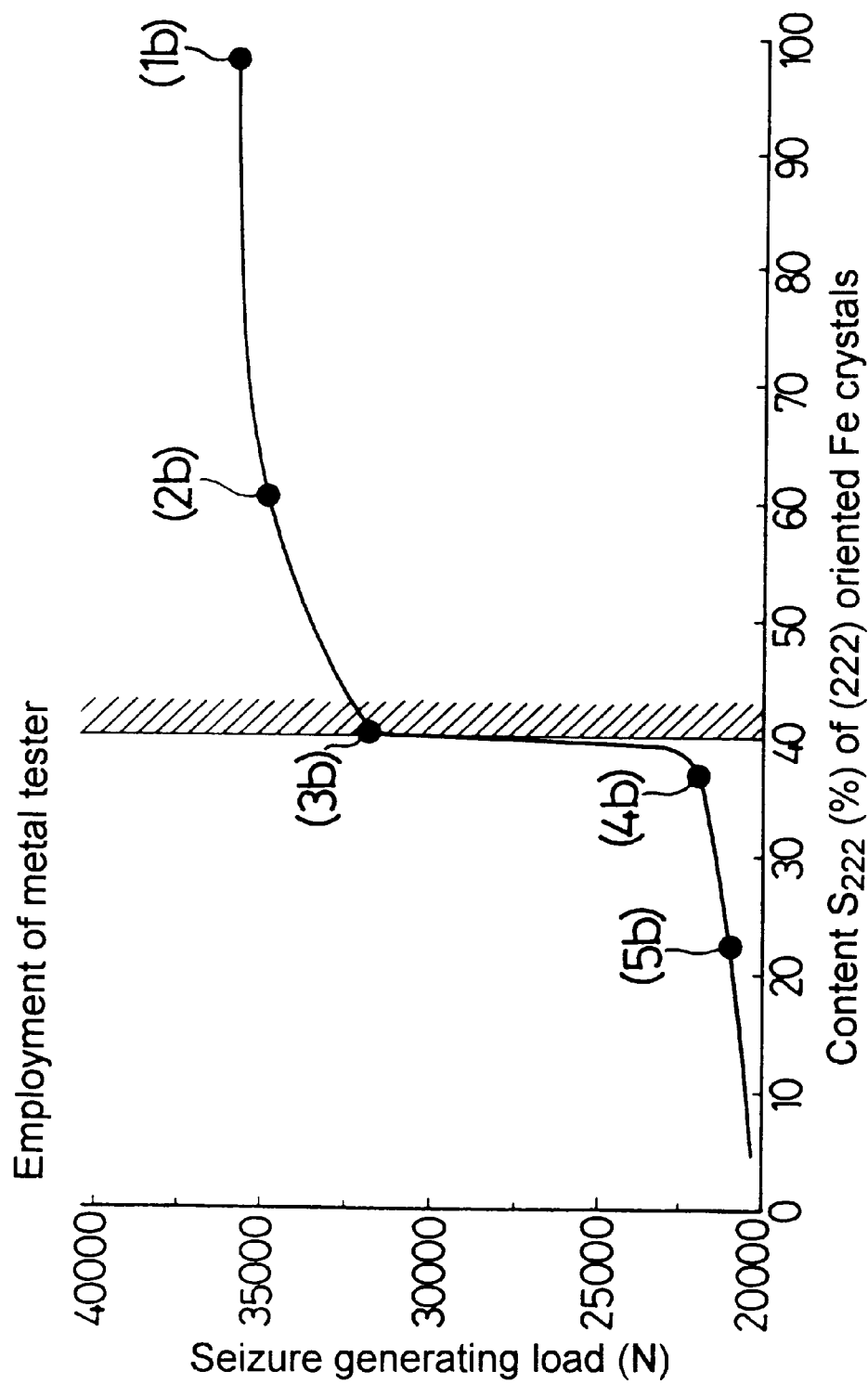
FIG. 22 is a graph illustrating the relationship between the content $S_{222}$ of {222} oriented Fe crystals and the seizure generating load.

FIG. 22 shows the relationship between the content $S_{222}$ of the {222} oriented Fe crystals and the seizure generating load for the examples 1b to 5b.

In FIG. 22, the enhancement in seizure resistance in examples 1b, 2b and 3b is distinct from the examples 4b and 5b. From this, it can be seen that the content $S_{222}$ in the second region $R_2$ may be set in a range of $S_{222} \geq 40\%$.

Example-2

Figure 23A:
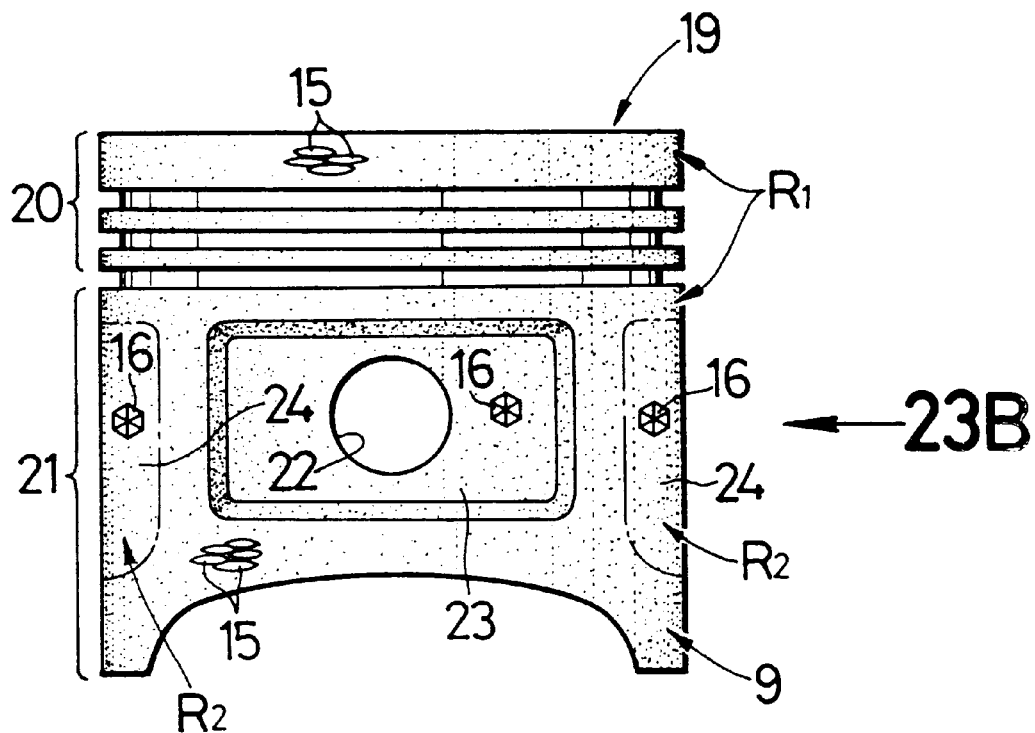
FIG. 23A is a front view of a piston.
Figure 23B:
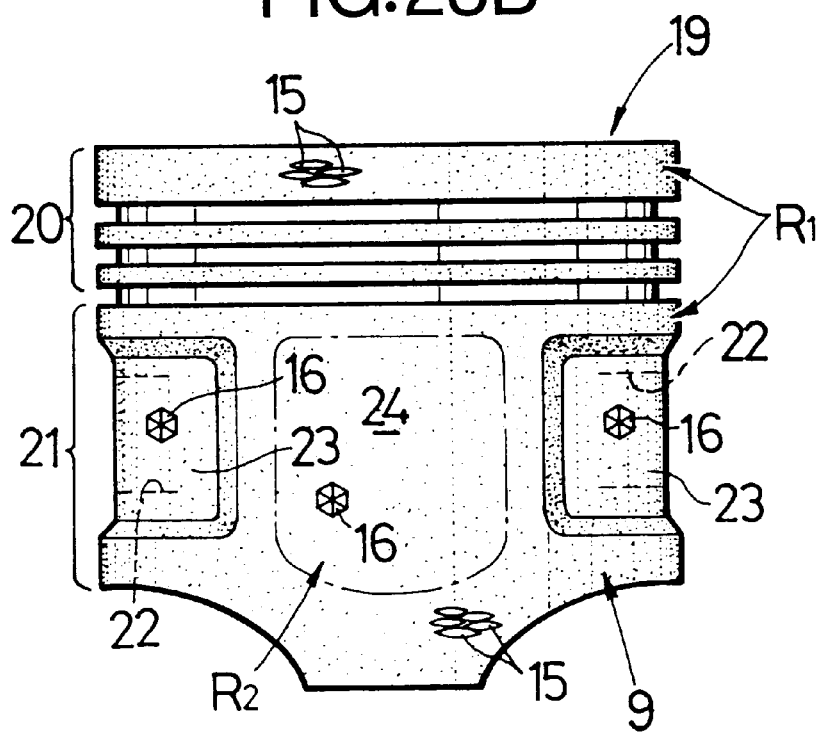
FIG. 23B is a view take along an arrow 23B in FIG. 23A.

A piston 19 for an internal combustion engine is shown in FIGS. 23A and 23B and is formed of an aluminum alloy (JIS AC8A, a T7-treated material). A lamellar slide surface construction 9 is formed on the entire outer peripheral surface of a land portion 20 of the piston 19 and on a portion of an outer peripheral surface of a skirt portion 21 of the piston 19.

In this case, the section located on the entire outer peripheral surface of the land portion 20 and the section located on a portion of the skirt portion 21 correspond to first regions $R_1$ of the slide surface construction 9. The term "a portion" of the skirt portion 21 corresponds to the portion obtained by excluding the two recesses 23 around two piston pin holes 22 from the skirt portion 21, and two central portions 24 surrounded by a one-dot and dashed line between both the recesses 23. Sections located at the two central portions surrounded by the one-dot and dashed line correspond to second regions $R_2$ of the slide surface construction 9.

Specifically, the sections of the piston 19 corresponding to the second regions $R_2$ (namely, the two central portions) and the two recesses 23 were masked by the same means as that described above, and slide surface constructions of examples 1a to 9a of the first region $R_1$ described in section (a) above were formed on the sections corresponding to the first regions $R_1$ by an electrolytic Fe plating process under the same conditions as those described above. Then, the first regions $R_1$ were masked by the same means as that described above, and a construction of above example 1b of the second region $R_2$ described in section (a) above was formed at each of the two central portion 24 and the two recesses 23 by an electrolytic Fe plating process under the same conditions. In this case, the surface skins formed at the two recesses 23 and having hexagonal pyramid-shaped Fe crystals in a surface thereof have an oil accumulating function.

Then, chips having the examples 1a to 9a were fabricated and subjected to a seizure test in a chip-on-disk manner under lubrication to measure the seizure generating load, thereby providing results given in Table 11. Conditions for the seizure test were as follows: the material for the disk was a cast iron (JIS FC250); the peripheral speed of the disk was 12.5 m/sec; the amount oil supplied was 40 ml/min; the area of the slide surface of the chip was 1 cm²; the method for applying load to the chip was to apply a load of 20 N to the chip and maintain it for 2 minutes, and after that, the load was increased in sequence by 20 N while maintaining it for 2 minutes each time whenever the load was increased.

TABLE 11

| First region | Seizure generating load (N) |
| --- | --- |
| Example 1a | 2750 |
| Example 2a | 2680 |
| Example 3a | 2450 |
| Example 4a | 2420 |
| Example 5a | 2380 |
| Example 6a | 2350 |
| Example 7a | 1500 |
| Example 8a | 1480 |
| Example 9a | 1450 |

Figure 24:
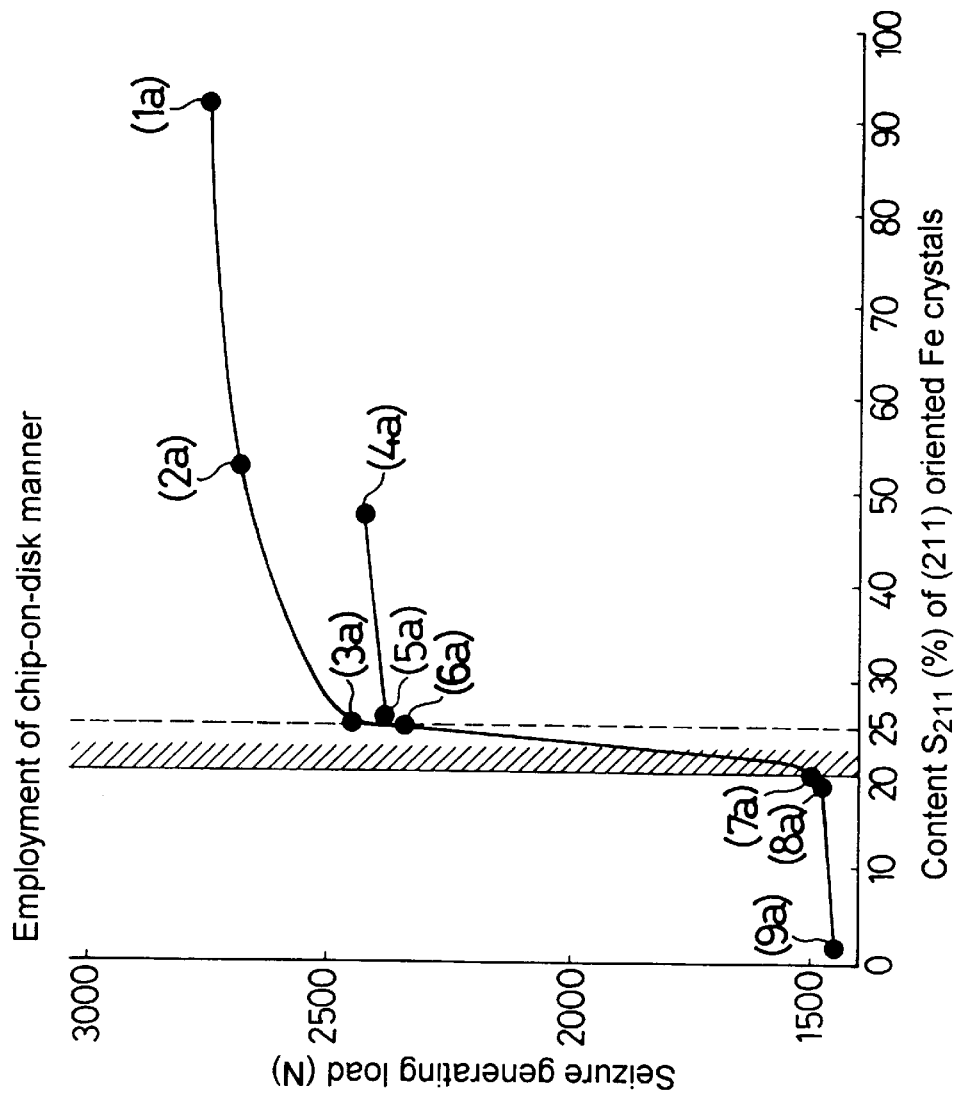
FIG. 24 is a graph illustrating the relationship between the content $S_{211}$ of {211} oriented Fe crystals and the seizure generating load.

FIG. 24 shows the relationship between the content $S_{211}$ of the {211} oriented Fe crystals and the seizure generating load for the examples 1a to 9a.

In FIG. 24, the enhancement in seizure resistance for examples 1a to 6a is distinct from the examples 7a to 9a. From this, it can be seen that the content $S_{211}$ in the first region $R_1$ may be set in a range of $S_{211} \geq 20\%$. Preferably, the content $S_{211}$ is in a range of $S_{211} \geq 25\%$.

If the ratio $S_{211}/S_{222}$ is set in a range of $S_{211}/S_{222} \geq 1$ when the content $S_{211}$ is equal to or higher than 25%, the seizure resistance is enhanced remarkably as in the examples 1a to 3a. In the case of the example 4a, the content $S_{211}$ is relatively high, but the seizure resistance is equivalent to those of the examples 3a and 5a having the relatively low content $S_{211}$, because the ratio $S_{211}/S_{222}$ is lower than 1.

The first embodiment is not limited to the slide bearing and piston but is applicable to various slide members such as a balancer shaft, a cam shaft, a piston pin and the like, which have two regions of different sliding conditions.

SECOND EMBODIMENT

Figure 25:
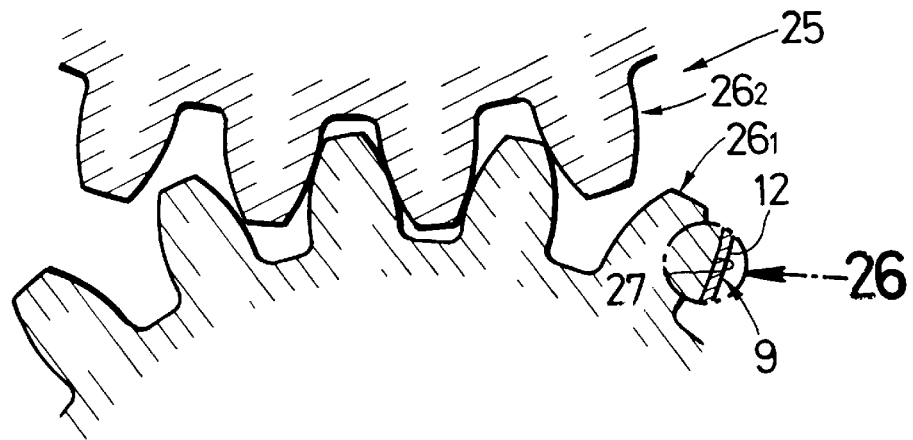
FIG. 25 is a sectional view of an essential portion of a gearing device.

In a gearing device 25 shown in FIG. 25, two gears $26_1$ and $26_2$ meshed with each other are formed of a steel. A lamellar slide surface construction 9 is formed on a meshed face of at least one of the gears $26_1$ by an electrolytic plating treatment.

Figure 26:
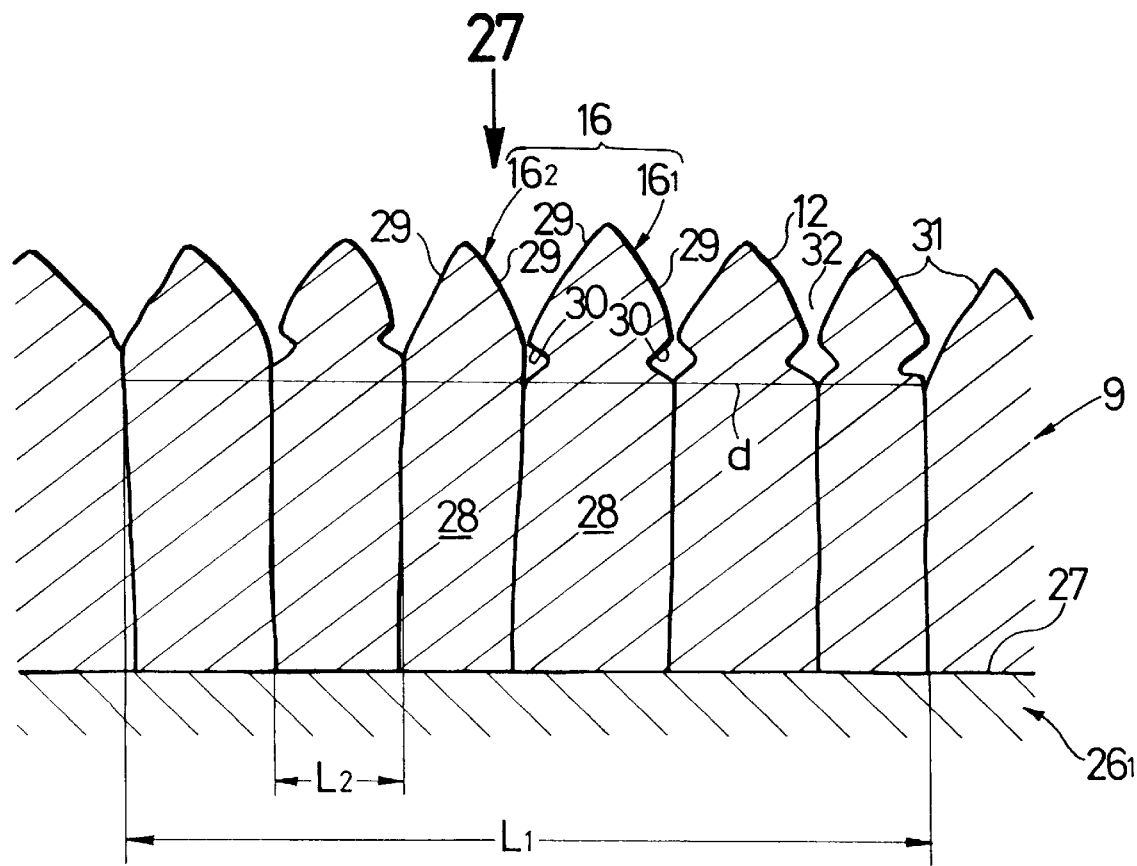
FIG. 26 is an enlarged view of a portion indicated by an arrow 26 in FIG. 25.

The slide surface construction 9 is formed of an aggregate of metal crystals having a body-centered cubic structure (which will be also referred to as a bcc structure hereinafter), as in the first embodiment, as shown in FIG. 5. The aggregate includes a large number of columnar crystals 28 grown from the meshed face 27, as shown in FIG. 26. Each of the columnar crystals 28 is at least one of a (hhh) oriented metal crystal with its (hhh) plane (by Miller indices) oriented toward a slide surface 12, and a (2hhh) oriented metal crystal with its (2hhh) plane (by Miller indices) oriented toward the slide surface 12.

Figure 27:
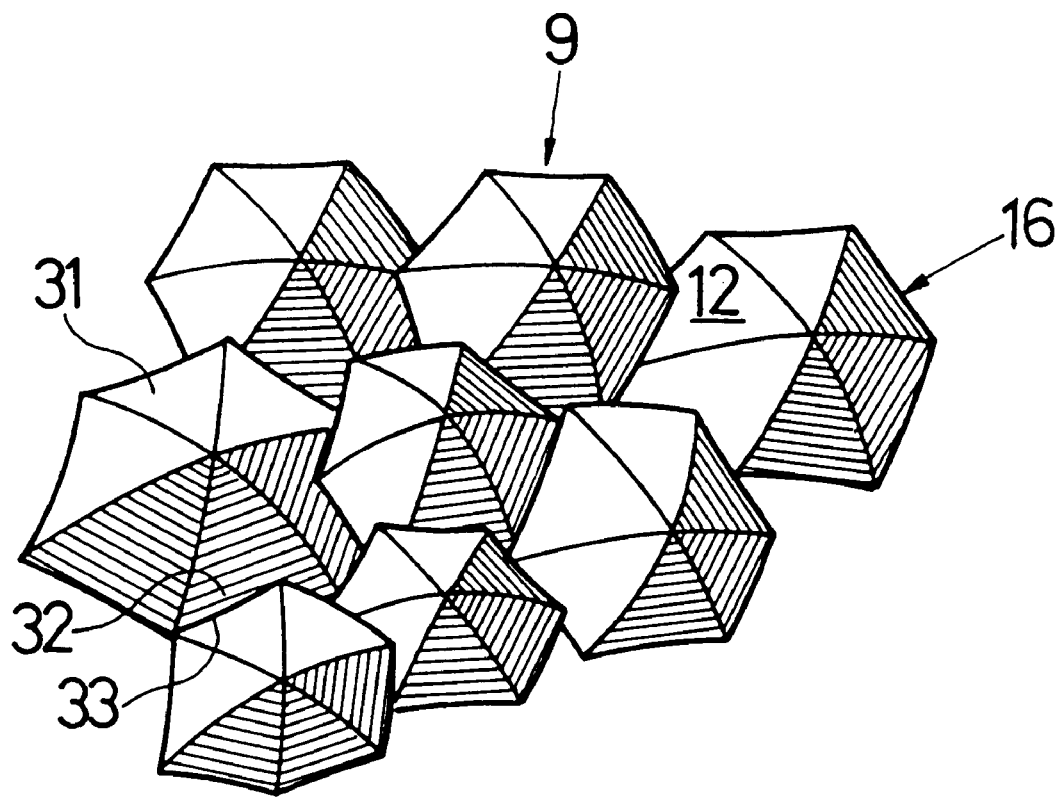
FIG. 27 is a view taken in the direction of an arrow 27 in FIG. 26.

When the columnar crystal 28 having the bcc structure as described above is the (hhh) oriented metal crystal with its (hhh) plane (by Miller indices) oriented toward the slide surface 12, the tip end of the columnar metal crystals can be formed into hexagonal pyramid-shaped metal crystals (pyramid-shaped metal crystals) 16 in the slide surface 12, as shown in FIG. 27. The hexagonal pyramid-shaped metal crystals 16 are small in average grain size and substantially uniform in grain size, as compared with trigonal pyramid-shaped metal crystals (pyramid-shaped metal crystals) which are likewise (hhh) oriented metal crystals. In the hexagonal pyramid-shaped metal crystals 16 and the like, the grain size and the height are in an interrelation to each other. Therefore, the grain sizes being substantially uniform, indicates that the heights are also substantially equal to one another.

Figure 28A:
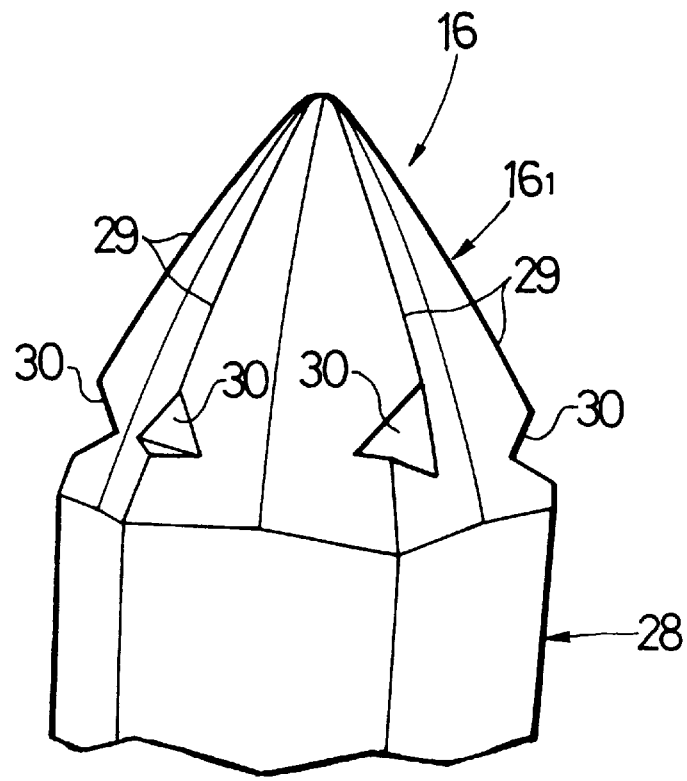
FIG. 28A is a perspective view of a heteromorphic hexagonal pyramid-shaped metal crystal.

As shown in FIGS. 26 and 28A, at least some of the hexagonal pyramid-shaped metal crystals 16 are heteromorphic hexagonal pyramid-shaped metal crystals (heteromorphic pyramid-shaped metal crystals) $16_1$. The heteromorphic hexagonal pyramid-shaped metal crystal $16_1$ has at least one notched recess 30 (one notched recess in the illustrated embodiment) in at least one ridgeline 29 (six ridgelines in the illustrated embodiment).

Figure 28B:
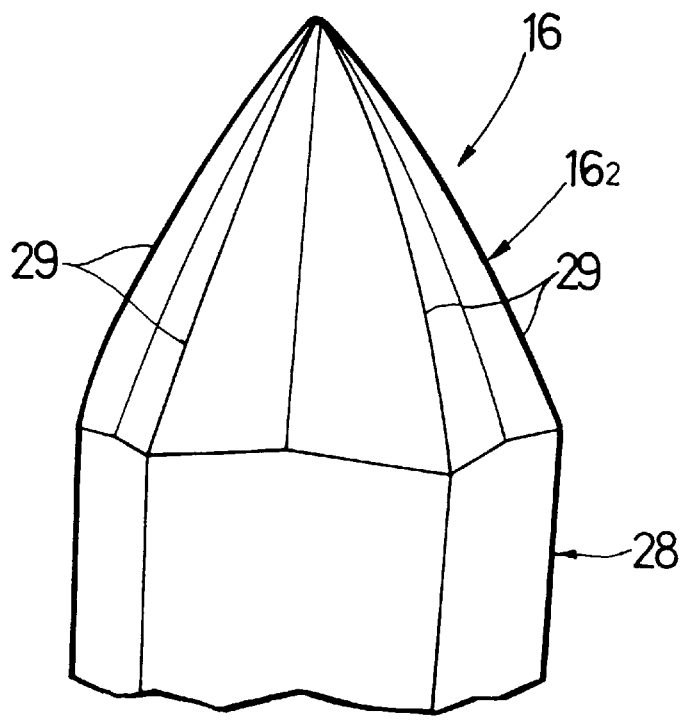
FIG. 28B is a perspective view of a normal hexagonal pyramid-shaped metal crystal.

Normal hexagonal pyramid-shaped metal crystals $16_2$ having no notched recess 30 in the ridgeline 29 as clearly shown in FIGS. 26 and 28B are included in the hexagonal pyramid-shaped metal crystals 16.

The area rate A of the hexagonal pyramid-shaped metal crystals 16 such as the normal hexagonal and heteromorphic hexagonal pyramid-shaped metal crystals $16_2$ and $16_1$ in the slide surface 12 is set in a range of $40\% \leq A \leq 100\%$. The area rate A was determined according to an equation, $A=(c/b) \times 100(\%)$, wherein b represents an area of the slide surface 12, and c represents an area occupied in the slide surface 12 by all the hexagonal pyramid-shaped metal crystals 16.

The pseudo-area rate B of the heteromorphic hexagonal pyramid-shaped metal crystals $16_1$ in the slide surface 12 is set in a range of $20\% \leq B \leq 100\%$. The pseudo-area rate B was determined in the following manner: as shown in FIG. 26, a reference line segment d having a predetermined length $L_1$ in a direction perpendicular to the direction of growth of the columnar crystals 28 is defined to pass through or in the vicinity of the bottoms of the normal hexagonal and heteromorphic hexagonal pyramid-shaped metal crystals $16_2$ and $16_1$ in a vertical section of the slide surface construction 9. The length of the heteromorphic hexagonal pyramid-shaped metal crystals $16_1$ at or in the vicinity of their bottoms in the same direction as the lengthwise direction of the reference line segment d is defined as $L_2$, and the sum of the lengths $L_2$ of all the heteromorphic hexagonal pyramid-shaped metal crystals $16_1$ included within the reference line segment d is defined as $nL_2$ (wherein n is the number of heteromorphic hexagonal pyramid-shaped metal crystals $16_1$, e.g., n=4 in the illustrated embodiment). Thus, the pseudo-area rate B was calculated according to an equation of $B = nL_2/L_1) \times 100(\%)$. A photomicrograph is used for this calculation. The reason why such a method is employed is that even if the slide surface 12 is observed from above by a microscope, the heteromorphic hexagonal pyramid-shaped metal crystals $16_1$ cannot be discriminated.

If the area rate A of the hexagonal pyramid-shaped metal crystals 16 in the slide surface 12 is set in the above-described range, adjacent ones of the hexagonal pyramid-shaped metal crystals 16 assume mutually biting states, as shown in FIG. 27. Thus, the slide surface 12 takes on a very intricate aspect comprising a large number of extremely fine crests 31, a large number of extremely fine valleys 32 formed between the crests 31, and a large number of extremely fine swamps 33 formed due to the mutual biting of the crests 31. Therefore, the slide surface 12 exhibits a good retention to solid and semi-solid lubricating agents. Moreover, because the pseudo-area rate B of the heteromorphic hexagonal pyramid-shaped metal crystals $16_1$ is set in the above-described range, the notched recesses 30 in the heteromorphic hexagonal pyramid-shaped metal crystals 16₁ exhibit an anchoring effect to the solid and semi-solid lubricating agents, thereby doubling the retention.

In such slide surface construction 9, even if it is placed in a severe sliding environment, the lubrication agent retention of the slide surface construction 9 is maintained higher under lubrication, and the dispersion of a sliding load is provided under non-lubrication by the large number of fine hexagonal pyramid-shaped metal crystals 16. Thus, the slide surface construction 9 exhibits an excellent seizure resistance both under lubrication and under non-lubrication.

Further, as a result of uniform fine division of the hexagonal pyramid-shaped metal crystals 16, a local increase in surface pressure can be avoided, and a fine division of the sliding load can be achieved. Thus, the slide surface construction 9 exhibits an excellent wear resistance not only under lubrication but also under non-lubrication.

When the columnar crystals having the bcc structure are (2hhh) oriented metal crystals with their (2hhh) planes (by Miller indices) oriented toward the slide surface 12, tip ends of the columnar crystals can be formed into small pyramid-shaped metal crystals (pyramid-shaped metal crystals).

Even when the hexagonal and trigonal pyramid-shaped metal crystals and the small pyramid-shaped metal crystals exist in the slide surface, the area rate A of the pyramid-shaped metal crystals is likewise set in a range of $40\% \leq A \leq 100\%$. Again, when the hexagonal and trigonal pyramid-shaped metal crystals and the small pyramid-shaped metal crystals exist in the slide surface, the pseudo-area rate B of the heteromorphic pyramid-shaped metal crystals is likewise set in a range of $20\% \leq B \leq 100\%$.

As shown in FIG. 8, the inclination of the (hhh) plane with respect to the phantom plane 18 along the slide surface 18 appears as the inclination of the hexagonal pyramid-shaped metal crystals 16 and hence, an influence is imparted to the lubricant retention and the wear resistance of the slide surface construction 9. The inclination angle $\theta$ formed by the (hhh) plane with respect to the phantom plane 18 is set in a range of $0° \leq \theta \leq 15°$, as in the first embodiment. In this case, the direction of inclination of the (hhh) plane is not limited. If the inclination angle $\theta$ is higher than 15°, the lubricant retention and the wear resistance of the slide surface construction 9 are reduced. The inclination $\theta$ also applies to the (2hhh) plane.

Examples of the metal crystals having the bcc structure are those of simple metals such as Fe, Cr, Mo, W, Ta, Zr, Nb, V and the like, or those of alloys thereof, as in the first embodiment.

In the electrolytic plating process for forming the slide surface construction 9, the conditions for a plating bath in carrying out an electrolytic Fe plating are as shown in Table 12.

TABLE 12

| Plating bath | | |
|---|---|---|
| Ferrous sulfate (g/liter) | pH | Temperature (°C.) |
| 100–400 | 3–7 | 40–60 |

The adjustment of pH of the plating bath is carried out using ammonia water.

Figure 29:
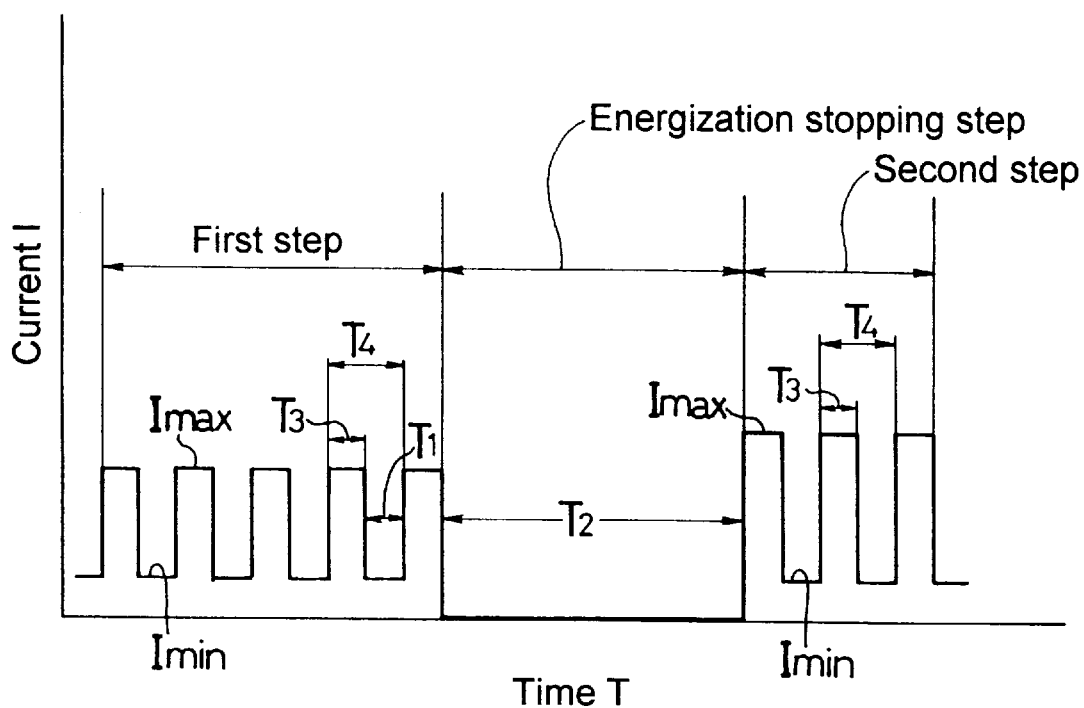
FIG. 29 is a graph of a waveform of an output from an electrolytic plating power source.

The electrolytic Fe plating process is divided into a plurality of steps (two steps, in the embodiment). In the first and second steps, a pulse current process is utilized as an energizing method. In the pulse current process, electric current I from a plating power source is controlled to describe a pulse waveform with the passage of time T, so that the current I is increased from a minimum current value Imin (including Imin=0) and reaches a maximum current value Imax, and is then dropped to the minimum current value Imin, as shown in FIG. 29.

An energization stopping step for bringing the energizing electric current into zero is interposed between the first step (the proceeding step) and the second step (the succeeding step). A relationship, $T_2 \geq 100 \, T_1$ is established between the time $T_2$ required for the energization stopping step and the minimum electric current maintaining time $T_1$ in the first step. In this case, the minimum electric current maintaining time $T_1$ in the first step is set in a range of $T_1 \geq 2.2$ msec.

A relationship, $CD_2 \geq 1.2 \, CD_1$ is established between the average cathode current density $CD_2$ in the second step and the average cathode current density $CD_1$ in the first step. In this case, the average cathode current density $CD_1$ in the first step is set in a range of $CD_1 \geq 2.2$ A/dm², and the maximum cathode current density CDmax in the first and second steps is set in a range of $CDmax \geq 2.6$ A/dm².

Further, if the energization time period from the start of the increasing of the electric current I to the start of the dropping is represented by $T_3$, and a cycle time period is represented by $T_4$ wherein one cycle is defined as being from the start of the proceeding increasing to the start succeeding increasing of the electric current, the ratio of the energization time period $T_3$ to the cycle time period $T_4$, i.e., the time ratio $T_3/T_4$ is set in a range of $T_3/T_4 \leq 0.45$ in the first and second steps. If $T_3/T_4 > 0.45$, the area rate A of the pyramid-shaped Fe crystals in the slide surface may be lower than 40% in some cases, depending upon other conditions.

A slide surface construction having the above-described structure can be easily mass-produced by utilizing such electrolytic Fe plating process.

Example-1

As a simulation of a gear 26₁, a slide surface construction 9 formed of an aggregate of Fe crystals and having a thickness of 15 $\mu$m was formed by subjecting an outer periphery of one surface of a disk made of a chromemolybdenum steel (JIS SCM420, a carburized material) to an electrolytic Fe plating process comprising first and second steps or only a first step.

Table 13 shows the conditions for the plating bath for examples 1 to 15 of slide surface constructions, and Tables 14 and 15 show energizing conditions for the examples 1 to 15.

TABLE 13

| | Plating bath | | |
|---|---|---|---|
| Slide surface construction | Ferrous sulfate (g/liter) | pH | Temperature (°C.) |
| Example 1 | 400 | 6 | 55 |
| Example 2 | 300 | 6 | 55 |
| Example 3 | 250 | 5.5 | 55 |
| Example 4 | 400 | 6 | 50 |
| Example 5 | 400 | 6 | 50 |
| Example 6 | 300 | 6 | 50 |
| Example 7 | 250 | 5.5 | 50 |
| Example 8 | 400 | 6 | 50 |
| Example 9 | 300 | 6 | 50 |
| Example 10 | 250 | 5.5 | 50 |
| Example 11 | 400 | 6 | 50 |

TABLE 13-continued

| Slide surface construction | Plating bath | | |
|---|---|---|---|
| | Ferrous sulfate (g/liter) | pH | Temperature (°C.) |
| Example 12 | 300 | 6 | 50 |
| Example 13 | 250 | 5.5 | 50 |
| Example 14 | 200 | 4.5 | 50 |
| Example 15 | 200 | 3 | 50 |

TABLE 14

| Slide surface construction | First step | | | | | | Energization stopping step $T_2$ (sec) |
|---|---|---|---|---|---|---|---|
| | $T_3$ (msec) | $T_1$ (msec) | $T_3/T_4$ | $CD_1$ (A/dm²) | CDmax (A/dm²) | Plating time (min) | |
| Example 1 | 2 | 8 | 0.2 | 4 | 20 | 12 | 1 (125$T_1$) |
| Example 2 | 2 | 8 | 0.2 | 3.5 | 17.5 | 13.7 | |
| Example 3 | 2 | 8 | 0.2 | 3 | 15 | 16 | |
| Example 4 | 2 | 8 | 0.2 | 4 | 20 | 12 | |
| Example 5 | 2 | 8 | 0.2 | 4 | 20 | 12 | |
| Example 6 | 2 | 8 | 0.2 | 3.5 | 17.5 | 13.7 | |
| Example 7 | 2 | 8 | 0.2 | 3 | 15 | 16 | |

| Slide surface construction | Second step | | | | | |
|---|---|---|---|---|---|---|
| | $T_3$ (msec) | $T_1$ (msec) | $T_3/T_4$ | $CD_2$ (A/dm²) | CDmax (A/dm²) | Plating time (min) |
| Example 1 | 1 | 19 | 0.05 | 7.2 (1.8 $CD_1$) | 144 | 1.7 |
| Example 2 | 1 | 19 | 0.05 | 6.3 (1.8 $CD_1$) | 126 | 1.9 |
| Example 3 | 1 | 9 | 0.1 | 5.4 (1.8 $CD_1$) | 54 | 2.2 |
| Example 4 | 1 | 9 | 0.1 | 5.2 (1.3 $CD_1$) | 52 | 2.3 |
| Example 5 | 2 | 8 | 0.2 | 4.8 (1.2 $CD_1$) | 24 | 2.5 |
| Example 6 | 2 | 8 | 0.2 | 4.2 (1.2 $CD_1$) | 21 | 2.9 |
| Example 7 | 2 | 8 | 0.2 | 3.6 (1.2 $CD_1$) | 18 | 3.3 |

TABLE 15

| Slide surface construction | First step | | | | | | Energization stopping step $T_2$ (sec) |
|---|---|---|---|---|---|---|---|
| | $T_3$ (msec) | $T_1$ (msec) | $T_3/T_4$ | $CD_1$ (A/dm²) | CDmax (A/dm²) | Plating time (min) | |
| Example 8 | 2 | 8 | 0.2 | 4 | 20 | 12 | 1 (125$T_1$) |
| Example 9 | 2 | 8 | 0.2 | 3.5 | 17.5 | 13.7 | |
| Example 10 | 2 | 8 | 0.2 | 3 | 15 | 16 | |
| Example 11 | 2 | 8 | 0.2 | 4 | 20 | 15 | |
| Example 12 | 2 | 8 | 0.2 | 3.5 | 17.5 | 17.1 | |
| Example 13 | 2 | 8 | 0.2 | 3 | 15 | 20 | |
| Example 14 | 2 | 8 | 0.2 | 3.5 | 17.5 | 17.1 | |
| Example 15 | 2 | 8 | 0.2 | 0.5 | 2.5 | 120 | |

| Slide surface construction | Second step | | | | | |
|---|---|---|---|---|---|---|
| | $T_3$ (msec) | $T_1$ (msec) | $T_3/T_4$ | $CD_2$ (A/dm²) | CDmax (A/dm²) | Plating time (min) |
| Example 8 | 3 | 7 | 0.3 | 4.4 (1.1 $CD_1$) | 14.7 | 2.7 |
| Example 9 | 3 | 7 | 0.3 | 3.9 (1.1 $CD_1$) | 13 | 3.1 |
| Example 10 | 3 | 7 | 0.3 | 3.3 (1.1 $CD_1$) | 11 | 3.6 |
| Example 11 | — | — | — | — | — | — |
| Example 12 | — | — | — | — | — | — |
| Example 13 | — | — | — | — | — | — |
| Example 14 | — | — | — | — | — | — |
| Example 15 | — | — | — | — | — | — |

Table 16 shows the content S of the oriented Fe crystals for the examples 1 to 15.

TABLE 16

| Slide surface construction | Content S (%) of oriented Fe crystals | | | | |
|---|---|---|---|---|---|
| | {110} | {200} | {211} | {310} | {222} |
| Example 1 | 0 | 0 | 3.8 | 0 | 96.2 |
| Example 2 | 7.1 | 2.8 | 20.1 | 1.1 | 68.9 |
| Example 3 | 19.3 | 4.6 | 33.8 | 2 | 40.3 |

TABLE 16-continued

| Slide surface construction | Content S (%) of oriented Fe crystals | | | | |
|---|---|---|---|---|---|
| | {110} | {200} | {211} | {310} | {222} |
| Example 4 | 0 | 0 | 3.2 | 0 | 96.8 |
| Example 5 | 0 | 0 | 2.7 | 0 | 97.3 |
| Example 6 | 6.6 | 2.5 | 18.3 | 0.5 | 72.1 |
| Example 7 | 18.7 | 5 | 34.1 | 0.7 | 41.5 |
| Example 8 | 0.3 | 0 | 4.5 | 0 | 95.2 |
| Example 9 | 6.1 | 3.1 | 19.4 | 1.2 | 70.2 |
| Example 10 | 19.5 | 4.9 | 33.1 | 1.7 | 40.8 |
| Example 11 | 0 | 0 | 3.5 | 0 | 96.5 |
| Example 12 | 6 | 3.9 | 17.6 | 2.6 | 69.9 |
| Example 13 | 21.8 | 3.5 | 30.8 | 2.4 | 41.5 |
| Example 14 | 19.4 | 12.4 | 19.7 | 13 | 35.5 |
| Example 15 | 33.6 | 16.5 | 17.5 | 17.7 | 14.7 |

Figure 30:
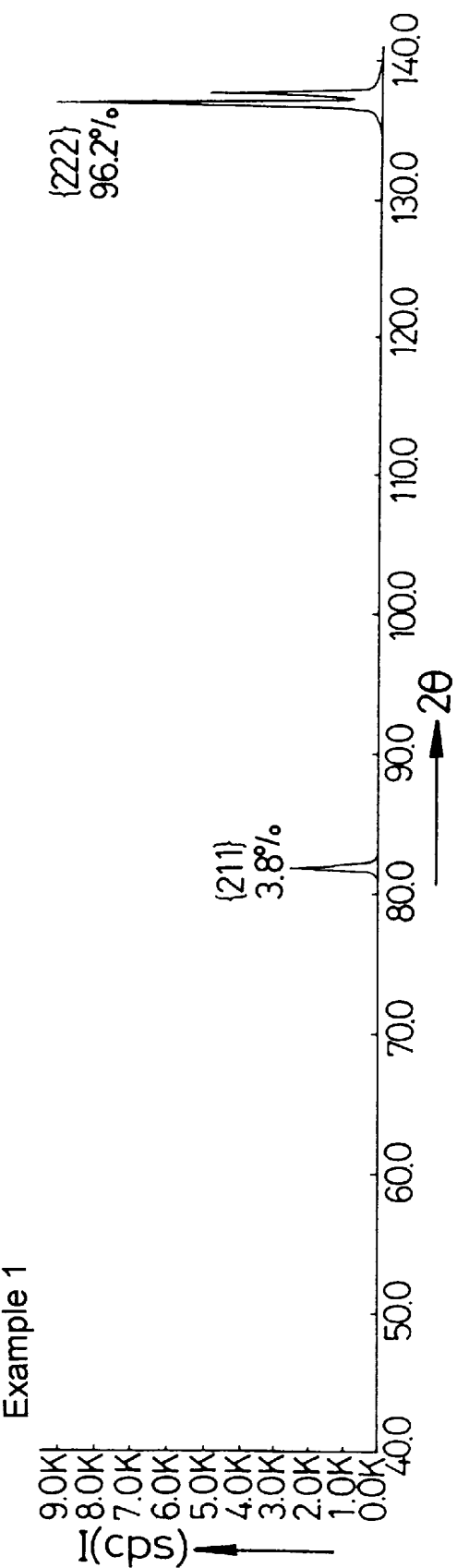
FIG. 30 is an X-ray diffraction pattern for an example 1.
Figure 31:
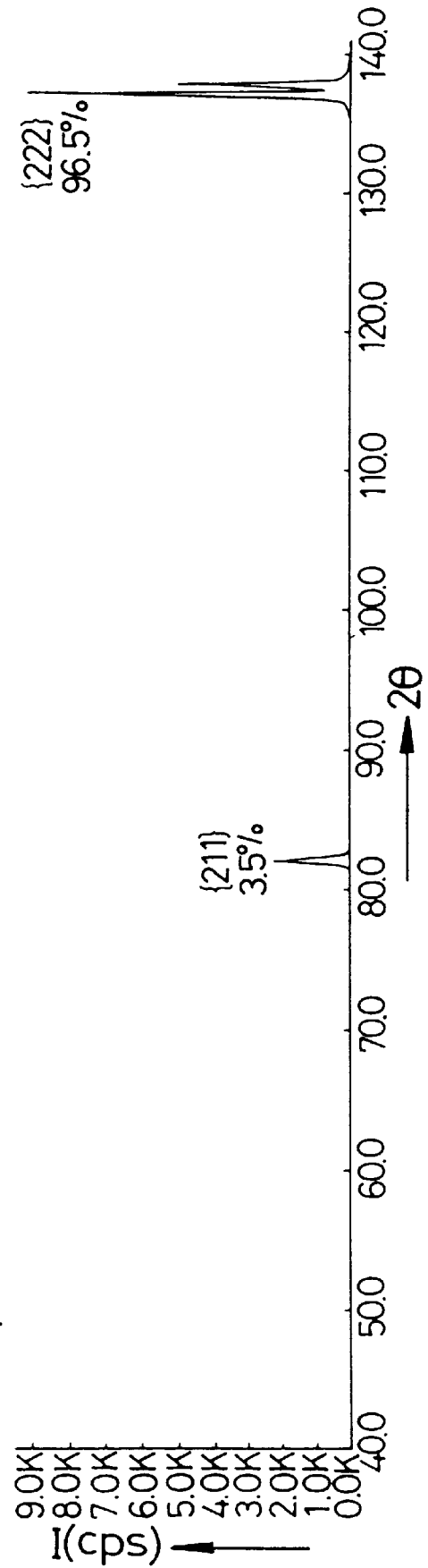
FIG. 31 is an X-ray diffraction pattern for an example 11.
Figure 32:
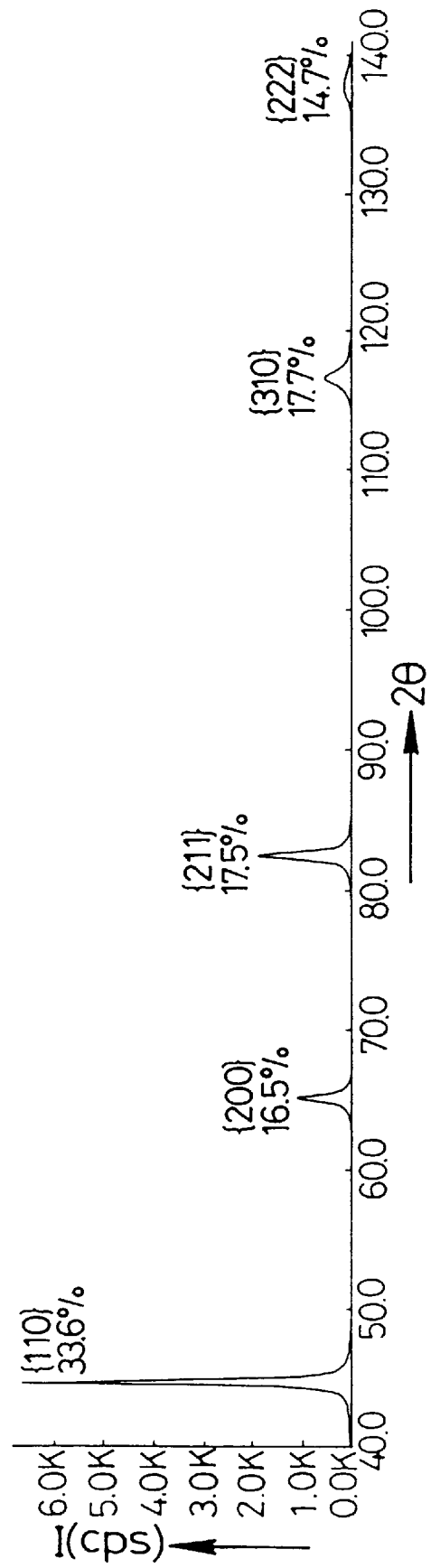
FIG. 32 is an X-ray diffraction pattern for an example 15.

The content S was determined in the same manner as in the first embodiment, based on the X-ray diffraction patterns (X-ray was applied in a direction perpendicular to the slide surface) for the examples 1 to 15. FIG. 30 is the X-ray diffraction pattern for the example 1; FIG. 31 is the X-ray diffraction pattern for the example 11, and FIG. 32 is the X-ray diffraction pattern for the example 15.

Table 17 shows the crystal form of the slide surface, the area rate A and grain size of the hexagonal pyramid-shaped Fe crystals in the slide surface, the pseudo-area rate B of heteromorphic hexagonal pyramid-shaped Fe crystals, and the hardness of a vertical section of the slide surface construction.

The grain size of the hexagonal pyramid-shaped Fe crystals is an average value of distances between opposed corners on the opposite sides of an apex, i.e., of lengths of three diagonal lines. In calculating the pseudo-area rate B of the heteromorphic hexagonal pyramid-shaped Fe crystals, a notch was provided in a disk, and then, the disk was cooled for 5 minutes or more in liquid nitrogen. Thereafter, the disk and the slide surface construction were broken at the notch, and a photomicrograph of the vertical section of the slide surface construction was taken. In this way, the pseudo-area rate B of the heteromorphic hexagonal pyramid-shaped Fe crystals was determined based on such photomicrograph in the above-described manner.

Figure 33A:
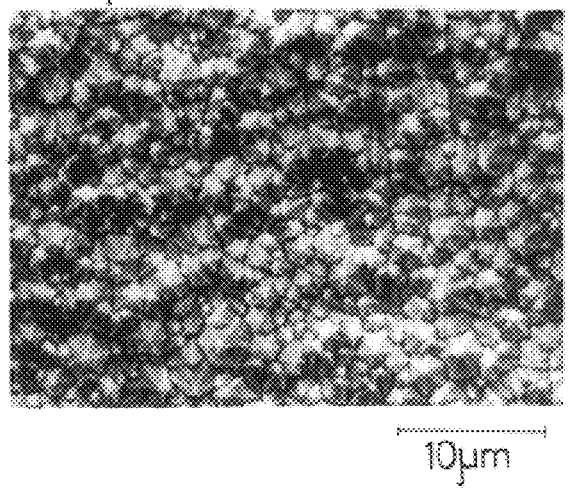
FIG. 33A is a photomicrograph showing the crystal structure of the slide surface of the example 1.
Figure 33B:
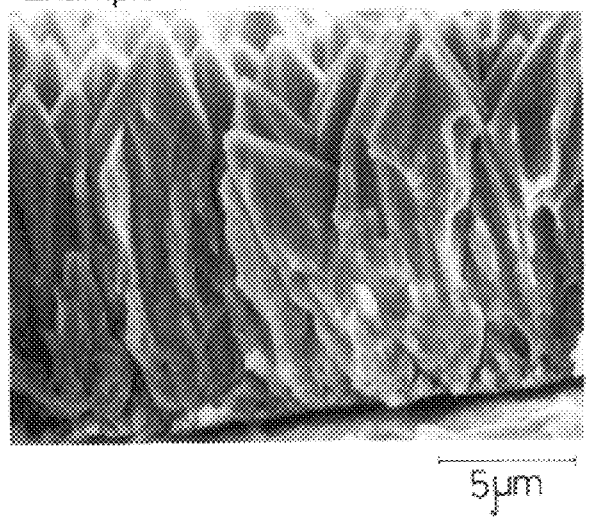
FIG. 33B is a photomicrograph showing the crystal structure of a vertical section of the example 1.
Figure 33C:
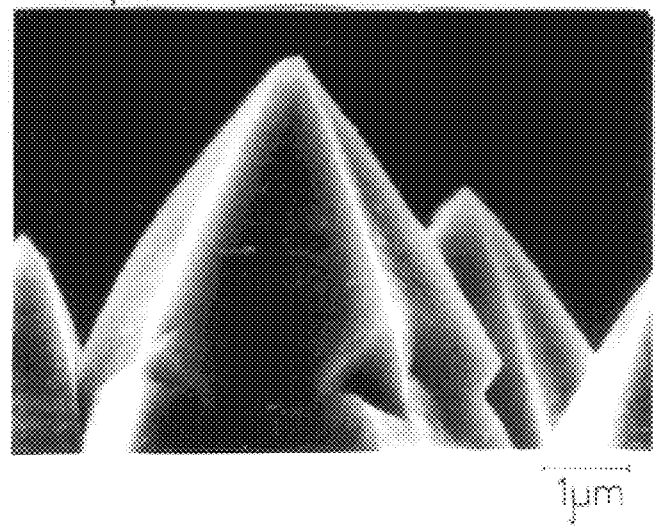
FIG. 33C is an enlarged photomicrograph of an essential portion shown in FIG. 33B.

FIG. 33 A is a photomicrograph showing the crystal structure of the slide surface in the example 1, and FIG. 33B is a photomicrograph showing the crystal structure of a vertical section in the example 1. FIG. 33C is an enlarged photomicrograph showing an essential portion shown in FIG. 33B. In FIG. 33A, a large number of hexagonal pyramid-shaped Fe crystals are observed. In this case, the area rate A of the hexagonal pyramid-shaped Fe crystals is equal to 100%, as shown in Table 17. Each of the hexagonal pyramid-shaped Fe crystal is a {222} oriented Fe crystal with its (hhh) plane, i.e., {222} plane oriented toward the slide surface. The content S of the {222} oriented Fe crystals is equal to 96.2%, as shown in Table 16 and FIG. 30. The hexagonal pyramid-shaped Fe crystal are heteromorphic hexagonal pyramid-shaped Fe crystals each having notched recess(es), as apparent from FIGS. 33B and 33C. The pseudo-area rate B of the heteromorphic hexagonal pyramid-shaped Fe crystals is equal to 100%, as shown in Table 17.

TABLE 17

| Slide Surface Construction | Crystal form of slide surface | Hexagonal pyramid shaped Fe crystals | | Pseudo-area rate B (%) of heteromorphic hexagonal pyramid-shaped Fe crystals | Hardness HmV |
|---|---|---|---|---|---|
| | | Area rate A (%) | Grain size (μm) | | |
| Example 1 | hexagonal pyramid-shaped | 100 | 2.5 | 100 | 405 |
| Example 2 | hexagonal pyramid-shaped, small pyramid-shaped and granular | 70 | 2.7 | 72.4 | 381 |
| Example 3 | hexagonal pyramid-shaped and granular | 40 | 3.3 | 41.1 | 293 |
| Example 4 | hexagonal pyramid-shaped | 100 | 2.5 | 40.8 | 398 |
| Example 5 | hexagonal pyramid-shaped | 100 | 2.5 | 20.5 | 401 |
| Example 6 | hexagonal pyramid-shaped, small pyramid-shaped and granular | 70 | 2.8 | 20.1 | 390 |
| Example 7 | hexagonal pyramid-shaped and granular | 40 | 3.3 | 20.8 | 305 |
| Example 8 | hexagonal pyramid-shaped | 100 | 2.5 | 19.1 | 399 |
| Example 9 | hexagonal pyramid-shaped, small pyramid-shaped and granular | 70 | 2.7 | 19.3 | 390 |
| Example 10 | hexagonal pyramid-shaped and granular | 40 | 3.3 | 18.8 | 305 |
| Example 11 | hexagonal pyramid-shaped | 100 | 2.5 | 0 | 395 |
| Example 12 | hexagonal pyramid-shaped, small pyramid-shaped and granular | 70 | 2.7 | 0 | 379 |
| Example 13 | hexagonal pyramid-shaped and granular | 40 | 3.3 | 0 | 288 |
| Example 14 | hexagonal pyramid-shaped and granular | 35 | 1.8 | 0 | 216 |
| Example 15 | granular | 0 | ≦0.1 | 0 | 175 |

Figure 34:
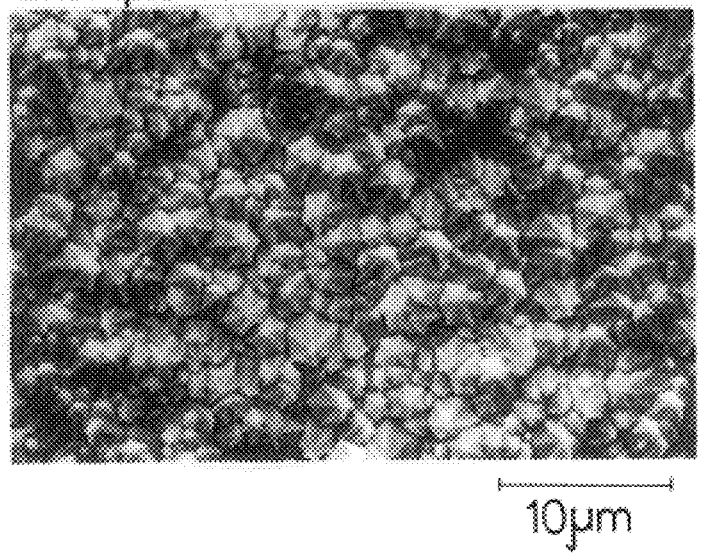
FIG. 34 is a photomicrograph showing the crystal structure of the slide surface of the example 11.

FIG. 34 is a photomicrograph showing the crystal structure of the slide surface in the example 11, wherein a large number of hexagonal pyramid-shaped Fe crystals are observed. In this case, the area rate A of the hexagonal pyramid-shaped Fe crystals is equal to 100%, as shown in Table 17. Each of the hexagonal pyramid-shaped Fe crystals is likewise a {222} oriented Fe crystal. The content S of the {222} oriented Fe crystals is equal to 96.5%, as shown in Table 16 and FIG. 31. However, the hexagonal pyramid-shaped Fe crystal are normal hexagonal pyramid-shaped Fe crystals and hence, the pseudo-area rate B of the heteromorphic hexagonal pyramid-shaped Fe crystals is equal to 0%, as shown in Table 17.

Figure 35:
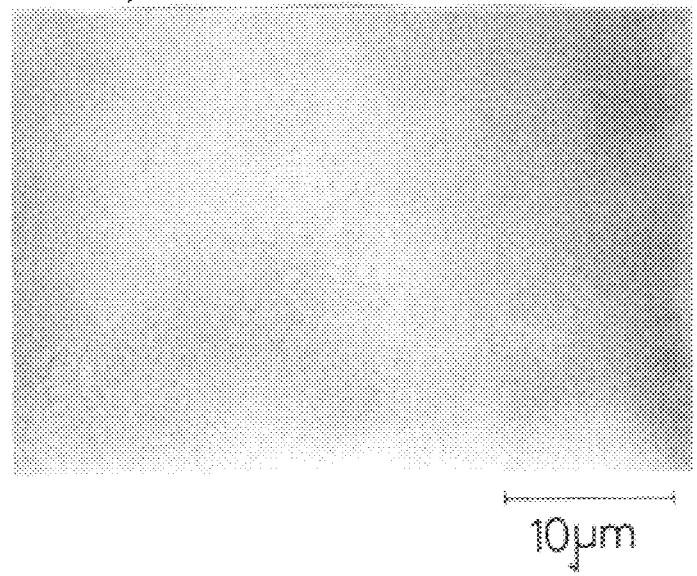
FIG. 35 is a photomicrograph showing the crystal structure of the slide surface of the example 15.

FIG. 35 is a photomicrograph showing the crystal structure of the slide surface in the example 15, wherein a large number of granular Fe crystals are observed. In this case, the area rate of the hexagonal pyramid-shaped Fe crystals is equal to 0%, as shown in Table 17.

Then, disks having the slide surface construction of the examples 1 to 15 were subjected to a seizure test in a chip-on-disk manner under lubrication to measure the seizure generating load, thereby providing the results given in Table 18. The conditions for the seizure test were as follows: the material for the chip was chromemolybdenum steel (JIS SCM429, a carburized material); the peripheral speed of the disk was 15 m/sec; the lubricating method was to apply a molybdenum disulfide onto a surface of each example of the disk; the area of the slide surface of the chip was 1 cm$^2$; and the method for applying load to the chip was to apply first a load of 20 N and maintain it for 2 minutes and after that, the load was increased in sequence by 20 N while maintaining it for 2 minutes each time the load was increased.

TABLE 18

| Slide surface construction | Seizure generating load (N) |
| --- | --- |
| Example 1 | 740 |
| Example 2 | 710 |
| Example 3 | 630 |
| Example 4 | 650 |
| Example 5 | 550 |
| Example 6 | 540 |
| Example 7 | 520 |
| Example 8 | 410 |
| Example 9 | 410 |
| Example 10 | 380 |
| Example 11 | 400 |
| Example 12 | 400 |
| Example 13 | 370 |
| Example 14 | 230 |
| Example 15 | 220 |

Figure 36:
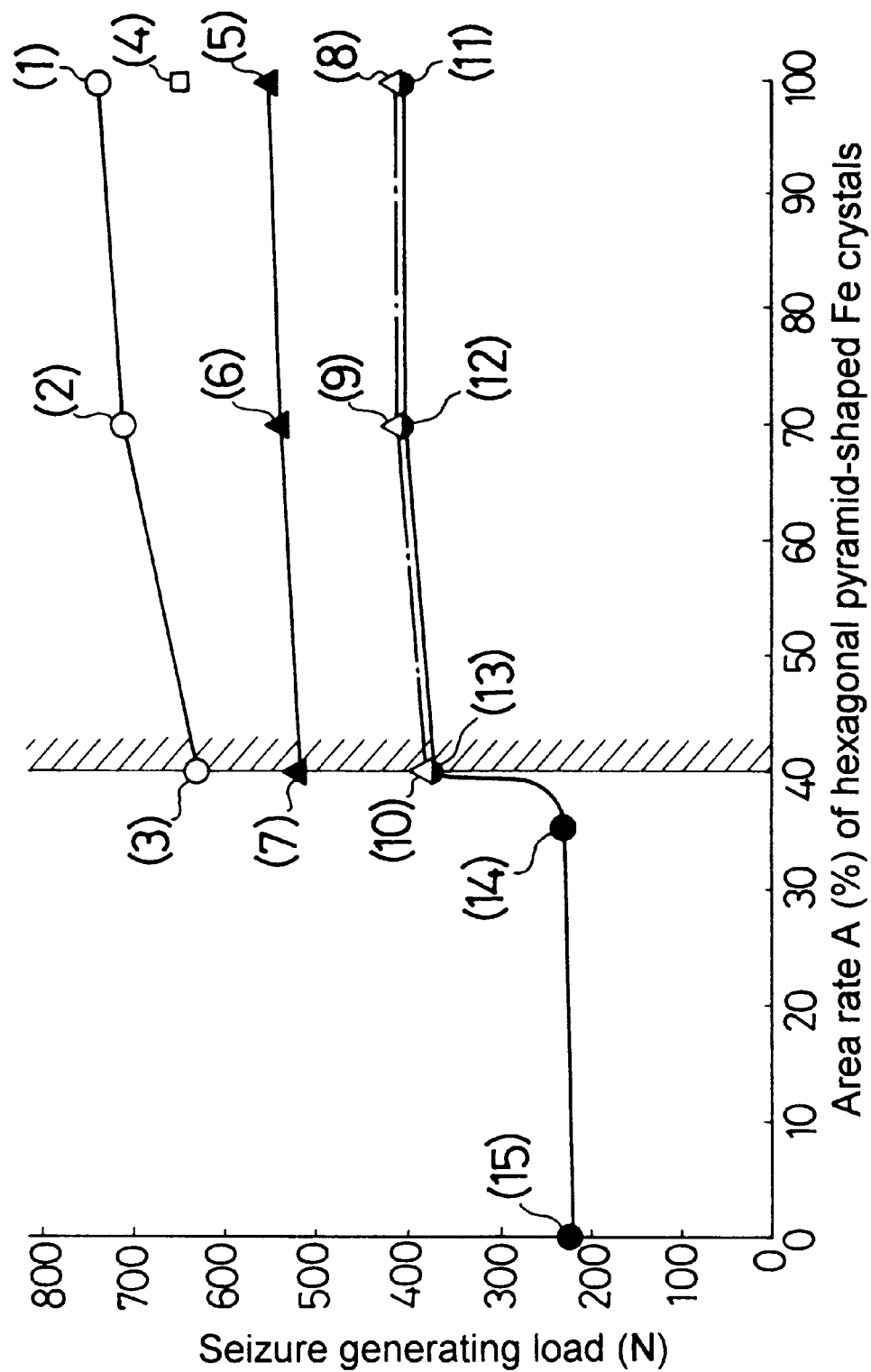
FIG. 36 is a graph illustrating the relationship between the area rate A of hexagonal pyramid-shaped Fe crystals and the seizure generating load.

FIG. 36 shows the relationship between the area rate A of the hexagonal pyramid-shaped Fe crystals and the seizure generating load.

If the examples 1 to 13 are compared with the examples 14 and 15 in FIG. 36, the former examples are substantially higher in seizure generating load, as compared with the latter examples. From this, it can be seen that the area rate of the hexagonal pyramid-shaped Fe crystals in the slide surface advantageously may be set in a range of A≧40%.

If the examples 1 to 7 are compared with the examples 8 to 13 when the area rate A is equal to or higher than 40%, the former examples have a seizure resistance superior to the latter examples. From this, it can be seen that the pseudo-area rate B of the heteromorphic hexagonal pyramid-shaped Fe crystals advantageously may be set in a range of B≧20%.

Then, using disks having the construction of examples 1 to 3 and 11 to 15, the dynamic friction coefficient μ was measured in a chip-on-disk manner under lubrication, thereby providing the results given in Table 19. The conditions for this test are were follows: the material for the chip was chromemolybdenum steel (JIS SCM420, a carburized material); the peripheral speed of the disk was 15 m/sec; a lubricating oil corresponding to 10W-30 at room temperature (in SAE viscosity classification) was used; the amount of oil supplied was 40 ml/min; the area of the slide surface of the chip was 1 cm$^2$; the method for applying load to the chip was to first apply a load of 50 N and maintain it for 2 minutes and after that, the load was increased in sequence by 50 N while maintaining it each time the load was increased. When the load reached 250 N, the chip was maintained for 5 minutes and the dynamic friction coefficient μ was measured.

TABLE 19

| Slide surface construction | Dynamic friction coefficient μ |
| --- | --- |
| Example 1 | 0.014 |
| Example 2 | 0.014 |
| Example 3 | 0.016 |
| Example 11 | 0.013 |
| Example 12 | 0.014 |
| Example 13 | 0.015 |
| Example 14 | 0.04 |
| Example 15 | 0.042 |

Figure 37:
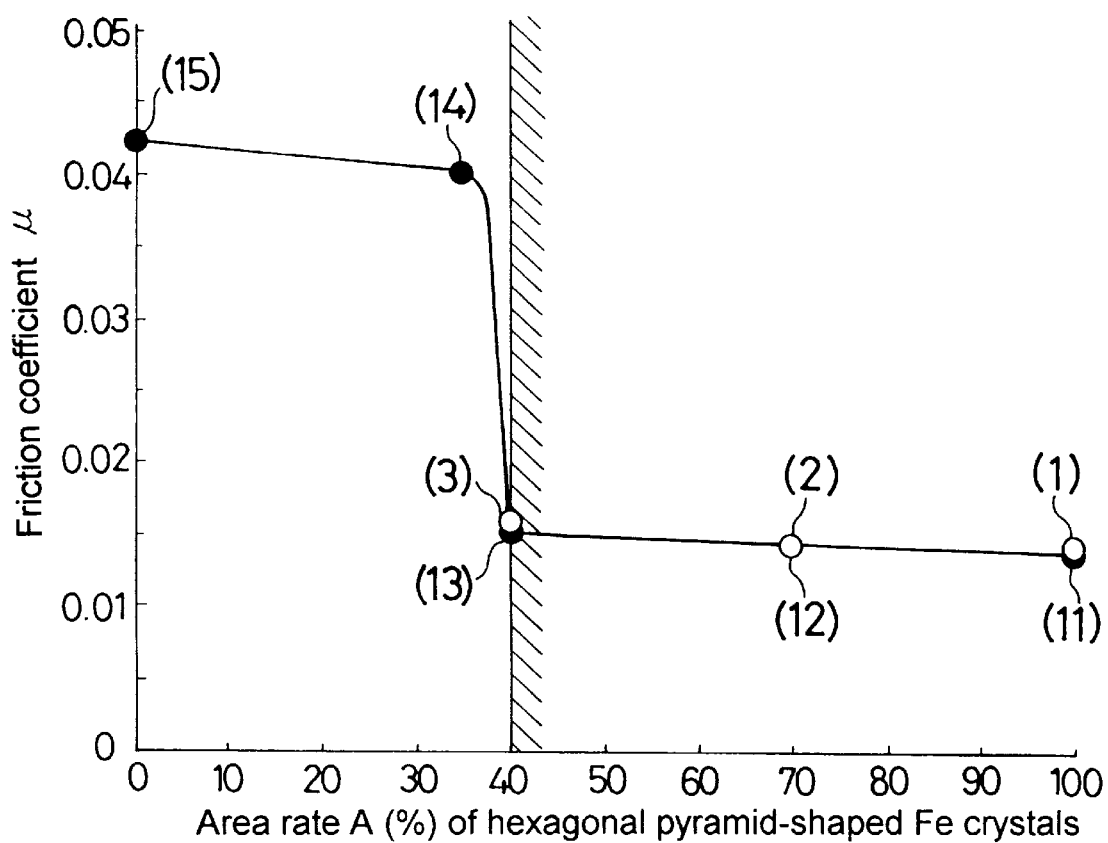
FIG. 37 is a graph illustrating the relationship between the area rate A of hexagonal pyramid-shaped Fe crystals and the dynamic friction coefficient $\mu$.

FIG. 37 shows the relationship between the area rate A of the hexagonal pyramid-shaped Fe crystals and the dynamic friction coefficient μ.

As is apparent from FIG. 37, when the area rate A of the hexagonal pyramid-shaped Fe crystals in the slide surface is equal to or higher than 40%, the dynamic friction coefficients μ of the examples 1 to 3 including the heteromorphic hexagonal pyramid-shaped Fe crystals existing in the slide surface are substantially equal to those of the examples 11 to 13 including no heteromorphic hexagonal pyramid-shaped Fe crystals existing in the slide surface. From this, it can be seen that the existence of the heteromorphic hexagonal pyramid-shaped Fe crystals in the slide surface does not exert any influence on the wear resistance of the slide surface construction.

Example-2

A slide surface construction 9 formed of an aggregate of Fe crystals and having a thickness of 15 μm was formed on a meshed face 27 of a gear 26 made of a chromemolybdenum steel (JIS SCM420, a carburized material) by an electrolytic Fe plating process comprising first and second steps.

Table 20 shows the conditions for the plating bath for examples 1 to 12 of the slide surface construction, and Tables 21 and 22 show energizing conditions for the examples 1 to 12.

TABLE 20

| Plating bath | | |
| --- | --- | --- |
| Ferrous sulfate (g/liter) | pH | Temperature (°C.) |
| 400 | 6 | 50 |

TABLE 21

| Slide surface construction | First step | | | | | | Energization stopping step $T_2$ (msec) |
|---|---|---|---|---|---|---|---|
| | $T_3$ (msec) | $T_1$ (msec) | $T_3/T_4$ | $CD_1$ (A/dm$^2$) | CDmax (A/dm$^2$) | Plating time (min) | |
| Example 1 | 2 | 8 | 0.2 | 4 | 20 | 12 | 800 (100$T_1$) |
| Example 2 | | | | | | | |
| Example 3 | | | | | | | |
| Example 4 | | | | | | | |
| Example 5 | | | | | | | |
| Example 6 | | | | | | | 8000 (1000$T_1$) |

| Slide surface construction | Second step | | | | | |
|---|---|---|---|---|---|---|
| | $T_3$ (msec) | $T_1$ (msec) | $T_3/T_4$ | $CD_2$ (A/dm$^2$) | CDmax (A/dm$^2$) | Plating time (min) |
| Example 1 | 2 | 8 | 0.2 | 6 (1.5 $CD_1$) | 30 | 2 |
| Example 2 | | | | 5.6 (1.4 $CD_1$) | 28 | 2.1 |
| Example 3 | | | | 4.8 (1.2 $CD_1$) | 24 | 2.5 |
| Example 4 | | | | 4.4 (1.1 $CD_1$) | 22 | 2.7 |
| Example 5 | | | | 4 (1.0 $CD_1$) | 20 | 3 |
| Example 6 | | | | 5.2 (1.3 $CD_1$) | 26 | 2.3 |

TABLE 22

| Slide surface construction | First step | | | | | | Energization stopping step $T_2$ (msec) |
|---|---|---|---|---|---|---|---|
| | $T_3$ (msec) | $T_1$ (msec) | $T_3/T_4$ | $CD_1$ (A/dm$^2$) | CDmax (A/dm$^2$) | Plating time (min) | |
| Example 7 | 2 | 8 | 0.2 | 4 | 20 | 12 | 720 (90$T_1$) |
| Example 8 | | | | | | | |
| Example 9 | | | | | | | |
| Example 10 | | | | | | | |
| Example 11 | | | | | | | |
| Example 12 | | | | | | | 792 (99$T_1$) |

| Slide surface construction | Second step | | | | | |
|---|---|---|---|---|---|---|
| | $T_3$ (msec) | $T_1$ (msec) | $T_3/T_4$ | $CD_1$ (A/dm$^2$) | CDmax (A/dm$^2$) | Plating time (min) |
| Example 7 | 2 | 8 | 0.2 | 6 (1.5 $CD_1$) | 30 | 2 |
| Example 8 | | | | 5.6 (1.4 $CD_1$) | 28 | 2.1 |
| Example 9 | | | | 4.8 (1.2 $CD_1$) | 24 | 2.5 |
| Example 10 | | | | 4.4 (1.1 $CD_1$) | 22 | 2.7 |
| Example 11 | | | | 4 (1.0 $CD_1$) | 20 | 3 |
| Example 12 | | | | 5.2 (1.3 $CD_1$) | 26 | 2.3 |

Table 23 shows the content S of the oriented Fe crystals for the examples 1 to 12. The content S was determined in the same manner as in the first embodiment.

TABLE 23

| Slide surface construction | Content S (%) of oriented Fe crystals | | | | |
|---|---|---|---|---|---|
| | {110} | {200} | {211} | {310} | {222} |
| Example 1 | 0 | 0 | 1.9 | 0 | 98.1 |
| Example 2 | 0 | 0 | 3.1 | 0 | 96.9 |
| Example 3 | 0 | 0 | 2.7 | 0 | 97.3 |
| Example 4 | 0.3 | 0 | 4.5 | 0 | 95.2 |
| Example 5 | 0.2 | 0 | 3.7 | 0 | 96.1 |
| Example 6 | 0 | 0 | 3.2 | 0 | 96.8 |
| Example 7 | 0 | 0 | 4.1 | 0 | 95.9 |
| Example 8 | 0.4 | 0 | 3 | 0 | 96.6 |
| Example 9 | 0 | 0 | 2.8 | 0 | 97.2 |

TABLE 23-continued

| Slide surface | Content S (%) of oriented Fe crystals | | | | |
|---|---|---|---|---|---|
| construction | {110} | {200} | {211} | {310} | {222} |
| Example 10 | 0 | 0 | 4.2 | 0 | 95.8 |
| Example 11 | 0.1 | 0 | 3.2 | 0 | 96.7 |
| Example 12 | 0 | 0 | 3.9 | 0 | 96.1 |

Table 24 shows the crystal form of the slide surface, the area rate A and grain size of the hexagonal pyramid-shaped Fe crystals in the slide surface, the pseudo-area rate B of the heteromorphic hexagonal pyramid-shaped Fe crystals, and the hardness of a vertical section of the slide surface construction for the examples 1 to 12. The area rate A, the grain size and the pseudo-area rate B were determined in the same manner as that described above.

TABLE 24

| Slide surface construction | Crystal form of slide surface | Hexagonal pyramid-shaped Fe crystals | | Pseudo-area rate B (%) of heteromorphic hexagonal pyramid-shaped Fe crystals | Hardness HmV |
|---|---|---|---|---|---|
| | | Area rate A (%) | Grain size (μm) | | |
| Example 1 | Hexagonal pyramid-shaped | 100 | 2.5 | 100 | 408 |
| Example 2 | | | | 89.4 | |
| Example 3 | | | | 20.5 | |
| Example 4 | | | | 19.1 | |
| Example 5 | | | | 0 | |
| Example 6 | | | | 40.8 | |
| Example 7 | | | | 12.3 | |
| Example 8 | | | | 12.4 | |
| Example 9 | | | | 11.8 | |
| Example 10 | | | | 12.1 | |
| Example 11 | | | | 0 | |
| Example 12 | | | | 16.1 | |

Figure 38:
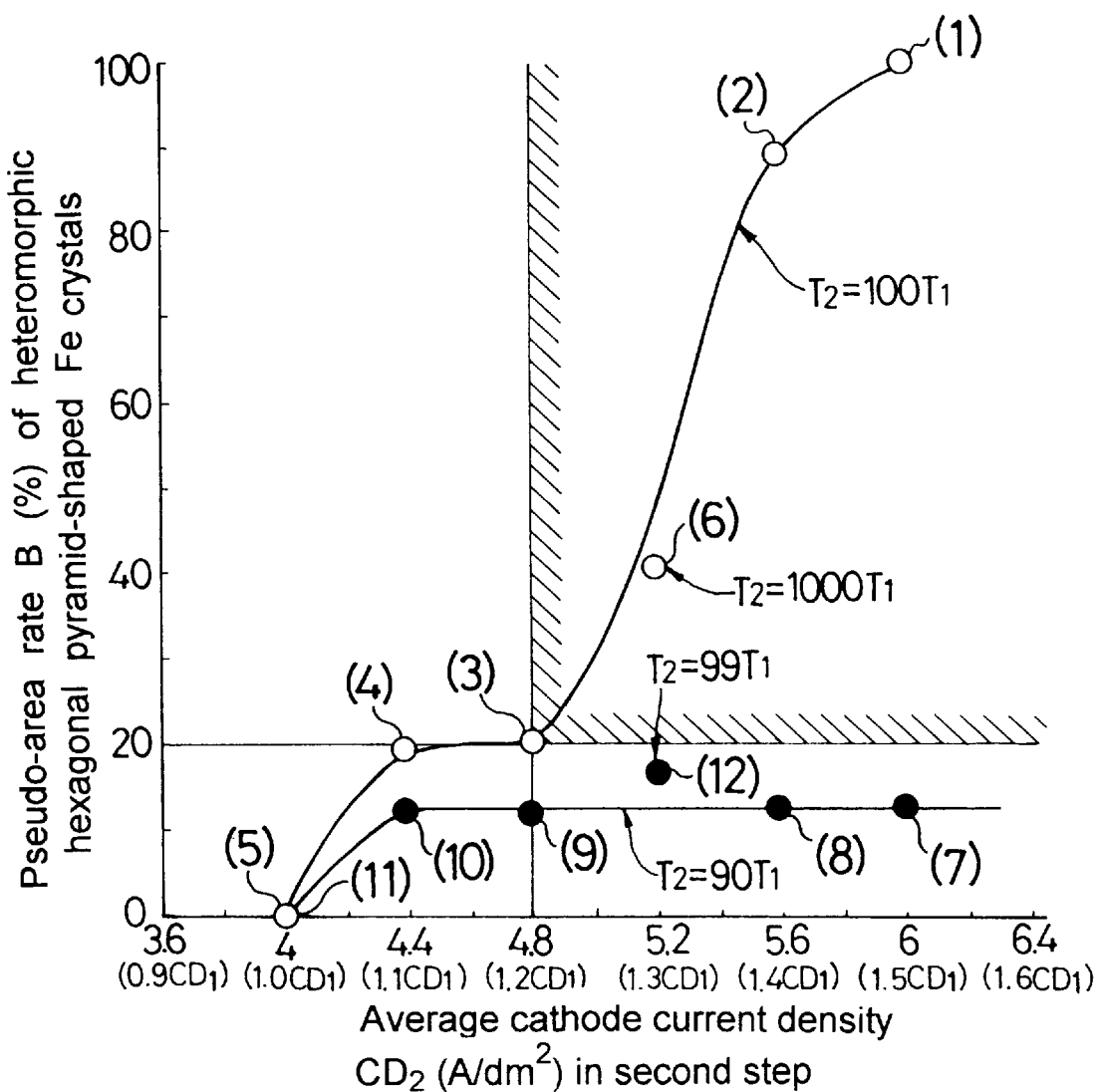
FIG. 38 is a graph illustrating the relationship between the average cathode current density in a second step and the pseudo-area rate B of heteromorphic hexagonal pyramid-shaped Fe crystals.

FIG. 38 shows the relationship between the average cathode current density $CD_2$ in the second step and the pseudo-area rate B (%) of the heteromorphic hexagonal pyramid-shaped Fe crystals by the time $T_2$ required for the energization stopping step.

As apparent from Table 24 and FIG. 38, the pseudo-area rate B of the heteromorphic hexagonal pyramid-shaped Fe crystals in the slide surface for the examples 1 to 3 and 6 is equal to or higher than 20%. From this, it may be safely mentioned that in order to set the pseudo-area rate B in a range of $B \geq 20\%$, it is necessary to establish a relation, $T_2 \geq 100 T_1$ between the time $T_2$ required for the energization stopping step and the minimum current maintaining time $T_1$, and to establish a relation, $CD_2 \geq 1.2 CD_1$ between the average cathode current density $CD_2$ in the second step and the average cathode current density $CD_2$ in the first step.

The second embodiment is not limited to the gear, and is applicable to a quick joint, an upper arm, a lower arm and the like to which a solid or semi-solid lubricating agent is applied. In this case, the responsiveness is enhanced by a reduction in friction.

THIRD EMBODIMENT

Figure 39:
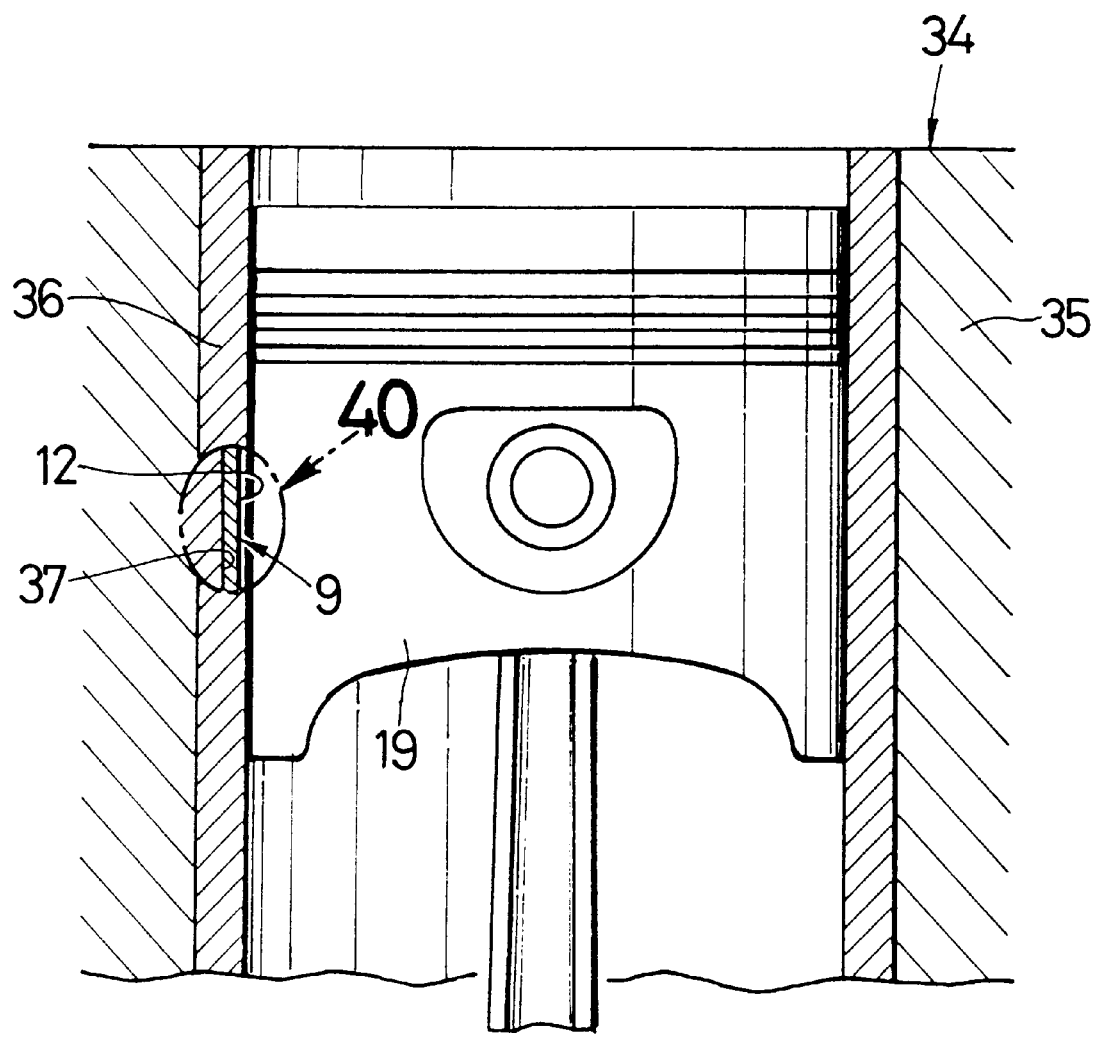
FIG. 39 is a partial vertical sectional view of an essential portion of a cylinder block including a piston.

Referring to FIG. 39, a cylinder block 34 for an internal combustion engine includes a cylinder block body 35 made of an aluminum alloy, and a cylinder sleeve 36 made of a cast iron. A lamellar slide surface construction 9 is formed on an inner peripheral surface 37 of the cylinder sleeve 36 by a plating treatment. A piston 19 made of an aluminum alloy is slidably received in the cylinder sleeve 36.

Figure 40:
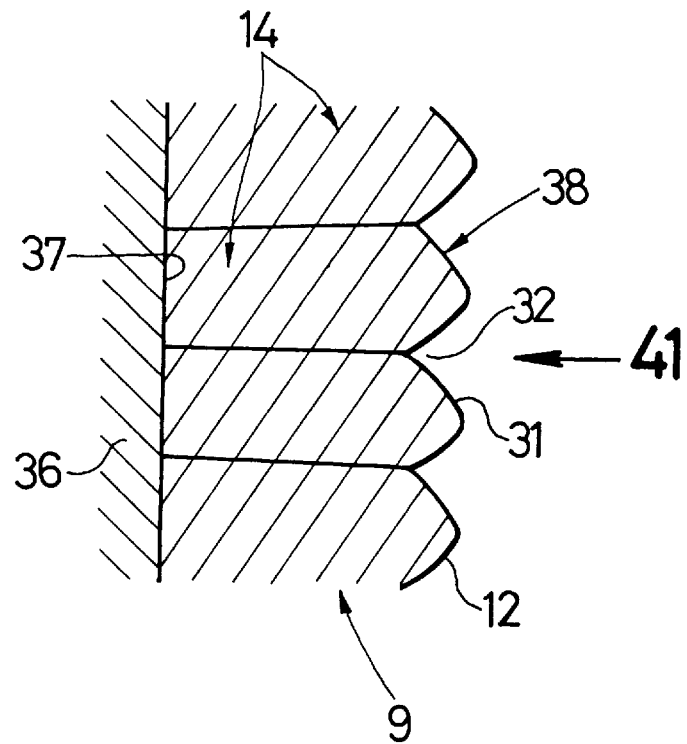
FIG. 40 an enlarged view of a portion indicated by an arrow 40 in FIG. 39.

The slide surface construction 9 is formed of an aggregate of metal crystals having a body-centered cubic structure (which will be also referred to as a bcc structure hereinafter), as shown in FIG. 5. The aggregate includes a large number of (hhh) oriented metal crystals 14 which are grown into a columnar shape from the inner peripheral surface 37 of the cylinder sleeve 36 with their (hhh) planes (by Miller indices) oriented toward a slide surface 12, or a large number of (2hhh) oriented metal crystals 14 which are grown into a columnar shape from the inner peripheral surface 37 of the cylinder sleeve 36 with their (2hhh) planes (by Miller indices) oriented toward the slide surface 12, as shown in FIG. 40.

Figure 41:
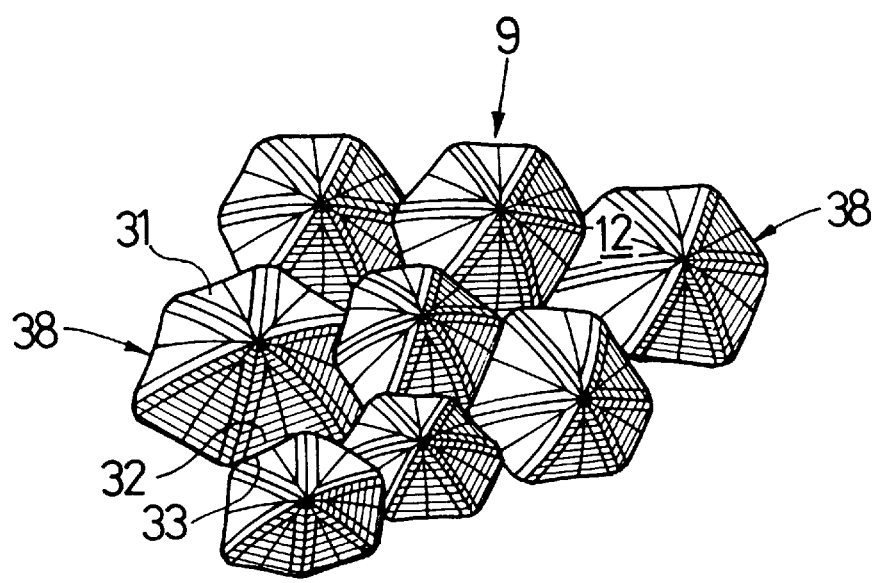
FIG. 41 is a view taken in the direction of the arrow 41 in FIG. 40.
Figure 42A:
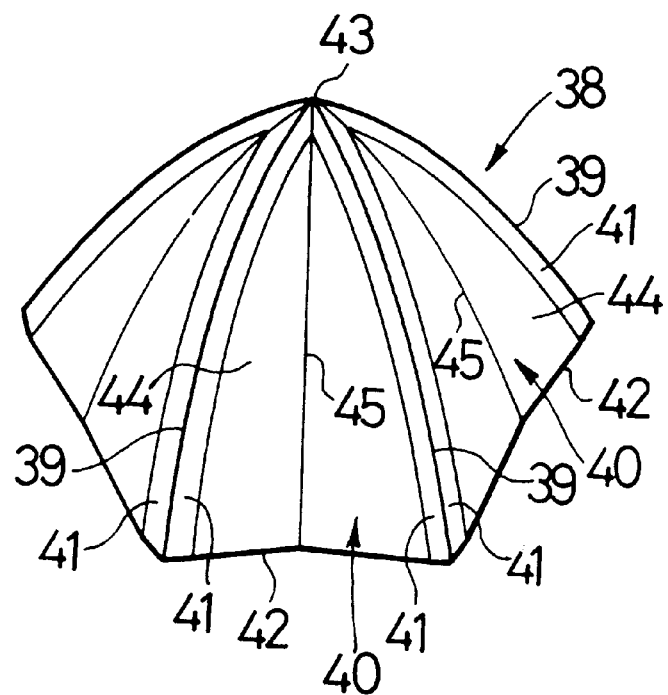
FIG. 42A is a perspective view of a rounded hexagonal pyramid-shaped metal crystal.
Figure 42B:
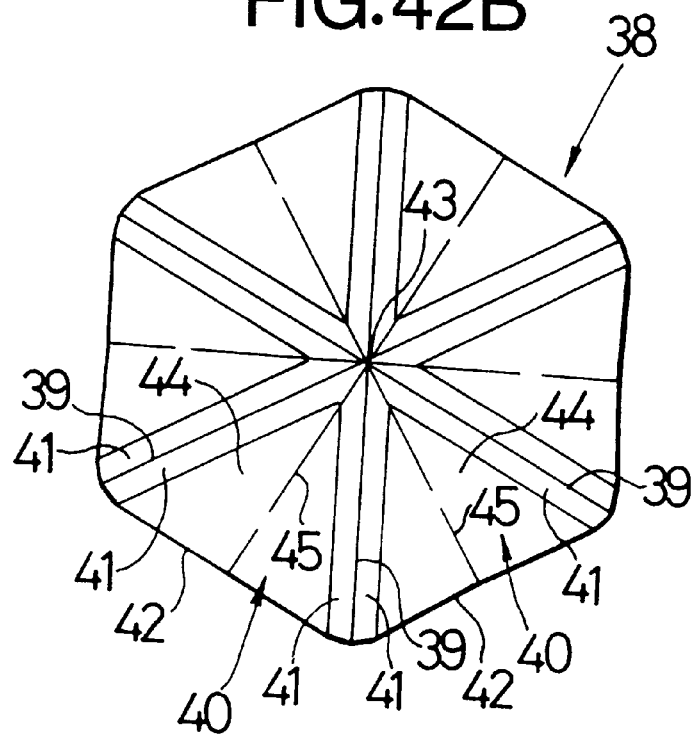
FIG. 42B is a plan view of the rounded hexagonal pyramid-shaped metal crystal.

When the aggregate of the metal crystals having the bcc structure includes the large number of (hhh) oriented metal crystals 14 grown into a columnar shape from the inner peripheral surface 37 of the cylinder sleeve 36 with their (hhh) planes (by Miller indices) oriented toward the slide surface 12, as described above, the tip ends of the (hhh) oriented metal crystals 14 can be formed into rounded hexagonal pyramid-shaped metal crystals (rounded pyramid-shaped metal crystals) 38 in the slide surface, as shown in FIGS. 41, 42A and 42B. The rounded hexagonal pyramid-shaped metal crystals 38 are small in average grain size and substantially uniform in grain size, as compared with rounded trigonal pyramid-shaped metal crystals which are likewise (hhh) oriented metal crystals. In the rounded hexagonal pyramid-shaped metal crystals 38, there is an interrelation between the grain size and the height. Therefore, the grain size being substantially uniform, indicates that the heights are substantially equal to one another.

Each of ridgelines 39 in the rounded hexagonal pyramid-shaped metal crystal 38 assumes a convex arcuate shape, and each slope-correspondence area 40 between the adjacent ridgelines 39 comprises two band-like regions each of which is one of two slopes forming each ridgeline 39, and a V groove-like region 44 which is connected to both the band-like region and whose opening width is gradually reduced from a skirt portion 42 toward an apex 43.

The area rate A of the rounded hexagonal pyramid-shaped metal crystals 38 in the slide surface 12 is set in a range of $40\% \leq A \leq 100\%$.

If the area rate A is set in such range, adjacent ones of the rounded hexagonal pyramid-shaped metal crystals 38 assume mutually biting states, as shown in FIG. 41. Thus, the slide surface takes on a very intricate aspect comprising a large number of extremely fine crests 31, a large number of extremely fine valleys 32 formed between the crests 31, and a large number of extremely fine swamps 33 formed due to the mutual biting of the crests 31.

Figure 43:
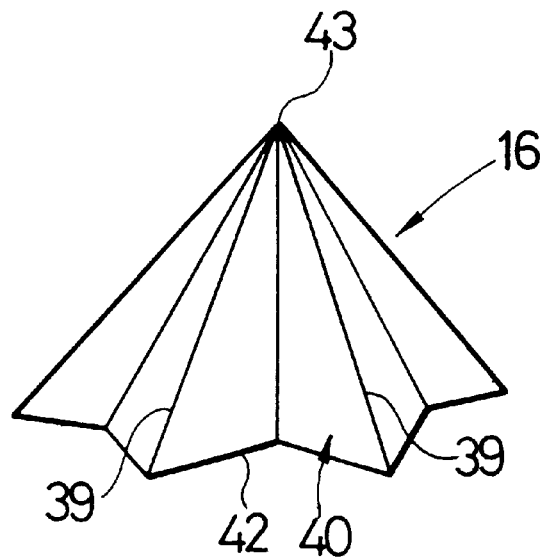
FIG. 43 is a perspective view of an angular hexagonal pyramid-shaped metal crystal.

In this case, if each of the ridgelines 39 of the hexagonal pyramid-shaped metal crystal 16 is rectilinear and the apex 43 of the hexagonal pyramid-shaped metal crystal 16 is pointed, as shown in FIG. 43, and if the slope-correspondence area 40 between the adjacent ridgelines 39 is formed into a relatively deep V groove-like shape such that the opening width is gradually reduced from the skirt portion 42 toward the apex 43, namely, if the hexagonal pyramid-shaped metal crystals 16 are angular, the flow of oil lacks a smoothness, when the viscosity of the oil is high at a lower temperature or the like, because the angular pyramid-shaped metal crystals 16 performs an occluding effect.

In contrast, if the rounded pyramid-shaped metal crystals 38 as described above are formed to exist in the slide surface 12, the flow resistance of the oil with a high viscosity is reduced in the slide surface 12 and therefore, the oil can be allowed to flow smoothly. Thus, the shear resistance of an oil film formed on the slide surface 12 can be reduced to reduce the friction loss.

From the fact that the slide surface 12 takes on the very intricate aspect, as described above, the slide surface construction 9 has a good oil retention, substantially irrespective of the viscosity of the oil. Thus, the slide surface construction 9 exhibits an excellent seizure resistance, even if it is placed in a severe sliding environment. On the other hand, even under non-lubrication, the dispersion of a sliding load is provided by the large number of fine rounded hexagonal pyramid-shaped metal crystals 38 and therefore, the seizure resistance of the slide surface construction 9 is relatively good.

Further, as a result, uniform fine division of the rounded hexagonal pyramid-shaped metal crystals 38, a local increase in surface pressure can be avoided and a fine division of the sliding load can be achieved. Thus, the slide surface construction 9 exhibits an excellent wear resistance not only under lubrication but also under non-lubrication.

In the rounded hexagonal pyramid-shaped metal crystals 38, it is possible to form a valley portion 45 of the V groove-like region 44, so that the valley portion 45 assumes a convex arcuate shape to follow the ridgeline 39. If the valley portion 45 is formed in this manner, the V groove-like region 44 becomes narrow and hence, the flowability of a high-viscosity oil can be further enhanced.

When the aggregate of the metal crystals having the bcc structure includes the large number of (2hhh) oriented metal crystals with their (2hhh) plane (by Miller indices) oriented toward the slide surface 12, the tip ends of the (2hhh) oriented metal crystals can be formed into rounded small pyramid-shaped metal crystals. Even when the rounded pyramid-shaped metal crystals such as the rounded hexagonal and trigonal pyramid-shaped and small pyramid-shaped metal crystals exists in combination in the slide surface 12, the area rate A of these rounded pyramid-shaped metal crystals in the slide surface 12 is set in a range of $40\% \leq A \leq 100\%$.

As shown in FIG. 8, the inclination of the (hhh) plane with respect to the phantom plane 18 along the slide surface 12 appears as the inclination of the rounded hexagonal pyramid-shaped metal crystals 38 and the like and hence, an influence is imparted to the oil retention and the wear resistance of the slide surface construction. The inclination angle θ formed by the (hhh) plane with respect to the phantom plane 18 is set in a range of $0° \leq \theta \leq 15°$ as in the first embodiment. In this case, the direction of inclination of the (hhh) plane is not limited. If the inclination angle θ is larger than 15°, the oil retention and the wear resistance of the first region $R_1$ are reduced. The inclination angle θ also applies to the (2hhh) plane.

Examples of the metal crystals having the bcc structure are those of simple metals such as Fe, Cr, Mo, W, Ta, Zr, Nb, V and the like, or those of alloys thereof, as in the first embodiment.

In the plating treatment for forming the slide surface construction 9, the conditions for the plating bath in carrying out an electrolytic Fe plating are as shown in Table 25.

TABLE 25

| Plating bath | | |
|---|---|---|
| Ferrous sulfate (g/liter) | pH | Temperature (°C.) |
| 100–400 | 3–7 | 40–70 |

The adjustment of pH is carried out using ammonia water.

A pulse current process is mainly utilized as an energizing method, as shown in FIG. 9, as in the first embodiment. In the pulse current process, if an energization time from the start of increasing to the start of dropping of an electric current I is represented by $T_{ON}$, and a cycle time is represented by $T_C$, wherein one cycle is defined as being from the start of proceeding increasing to the start of succeeding increasing, the ratio of the energization time $T_{ON}$ to the cycle time $T_C$, i.e., the time ratio $Y_{ON}/T_C$ is set in a range of $T_{ON}/T_C \leq 0.45$. The maximum cathode current density CDmax is set in a range of CDmax $\geq 0.22$ A/dm$^2$, and the average cathode density CDm is set in a range of 0.1 A/dm$^2 \leq$ CDm $\leq 10$ A/dm$^2$.

If such a pulse current process is utilized, the ion concentration in the vicinity of a cathode is uniformized due to the fact that the maximum electric current alternately flows and does not flow in the plating bath. Thus, the composition of the slide surface construction can be stabilized.

In the above-described electrolytic Fe plating process, the precipitation and content of the (hhh) oriented Fe crystals or the (2hhh) oriented Fe crystals and the like are controlled by changing the plating bath conditions and the energizing conditions. This control is easy under the utilization of the pulse current process and hence, the slide surface 12 is easily formed into an intended form.

In addition to the electrolytic Fe plating, other examples of a plating process are a PVD process, a CVD process, a sputtering process, an ion plating and the like, which are gas-phase plating processes. The conditions for carrying out a W or Mo plating by the sputtering process were as follows: For example, the Ar gas pressure was 0.2 to 1 Pa; the average Ar gas accelerating electric power was D.C. 1 to 2.5 kW; and the substrate temperature was 150 to 450° C. The conditions for carrying out a W plating by the CVD process were as follows: For example, the starting material was WF6; the flow rate of a gas was 2 to 15 cc/min; the pressure in a chamber was 50 to 300 Pa; the substrate temperature was 400 to 650° C.; and the average output of ArF excimer laser was 5 to 60 W.

A specified example will be described below.

Figure 44:
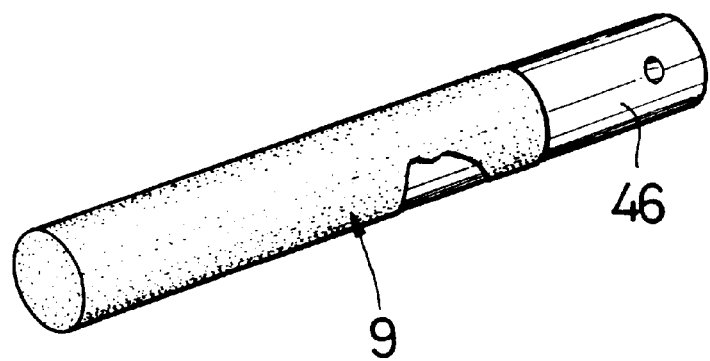
FIG. 44 is a broken-away perspective view of a round bar having a slide surface construction.

For simulating of a cylinder sleeve 36, as shown in FIG. 44, a slide surface construction 9 formed of an aggregate of Fe crystals and having a thickness of 15 μm was formed by subjecting an outer peripheral surface of a round bar 46 made of cast iron (JIS FC250) and having a diameter of 6.5 mm to an electrolytic Fe plating process.

Table 26 shows the conditions for the electrolytic Fe plating process for examples 1 to 8 of the slide surface construction. The plating time was varied within 5 to 60 minutes in order to set the thickness of the examples 1 to 8 at 15 μm, as described above.

The area rate A of the rounded and angular hexagonal pyramid-shaped Fe crystals was determined according to an equation, $A=(c/b \times 100(\%))$, wherein b represents an area of the slide surface, and c represents an area occupied by all the rounded and angular hexagonal pyramid-shaped Fe crystals in the slide surface. The grain size of the rounded and angular hexagonal pyramid-shaped Fe crystals is an average value of distances between opposed corners on the opposite sides of an apex, i.e., of lengths of three diagonal lines.

TABLE 26

| Slide surface construction | Plating bath | | | Pulse current process | | | |
|---|---|---|---|---|---|---|---|
| | Ferrous sulfate (g/liter) | pH | Temperature (° C.) | CDmax (A/dm$^2$) | CDm (A/dm$^2$) | $T_{ON}/T_C$ | $T_{ON}$ (msec) |
| Example 1 | 400 | 6.5 | 65 | 40 | 8 | 0.2 | 2 |
| Example 2 | 350 | 6.3 | 60 | 27.5 | 5.5 | 0.2 | 2 |
| Example 3 | 300 | 6 | 60 | 20 | 4 | 0.2 | 2 |
| Example 4 | 400 | 6 | 50 | 20 | 4 | 0.2 | 2 |
| Example 5 | 300 | 6 | 50 | 15 | 3 | 0.2 | 2 |
| Example 6 | 250 | 5.5 | 50 | 15 | 3 | 0.2 | 2 |
| Example 7 | 200 | 4.5 | 50 | 17.5 | 3.5 | 0.2 | 2 |
| Example 8 | 200 | 3 | 50 | 2.5 | 0.5 | 0.2 | 2 |

Table 27 shows the crystal form of the slide surface, the content A and grain size of the rounded and/or angular hexagonal pyramid-shaped Fe crystals in the slide surface, the content S of the oriented Fe crystals, and the hardness of a section of the slide surface construction for the examples 1 to 8.

Figure 45:
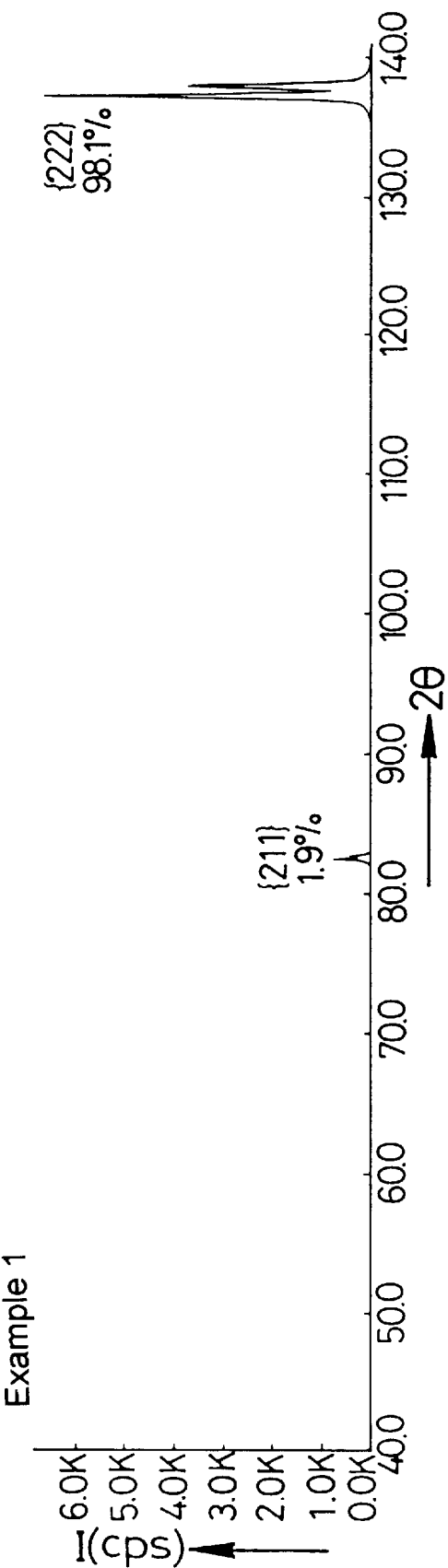
FIG. 45 is an X-ray diffraction pattern for an example 1 of the slide surface construction.

The content S of the oriented Fe crystals was determined in the same manner as in the first embodiment, based on the X-ray diffraction patterns (X-ray was applied in a direction perpendicular to the slide surface) for the examples 1 to 8. FIG. 45 is the X-ray diffraction pattern for the example 1,

TABLE 27

| Slide surface construction | Crystal form of slide surface | Rounded and angular hexagonal pyramid-shaped Fe crystals | | Content S (%) of oriented Fe crystals | | | | | Hardness HmV |
|---|---|---|---|---|---|---|---|---|---|
| | | Area rate A (%) | Grain size (μm) | {110} | {200} | {211} | {310} | {222} | |
| Example 1 | Rounded hexagonal pyramid-shaped | 100 | 2 | 0 | 0 | 1.9 | 0 | 98.1 | 435 |
| Example 2 | Rounded hexagonal pyramid-shaped and granular | 70 | 2.3 | 5.4 | 2.9 | 16.1 | 2.1 | 73.5 | 401 |
| Example 3 | Rounded hexagonal pyramid-shaped and granular | 40 | 1.7 | 21.9 | 3.6 | 31.1 | 2.6 | 40.8 | 356 |
| Example 4 | Angular hexagonal pyramid-shaped | 100 | 1.8 | 0 | 0 | 3.5 | 0 | 96.5 | 410 |
| Example 5 | Angular hexagonal pyramid-shaped and granular | 70 | 1.8 | 6 | 3.9 | 17.6 | 2.6 | 69.9 | 392 |
| Example 6 | Angular hexagonal pyramid-shaped and granular | 40 | 2 | 21.8 | 3.5 | 30.8 | 2.4 | 41.5 | 352 |
| Example 7 | Angular hexagonal pyramid-shaped and granular | 35 | 1.7 | 19.4 | 12.4 | 19.7 | 13 | 35.5 | 246 |
| Example 8 | Granular | 0 | — | 33.6 | 16.5 | 17.5 | 17.7 | 14.7 | 210 |

Figure 46:
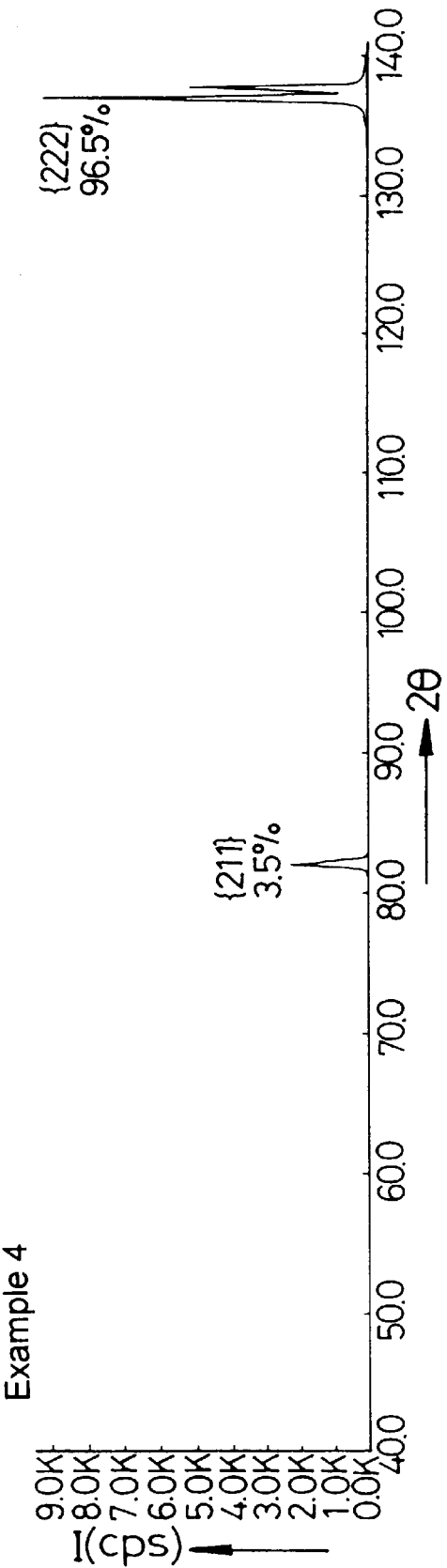
FIG. 46 is an X-ray diffraction pattern for an example 4 of the slide surface construction.
Figure 47:
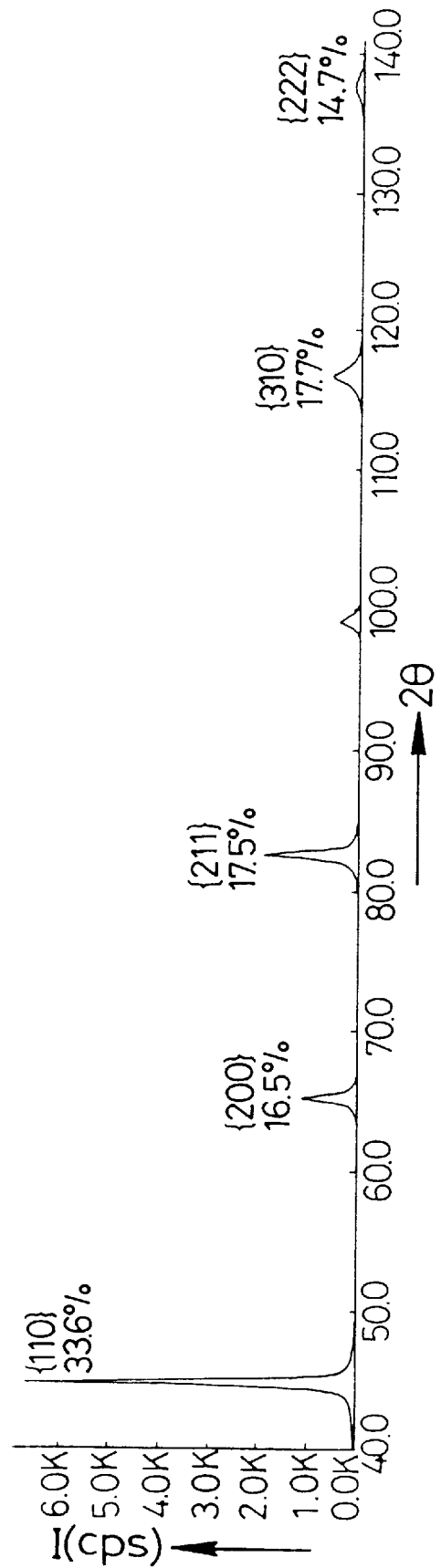
FIG. 47 is an X-ray diffraction pattern for an example 8 of the slide surface construction.

FIG. 46 is the X-ray diffraction pattern for the example 4, and FIG. 47 is the X-ray diffraction pattern for the example 8.

FIG. 48A is a photomicrograph of the example 1, FIG. 48B is an enlarged photomicrograph taken from FIG. 48A, and FIG. 48C is an enlarged photomicrograph taken from FIG. 48B. In these photomicrographs, a large number of rounded hexagonal pyramid-shaped Fe crystals are observed. In this case, the area rate A of the rounded hexagonal pyramid-shaped Fe crystals is equal to 100%, as shown in Table 27. Each of the rounded hexagonal pyramid-shaped Fe crystals is a {222} oriented Fe crystal with its (hhh) plane, i.e., {222} plane oriented toward the slide surface. The content S of the {222} oriented Fe crystals is equal to 98.1%, as shown in Table 27 and FIG. 45. The area rate A was calculated for the rounded hexagonal pyramid-shaped Fe crystals, including pyramid-shaped Fe crystals which were incompletely grown to have five ridgelines, as shown in FIG. 48B, but supposed to be completely grown to have six ridgelines.

Figure 49:
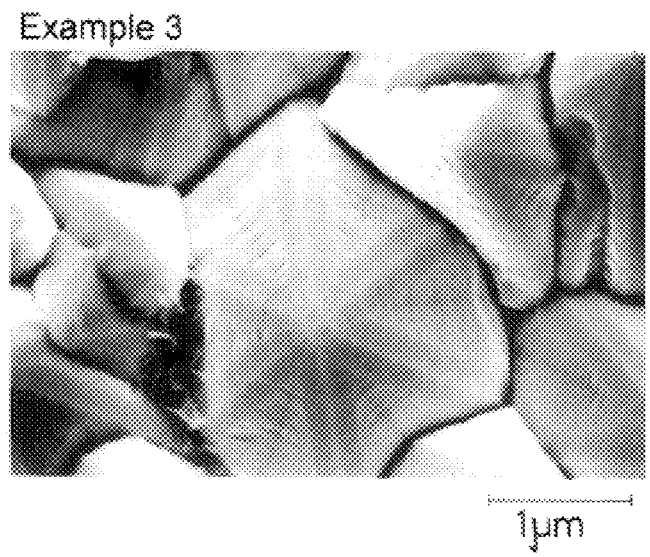
FIG. 49 is a photomicrograph showing the crystal structure of the slide surface of an example 3.

FIG. 49 is a photomicrograph showing the crystal form of the slide surface in the example 3, wherein a plurality of rounded hexagonal pyramid-shaped Fe crystals are observed. In this case, the area rate A of the rounded hexagonal pyramid-shaped Fe crystals is equal to 40%, as shown in Table 27. This area rate A was calculated in the same manner as in the example 1.

Figure 50:
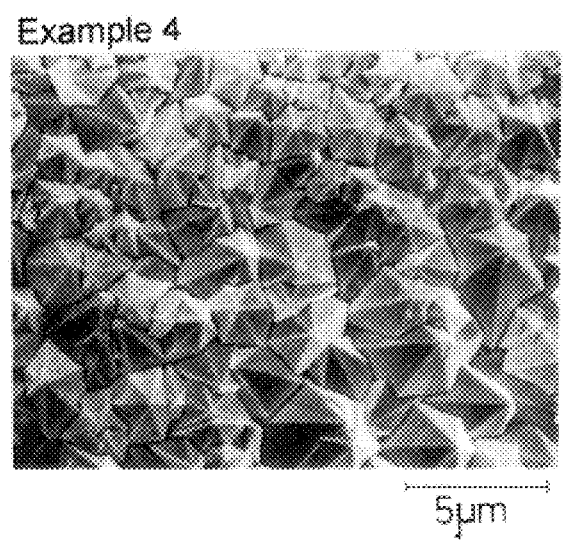
FIG. 50 is a photomicrograph showing the crystal structure of the slide surface of an example 4.

FIG. 50 is a photomicrograph showing the crystal form of the slide surface in the example 4, wherein a large number of angular hexagonal pyramid-shaped Fe crystals are observed. In this case, the area rate A of the angular hexagonal pyramid-shaped Fe crystals is equal to 100%, as shown in Table 27. Each of the angular hexagonal pyramid-shaped Fe crystals is a {222} oriented Fe crystal with its (hhh) plane, i.e., {222} plane oriented toward the slide surface. The content S of the {222} oriented Fe crystals is equal to 96.5%, as shown in FIG. 44.

If the example 1 is compared with the example 4; the example 2 is compared with the example 5, and the example 3 is compared with the example 6 in Tables 26 and 27, the pH and temperature as well as even the concentration of ferrous sulfate of the plating bath for the examples 1, 2 and 3 tend to be high, as compared with those for the examples 4, 5 and 6. It is believed that the rounded hexagonal pyramid-shaped Fe crystals are precipitated in the examples 1, 2 and 3 due to the above fact.

If the example 1 shown in FIG. 48C is compared with the example 3 shown in FIG. 49, the valley bottom in the V groove-like region in the example 1 is arcuate, but the valley bottom in the V groove-like region in the example 3 is near rectilinear. As a result, the depth of the V groove-like region in the example 1 is shallower than that in the example 3. This is attributable to the fact that the example 1 is high in maximum cathode current density CDmax and average cathode current density CDm and also high in pH, as compared with the example 3.

Figure 51:
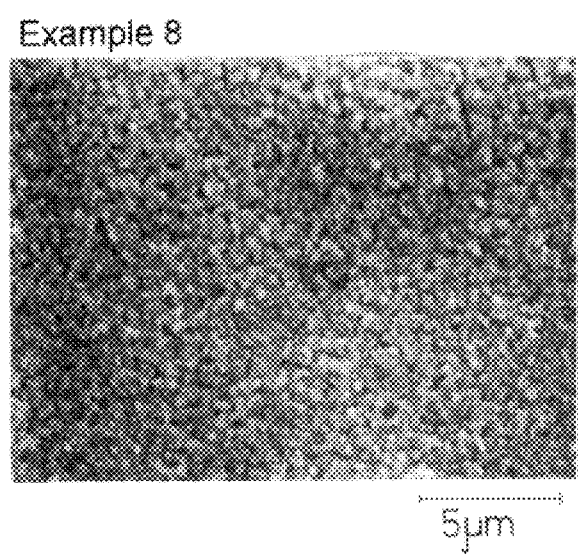
FIG. 51 is a photomicrograph showing the crystal structure of the slide surface of an example 8.

FIG. 51 is photomicrograph showing the crystal form of the slide surface in the example 8, wherein a large number of granular Fe crystals are observed.

Then, the dynamic friction coefficient $\mu$ for the examples 1 to 8 was measured using a Fabry friction tester by a method which will be described below.

First, in order to reproduce an oil having a high viscosity at a lower temperature, an oil corresponding to 10W-30 (in SAE viscosity classification) and PAMA (polyalkyl methacrylate) were mixed in a proportion of 71:29 (calculated according to JIS K2283) by volume percentage (%) to prepare an oil mixture having a dynamic viscosity of 364 cSt. The dynamic viscosity of the oil corresponding to 10W-30 at ambient temperature was 90 cSt, and that of the PAMA was 128500 cSt.

Figure 52:
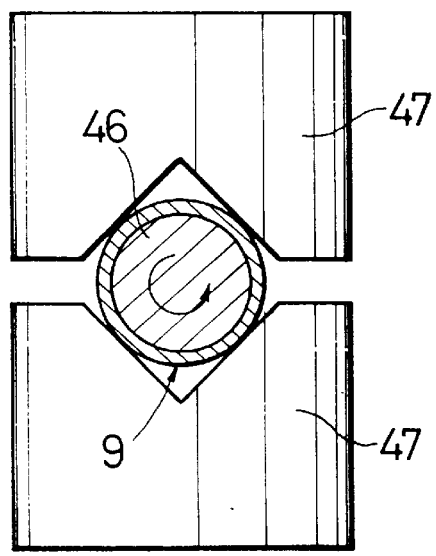
FIG. 52 is a view for illustrating how a dynamic friction coefficient $\mu$ is measured.

As shown in FIG. 52, a portion of the round bar 46 having a slide surface construction 9 formed thereon was clamped by a pair of V-blocks 50 made of a steel (JIS SCM420, a carburized material) and immersed in the oil mixture. The round bar 46 was rotated at 300 rpm in the oil mixture, and a test load of 3.6 N was applied to the round bar 46 by both the V blocks 47. After a lapse of 2 minutes from the time when the load on the round bar 46 reached the test load, the dynamic friction coefficient $\mu$ was measured. Results are given in Table 28.

TABLE 28

| Slide surface construction | Dynamic friction coefficient $\mu$ |
| --- | --- |
| Example 1 | 0.166 |
| Example 2 | 0.186 |
| Example 3 | 0.267 |
| Example 4 | 0.236 |
| Example 5 | 0.243 |
| Example 6 | 0.315 |
| Example 7 | 0.469 |
| Example 8 | 0.472 |

Figure 53:
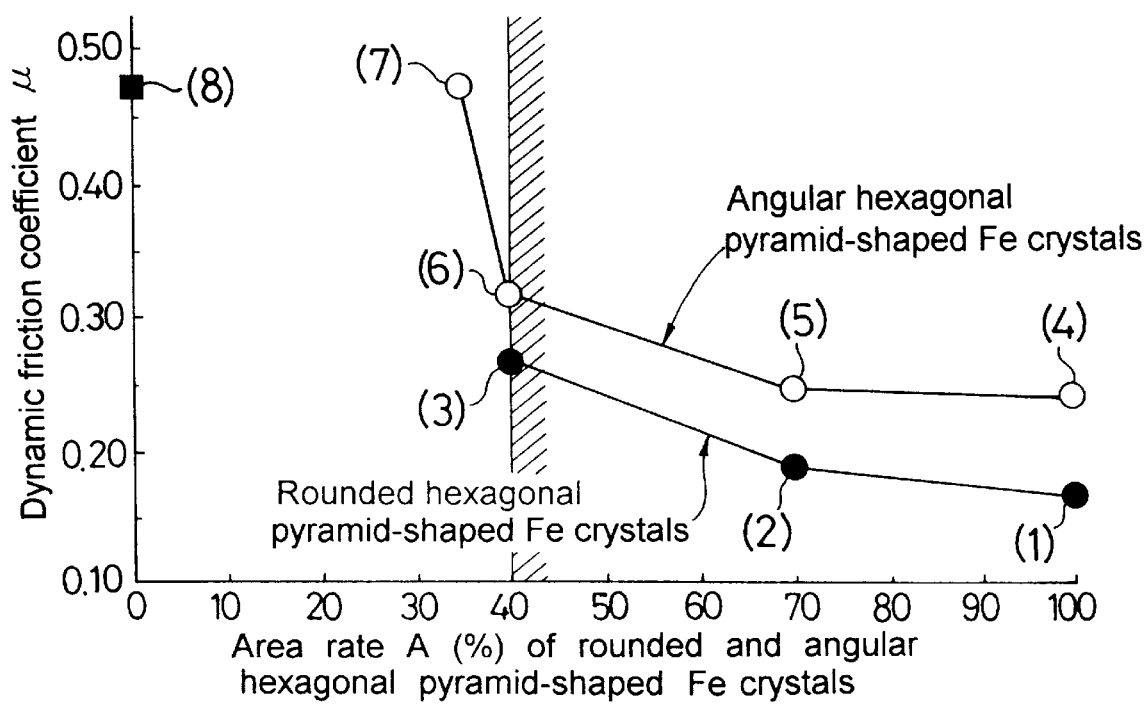
FIG. 53 is a graph illustrating the relationship between the area rate A of rounded and angular hexagonal pyramid-shaped Fe crystals and the dynamic friction coefficient $\mu$.

FIG. 53 shows the relationship between the area rate A of the rounded and angular hexagonal pyramid-shaped Fe crystals and the dynamic friction coefficient $\mu$. As is apparent from FIG. 53, if the area rate A of the rounded and angular hexagonal pyramid-shaped Fe crystals is set in a range of $A \geq 40\%$ as in the examples 1 to 3 and 4 to 6, it can be seen that the dynamic friction coefficient $\mu$ is remarkably reduced. This is because the solid contact is avoided by an oil retention enhancing effect provided by the rounded and angular hexagonal pyramid-shaped Fe crystals.

If the examples 1 to 3 and the examples 4 to 6 having the same area rate A of the rounded and angular hexagonal pyramid-shaped Fe crystals in the range of $A \geq 40\%$ are compared with each other (the example 1 with the example 4; the example 2 with the example 5; and the example 3 with the example 6), it can be also seen that the dynamic friction coefficient $\mu$ of the examples 1 to 3 having the rounded hexagonal pyramid-shaped Fe crystals in the slide surface is lower than those of the examples 4 to 6 having the angular hexagonal pyramid-shaped Fe crystals by about 15 to about 30%. This is attributable to the fact the flow of the oil mixture of the high viscosity in the examples 1 to 3 is smooth, as compared with that in the examples 4 to 6.

Therefore, by providing the examples 1 to 3, particularly the examples 1 and 2 on the inner peripheral surface of the cylinder sleeve, the friction loss can be reduced, even when the viscosity of the oil is high at a low temperature and the like.

Then, examples 1 to 8 of slide surface constructions were formed on an outer periphery of one surface of a disk made of a cast iron (JIS FC250) in the same manner as that described above and subjected to a seizure test in a chip-on-disk manner under lubrication to measure the seizure generating load, thereby providing the results given in Table 29. Conditions for the seizure test were as follows: the material for the chip was an aluminum alloy (JIS AC8A, T7-treated material); the peripheral speed of the disk was 15 m/sec; an oil corresponding to 10W-30 at room temperature was used; the amount of oil supplied was 40 ml/min; the area of the slide surface of the chip was 1 cm$^2$; the method for applying load to the chip was to first apply a load of 20 N and maintain it for 2 minutes and after that, the load was increased in sequence by 20 N while maintaining it each time the load was increased.

TABLE 29

| Slide surface construction | Seizure generating load (N) |
|---|---|
| Example 1 | 1480 |
| Example 2 | 1170 |
| Example 3 | 820 |
| Example 4 | 1450 |
| Example 5 | 1150 |
| Example 6 | 850 |
| Example 7 | 330 |
| Example 8 | 280 |

Figure 54:
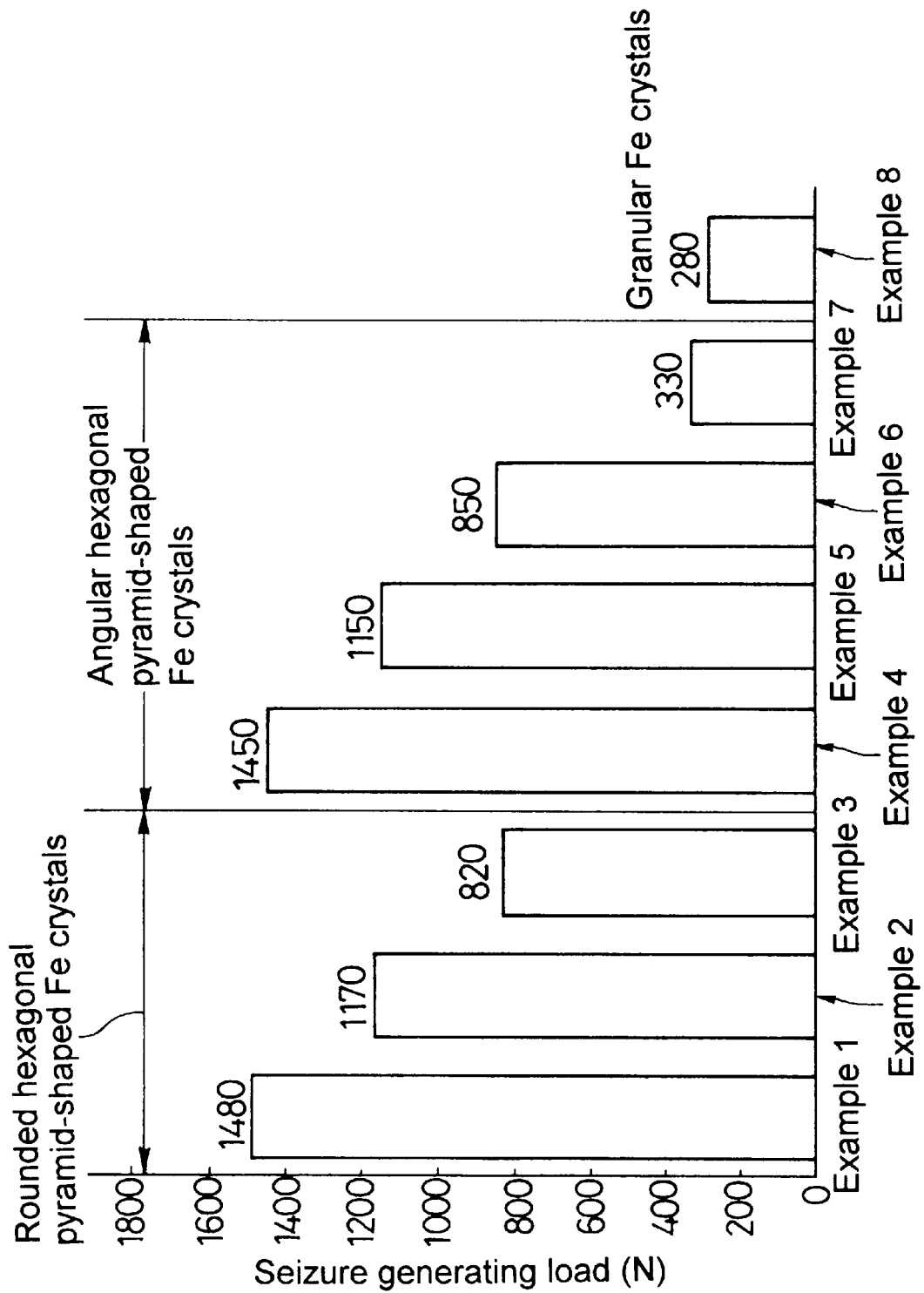
FIG. 54 is a graph illustrating the seizure generating loads for the examples 1 to 8.

FIG. 54 is a graph taken from Table 29. As is apparent from FIG. 54, the seizure generating loads for the examples 1 to 3 are substantially equal to those in the examples 4 to 6, respectively, when the area rate A is in the range of A≧40%. From this, it was made clear that even if the rounded hexagonal pyramid-shaped Fe crystals exist in the slide surface, a seizure resistance equivalent to that provided when the angular hexagonal pyramid-shaped Fe crystals exist in the slide surface, can be obtained.

The third embodiment is not limited to the cylinder sleeve and is applicable to various slide members such as a piston, a cam shaft, a piston ring, a cylinder sleeve and the like.

FOURTH EMBODIMENT

Figure 55:
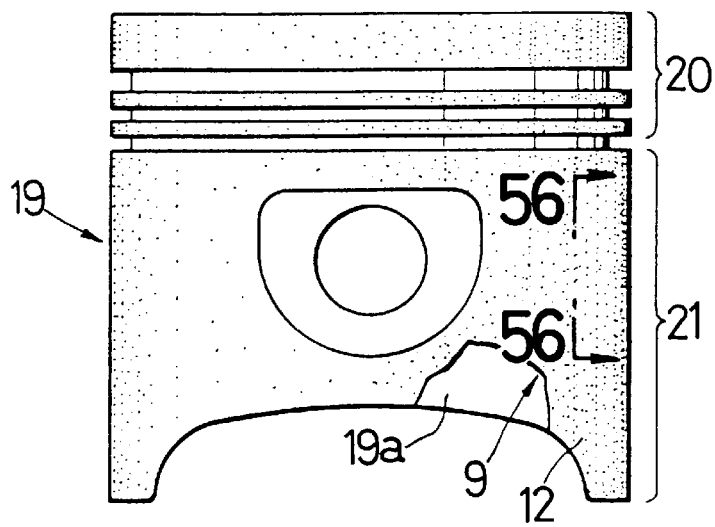
FIG. 55 is a front view of an essential portion of a piston with a portion broken away.

Referring to FIG. 55, a piston 19 for an internal combustion engine includes a piston body 19a made of an aluminum alloy. A lamellar slide surface construction 9 is formed on outer peripheral surfaces of a land portion 20 and a skirt portion 21 of the piston body 19a by plating.

Figure 56:
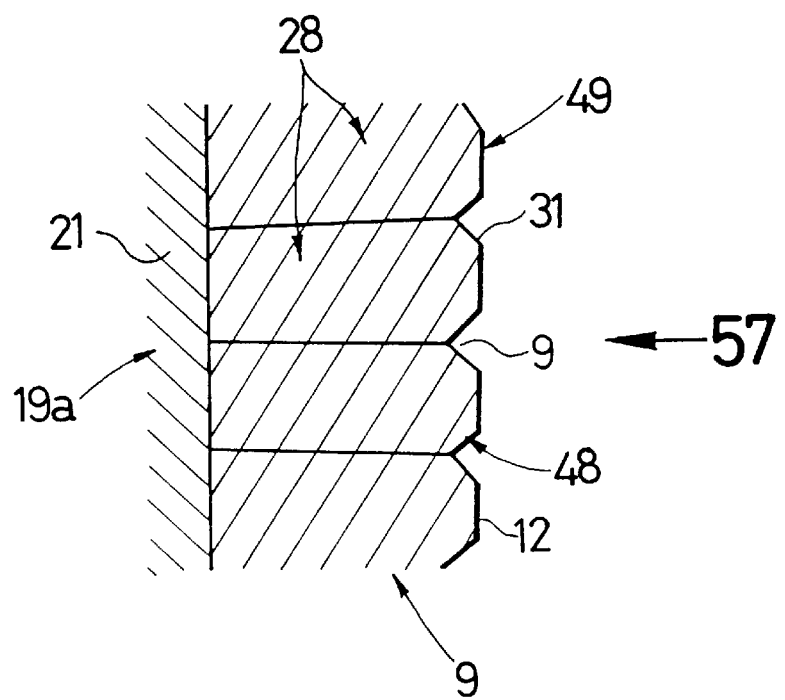
FIG. 56 is an enlarged sectional view taken along a line 56—56 in FIG. 55.
Figure 57:
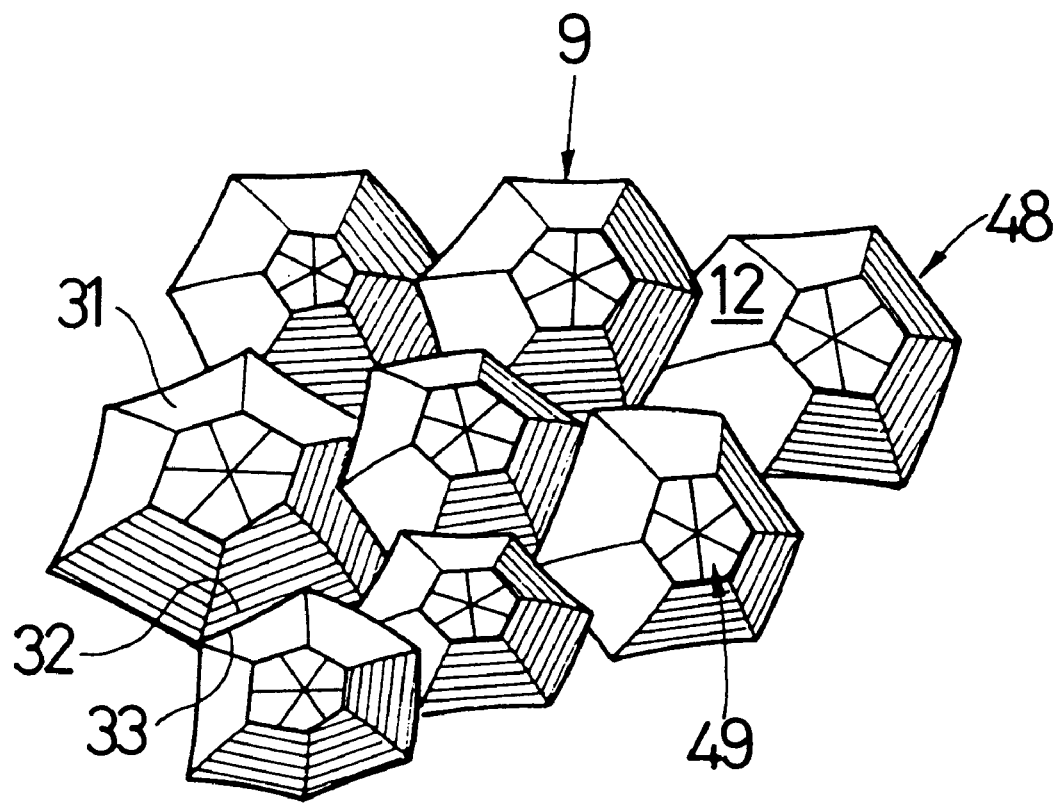
FIG. 57 is a view taken in the direction of the arrow 57 in FIG. 56.

The slide surface construction 9 is formed of an aggregate of metal crystals having a body-centered cubic structure (which will be also referred to as a bcc structure hereinafter), as shown in FIG. 5. The aggregate includes a plurality of columnar crystals 28 grown from the piston body 19a, as shown in FIG. 56. Each of the columnar crystals 28 is a (hhh) oriented metal crystal with its (hhh) plane (by Miller indices) oriented toward a slide surface. As also shown in FIG. 57, each of the tip ends of the columnar crystals is in the form of a truncated hexagonal pyramid-shaped metal crystal (truncated pyramid-shaped projection) 48 in the slide surface 12. The area rate A of the truncated hexagonal pyramid-shaped metal crystals 48 in the slide surface is set in a range of 40%≦A≦100%.

Figure 58A:
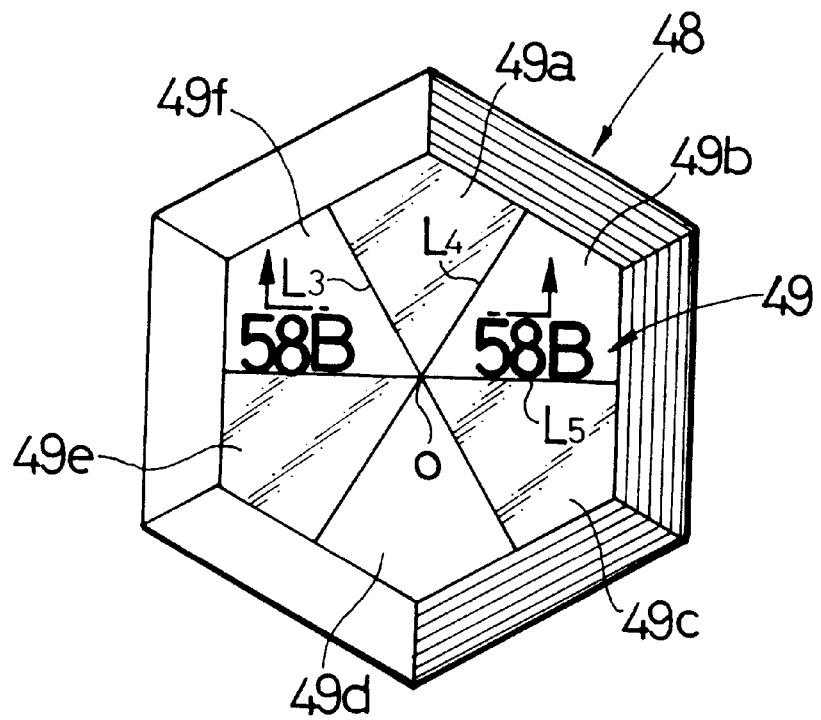
FIG. 58A is a plan view of truncated hexagonal pyramid-shaped metal crystals.
Figure 58B:
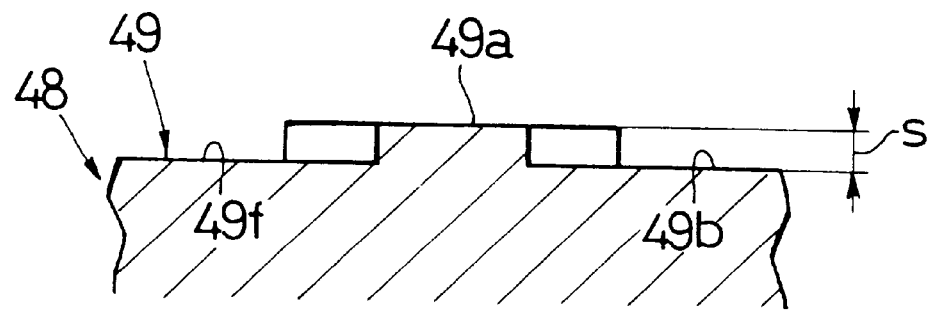
FIG. 58B is an enlarged sectional view taken along a line 58B—58B in FIG. 58A.

As clearly shown in FIG. 58A, a top face of the truncated hexagonal pyramid-shaped metal crystal 48 is formed of a plurality of flat face portions 49a, 49b, 49c, 49d, 49e and 49f. Steps "s" are provided between adjacent flat face portions 49a and 49b; 49b and 49c; 49c and 49d; 49d and 49e; 49e and 49f; and 49f and 49a, respectively, as shown in FIG. 58B.

In the illustrated embodiment, the top face 49 is divided into the six flat face portions 49a to 49f by three dividing lines L$_3$, L$_4$ and L$_5$ which interconnect three sets of two opposed sides to bisect the opposed sides and which extend through an inner center o. The flat face portions 49a to 49f comprise three protruding flat face portions 49a, 49c and 49e and three depressed flat face portions 49b, 49d and 49f, which are alternately located about the inner center o. In this case, the step "s" is of about 0.1 to about 0.5 μm.

If the area rate A of the truncated hexagonal pyramid-shaped metal crystals 48 in the slide surface 12 is set in the above-described range, the adjacent ones of the truncated hexagonal pyramid-shaped metal crystals 48 assume mutually biting states, as shown in FIG. 57. Thus, the slide surface takes on a very intricate aspect comprising a large number of extremely fine crests 31, a large number of complicated and extremely fine valleys 32 formed between the crests 31 and extending at random, and a large number of extremely fine swamps 33 formed due to the mutual biting of the crests 31. Moreover, the intricateness is doubled by the fact that the top face 49 of the truncated hexagonal pyramid-shaped metal crystal 48 is formed of the six flat face portions 49a to 49f and the steps "s" are provided between the adjacent flat face portions 49a and 49b to 49f and 49a. As a result, the flow resistance of the oil on the slide surface 12 is remarkably increased.

Thus, it is possible to remarkably enhance the oil retention of the slide surface construction and hence, even in a severe sliding environment, the solid contact can be reduced to the utmost, causing the slide surface construction 9 to exhibit an excellent seizure resistance. In addition, because the top face 49 has the flat face portions 49a to 49f, the friction coefficient μ can be reduced, causing the slide surface construction to exhibit an excellent wear resistance in the severe sliding environment.

As shown in FIG. 8, the inclination of the (hhh) plane with respect to the phantom plane 18 along the slide surface 12 appears as the inclination of the truncated hexagonal pyramid-shaped metal crystals 48 and hence, an influence is imparted to the oil retention of the slide surface construction. The inclination angle θ formed by the (hhh) plane with respect to the phantom plane 18 is set in a range of 0°≦θ≦15° as in the first embodiment. In this case, the direction of inclination of the (hhh) plane is not limited. If the inclination angle θ is larger than 15°, the oil retention and the wear resistance of the slide surface construction 9 are reduced.

Examples of the metal crystals having the bcc structure are those of simple metals such as Fe, Cr, Mo, W, Ta, Zr, Nb, V and the like, or those of alloys thereof, as in the first embodiment.

Figure 59:
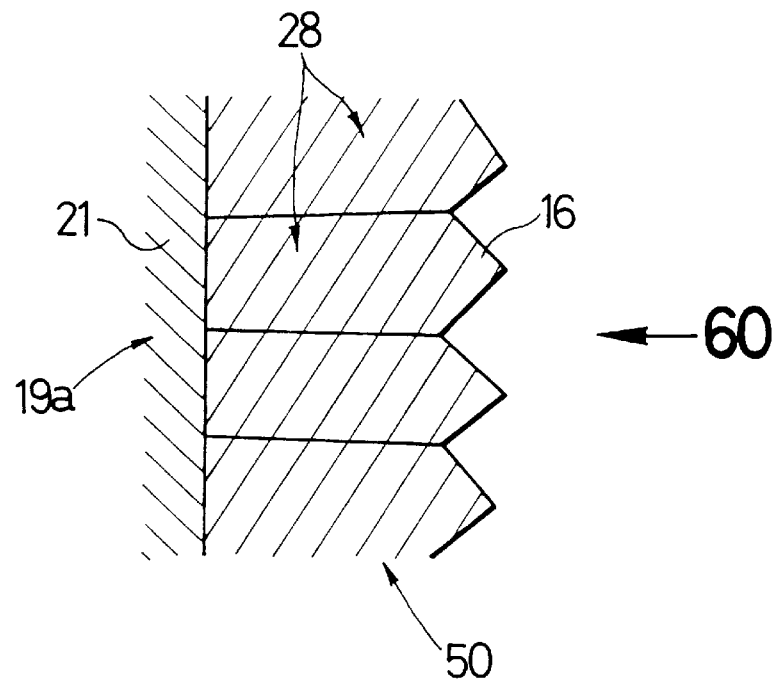
FIG. 59 is a sectional view similar to FIG. 56, but showing a deposit layer.
Figure 60:
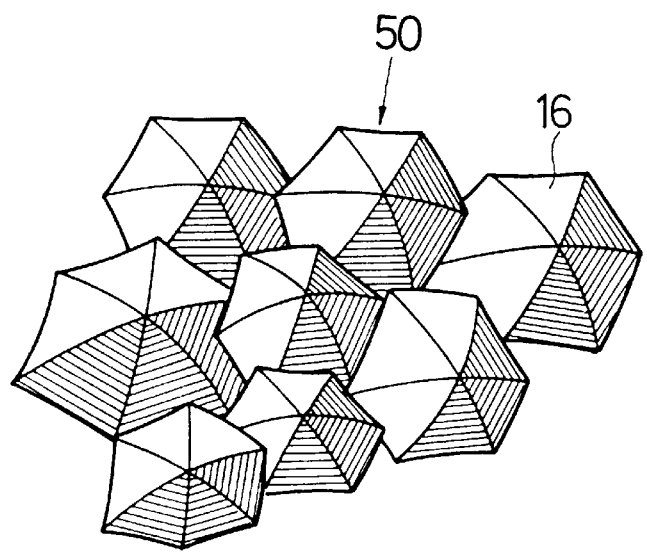
FIG. 60 is a view taken in the direction of the arrow 60 in FIG. 59.
Figure 61:
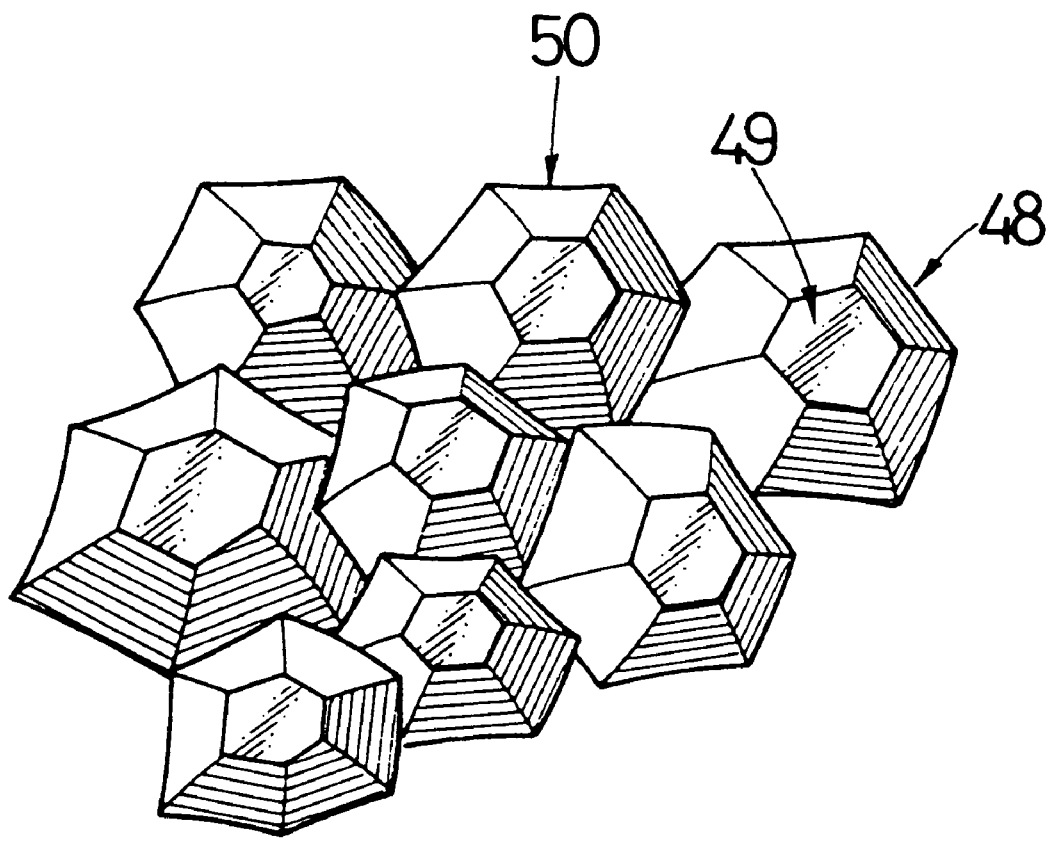
FIG. 61 is a side view similar to FIG. 57, but showing a deposit layer after being polished.

In producing the slide surface construction 9, the following steps are employed: a step for forming a deposit layer 50 including a plurality of hexagonal pyramid-shaped metal crystals 16 in a surface which becomes a slide surface 12 with an area rate A of the hexagonal pyramid-shaped metal crystals 16 in the surface being in a range of 40%≦A≦100%, on outer peripheral surfaces of the land portion 20 and the skirt portion 21 of the piston body 19a by plating, as shown in FIGS. 59 and 60; a step for subjecting the surface of the deposit layer 50 to a polishing to form the hexagonal pyramid-shaped metal crystals 16 into truncated hexagonal pyramid-shaped metal crystals 48 each having a top face, as shown in FIG. 61; and a step for subjecting the polished surface of the deposit layer 50 to an etching treatment to divide the top face of the truncated hexagonal pyramid-shaped metal crystal 48 into six flat face portions 49a to 49f and to provide steps "s" between the adjacent flat face portions 49a and 49b to 49f and 49a, as shown in FIGS. 56 to 58B.

In the plating treatment for forming the deposit layer 50, conditions for a plating bath in carrying out an electrolytic Fe plating process are as given in Table 30.

TABLE 30

| Ferrous sulfate (g/liter) | pH | Temperature (°C.) |
|---|---|---|
| | Plating bath | |
| 100–400 | 3–6.8 | 10–60 |

A pulse current process is mainly utilized as an energizing method, as shown in FIG. 9, as in the first embodiment. In the pulse current process, the ratio of the energization time $T_{ON}$ to the cycle time $T_C$, i.e., the time ratio $T_{ON}/T_C$ is set in a range of $T_{ON}/T_C \leq 0.45$. The maximum cathode current density CDmax is set in a range of CDmax$\geq$2 A/dm$^2$, and the average cathode current density CDm is set in a range of 1 A/dm$^2 \leq$ CDm $\leq$ 10 A/dm$^2$.

If such a pulse current process is utilized, the ion concentration in the vicinity of a cathode is uniformized due to the fact that the maximum electric current alternately flows and does not flow in the plating bath. Thus, the composition of the slide surface construction can be stabilized.

In the above-described electrolytic Fe plating process, the precipitation and content of the (hhh) oriented Fe crystals, i.e., Fe crystals with their tip ends being in the form of hexagonal pyramid-shaped Fe crystals 16 and the like are controlled by changing the plating bath conditions and the energizing conditions.

In addition to the electrolytic Fe plating, other examples of a plating process are a PVD process, a CVD process, a sputtering process, an ion plating and the like, which are gas-phase plating processes. Conditions for carrying out a W or Mo plating by the sputtering process were as follows: For example, the Ar gas pressure was 0.2 to 1 Pa; the average Ar gas accelerating electric power was D.C. 1 to 1.5 kW; and the substrate temperature was 150 to 300° C. Conditions for carrying out a W plating by the CVD process were as follows: For example, the starting material was WF$_6$; the flow rate of a gas was 2 to 15 cc/min; the pressure in a chamber was 50 to 300 Pa; the substrate temperature was 400 to 600° C.; and the average output of ArF excimer laser was 5 to 40 W.

A diamond wheel is used for the polishing, and the grain size of a diamond abrasive grain is of about 0.25 $\mu$m.

The etching treatment is carried out at room temperature. An alcohol solution containing 3 to 5% of nitric acid is used as an etching solution for the Fe deposit layer, and the immersion time is set in a range of 30 to 60 seconds. An aqueous solution containing 10% of sodium hydroxide and 10% of sodium ferricyanide is used as an etching solution for the Mo and W deposit layers, and the immersion time is set in a range of 15 to 60 seconds.

A specified example will be described below.

A deposit layer 50 formed of an aggregate of Fe crystals and having a thickness of 15 $\mu$m was formed by subjecting outer peripheral surfaces of a land portion 20 and a skirt portion 21 of a piston body 19$a$ made of an aluminum alloy (JIS AC8B-T7) to an electrolytic Fe plating process.

Table 31 shows the conditions for the electrolytic Fe plating process for examples 1a to 6a of the deposit layers. The plating time was varied within a range of 10 to 60 minutes in order to set the thickness of the examples 1a to 6a at 15$\mu$, as described above.

TABLE 31

| Deposit Layer | Plating bath | | | Pulse current process | | | |
|---|---|---|---|---|---|---|---|
| | Ferrous sulfate (g/liter) | pH | Temperature (° C.) | CDmax (A/dm$^2$) | CDm (A/dm$^2$) | $T_{ON}/T_C$ | $T_{ON}$ (msec) |
| Example 1b | 400 | 6.5 | 45 | 20 | 4 | 0.2 | 2 |
| Example 2b | 400 | 6.5 | 42 | 20 | 4 | 0.2 | 2 |
| Example 3b | 400 | 6.5 | 42 | 10 | 3 | 0.3 | 2 |
| Example 4b | 400 | 6.5 | 42 | 10 | 3 | 0.3 | 2 |
| Example 5b | 400 | 6.5 | 42 | 7 | 2 | 0.3 | 2 |
| Example 6b | 400 | 6 | 50 | 8 | 4 | 0.5 | 2 |

Table 32 shows the crystal form of the deposit layer surface, the area rate A and grain size of the hexagonal pyramid-shaped Fe crystals in the deposit layer surface, the content of the oriented Fe crystals, and the hardness of a section of the deposit layer.

TABLE 32

| Deposit layer | Crystal form of surface | Hexagonal pyramid-shaped Fe crystals | | Content S (%) of Hexagonal pyramid-shaped Fe crystals | | | | | Hardness |
|---|---|---|---|---|---|---|---|---|---|
| | | Area rate A (%) | Grain size ($\mu$m) | {110} | {200} | {211} | {310} | {222} | HmV |
| Example 1a | Hexagonal pyramid-shaped | 90 | 5–10 | 2.8 | 1.7 | 3.3 | 1.1 | 91.1 | 430 |

TABLE 32-continued

| Deposit layer | Crystal form of surface | Hexagonal pyramid-shaped Fe crystals | | Content S (%) of Hexagonal pyramid-shaped Fe crystals | | | | | Hardness HmV |
|---|---|---|---|---|---|---|---|---|---|
| | | Area rate A (%) | Grain size (μm) | {110} | {200} | {211} | {310} | {222} | |
| Example 2a | Hexagonal pyramid-shaped | 80 | 5–10 | 5.4 | 1.8 | 7.2 | 1.1 | 84.5 | 450 |
| Example 3a | Hexagonal pyramid-shaped and block-like | 60 | 5–10 | 17.4 | 2.3 | 15.5 | 2.7 | 62.1 | 400 |
| Example 4a | Hexagonal pyramid-shaped and block-like | 40 | 5–10 | 18.4 | 8.6 | 17.9 | 9.5 | 45.6 | 370 |
| Example 5a | Hexagonal pyramid-shaped and block-like | 30 | 5–10 | 20.1 | 9 | 19.9 | 12.6 | 38.4 | 320 |
| Example 6a | Granular | 0 | — | 18.6 | 20.4 | 17.2 | 21.5 | 22.3 | 250 |

The area rate A of the hexagonal pyramid-shaped Fe crystals was determined according to an equation, A=(c/b)×100(%), as in the second embodiment, wherein b represents an area of the deposit layer surface, and c represents an area occupied by all the hexagonal pyramid-shaped Fe crystals in the surface. The grain size of the hexagonal pyramid-shaped Fe crystals is an average value of distances between opposed corners on the opposite sides of an apex, i.e., of lengths of three diagonal lines.

Figure 62:
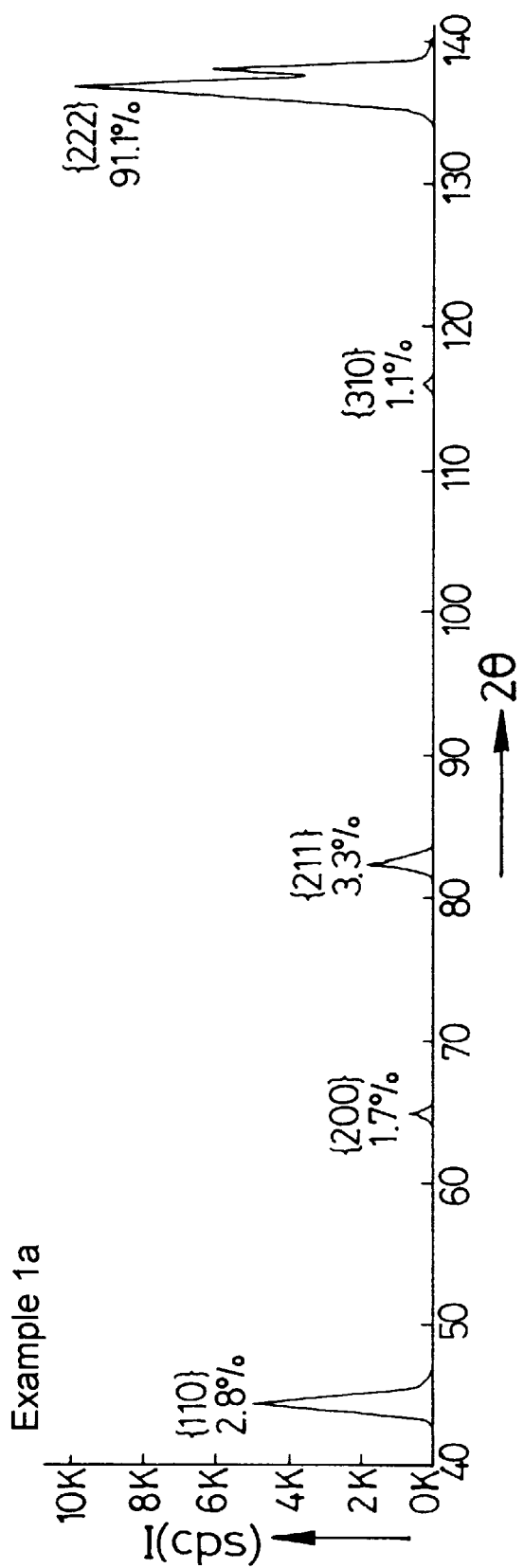
FIG. 62 is an X-ray diffraction pattern for an example 1a of the deposit layer.

The content S was determined in the same manner as in the first embodiment, based on the X-ray diffraction patterns (X-ray was applied in a direction perpendicular to the deposit layer surface) for the examples 1a to 6a. FIG. 62 is the X-ray diffraction pattern for the example 1a.

Figure 63:
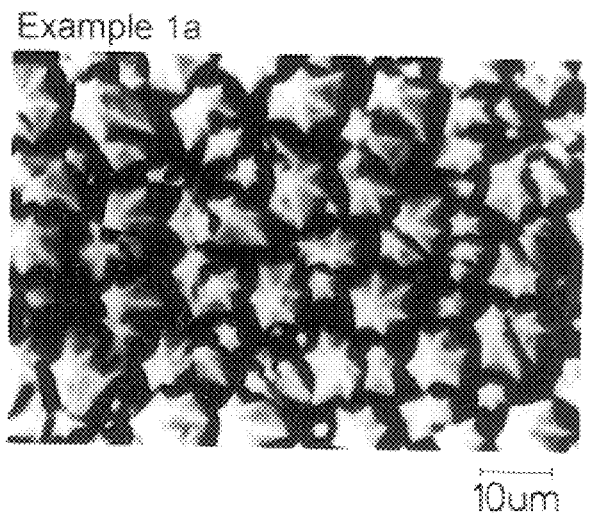
FIG. 63 is a photomicrograph showing the crystal structure of a surface of the example 1a of the deposit layer.

FIG. 63 is a photomicrograph showing the crystal form of the surface in the example 1a, wherein a large number of hexagonal pyramid-shaped Fe crystals are observed. In this case, the area rate A of the hexagonal pyramid-shaped Fe crystals is equal to 90%, as shown in Table 32. Each of the hexagonal pyramid-shaped Fe crystals is a {222} oriented Fe crystal with its (hhh) plane, i.e., {222} plane oriented toward the surface. The content S of the {222} oriented Fe crystals is equal to 91.1%, as shown in Table 32 and FIG. 62.

Figure 64:
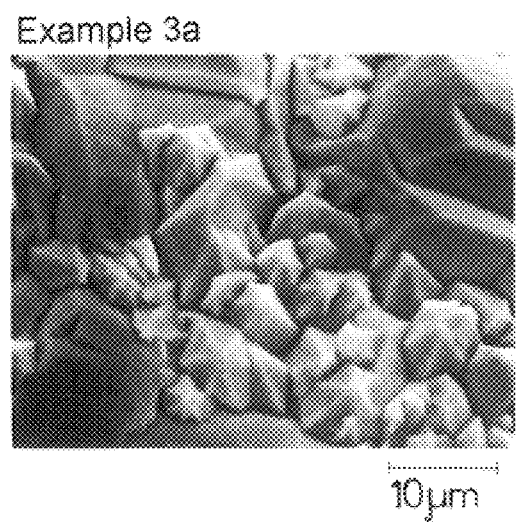
FIG. 64 is a photomicrograph showing the crystal structure of a surface of an example 3a of the deposit layer.

FIG. 64 is a photomicrograph showing the crystal form of the surface in the example 3a, wherein a large number of hexagonal pyramid-shaped Fe crystals and a large number of block-like Fe crystals are observed.

Figure 65:
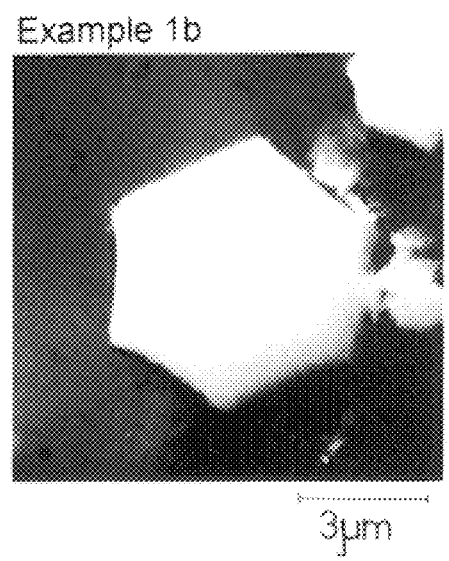
FIG. 65 is a photomicrograph showing the crystal structure of a surface of an example 1b of a deposit layer after being polished.

Then, each of the surfaces of the examples 1a to 5a of the deposit layers was subjected to a polishing by a diamond wheel to form the hexagonal pyramid-shaped Fe crystals into truncated hexagonal pyramid-shaped Fe crystals, thereby providing examples 1b to 5b corresponding to the examples 1a to 5a, respectively. FIG. 65 is a photomicrograph showing the crystal form of the surface in the example 1b, wherein a top face of the truncated hexagonal pyramid-shaped Fe crystal is observed.

Thereafter, each of the examples 1b to 5b was subjected to an etching treatment, in which it was immersed for 30 seconds in an alcohol solution containing 5% of nitric acid at ambient temperature, thereby providing examples 1 to 5 of slide surface constructions corresponding to the examples 1b to 5b, respectively.

Figure 66A:
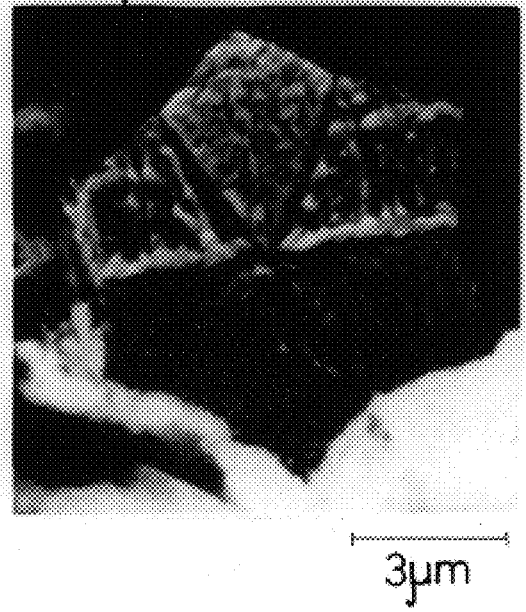
FIG. 66A is a photomicrograph showing the crystal structure of a slide surface in an example 1a of a slide surface construction.
Figure 66B:
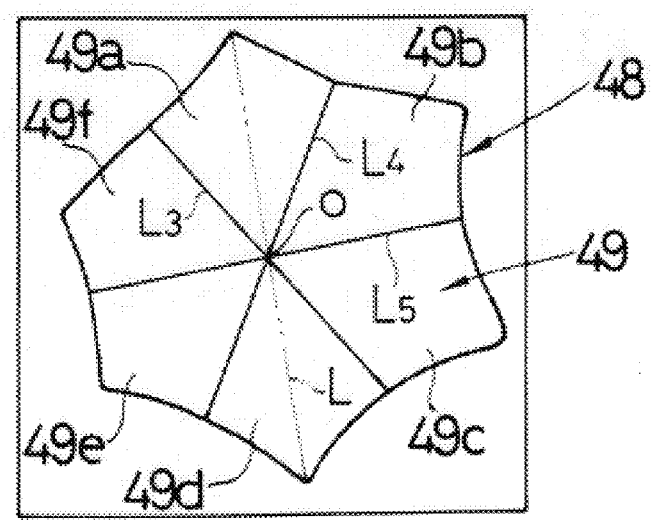
FIG. 66B is a tracing of FIG. 66A.

FIG. 66A is a photomicrograph showing the crystal form of a slide surface in the example 1, and FIG. 66B is a tracing of FIG. 66A. It is observed in FIGS. 66A and 66B that a top face of the truncated hexagonal pyramid-shaped Fe crystal 48 is comprised of six flat face portions 49a, 49b, 49c, 49d, 49e and 49f, so that the three protruding flat face portions 49a, 49c and 49e and the depressed flat face portions 49b, 49d and 49f are alternately located about an inner center o.

The reason why the protruding flat face portions and the depressed flat face portions appear on the top face is presumed as being in that the crystal defining one of the flat face portions and the crystal defining the other flat face portion form a twin crystal.

The step "s" was measured by vertically cutting the truncated hexagonal pyramid-shaped Fe crystal on a diagonal line L by use of a focus ion beam (FIM), as shown in FIG. 66B and then measuring the step "s" by use of a scanning electronic microscope (SEM). Thus, it was ascertained that the step "s" in the examples 1 to 5 was in a range of about 0.1 μm to about 0.5 μm.

Then, chips having the construction of examples 1 to 5, chips having the construction of examples 1b, 2b, 4b and 5b after being subjected to the polishing, and chips having the construction of example 6a of the deposit layer, were fabricated and subjected to a seizure test in a chip-on-disk manner under lubrication to measure the seizure generating load, thereby providing the results given in Table 33. The condition for the seizure test were as follows: the material for a disk was a cast iron (JIS FC250), the peripheral speed of the disk was 15 m/sec; the amount of oil supplied was 40 ml/min; the area of the slide surface of the chip was 10 mm$^2$; and the load on the chip was increased at a rate of 50 N/min.

TABLE 33

| | | Seizure generating load (N) |
|---|---|---|
| Slide surface construction | Example 1 | 2100 |
| | Example 2 | 2000 |
| | Example 3 | 1800 |
| | Example 4 | 1600 |
| | Example 5 | 500 |
| After polishing | Example 1b | 1550 |
| | Example 2b | 1500 |
| | Example 4b | 1200 |

TABLE 33-continued

| | | Seizure generating load (N) |
|---|---|---|
| Deposit layer | Example 5b | 500 |
| | Example 6a | 300 |

Figure 67:
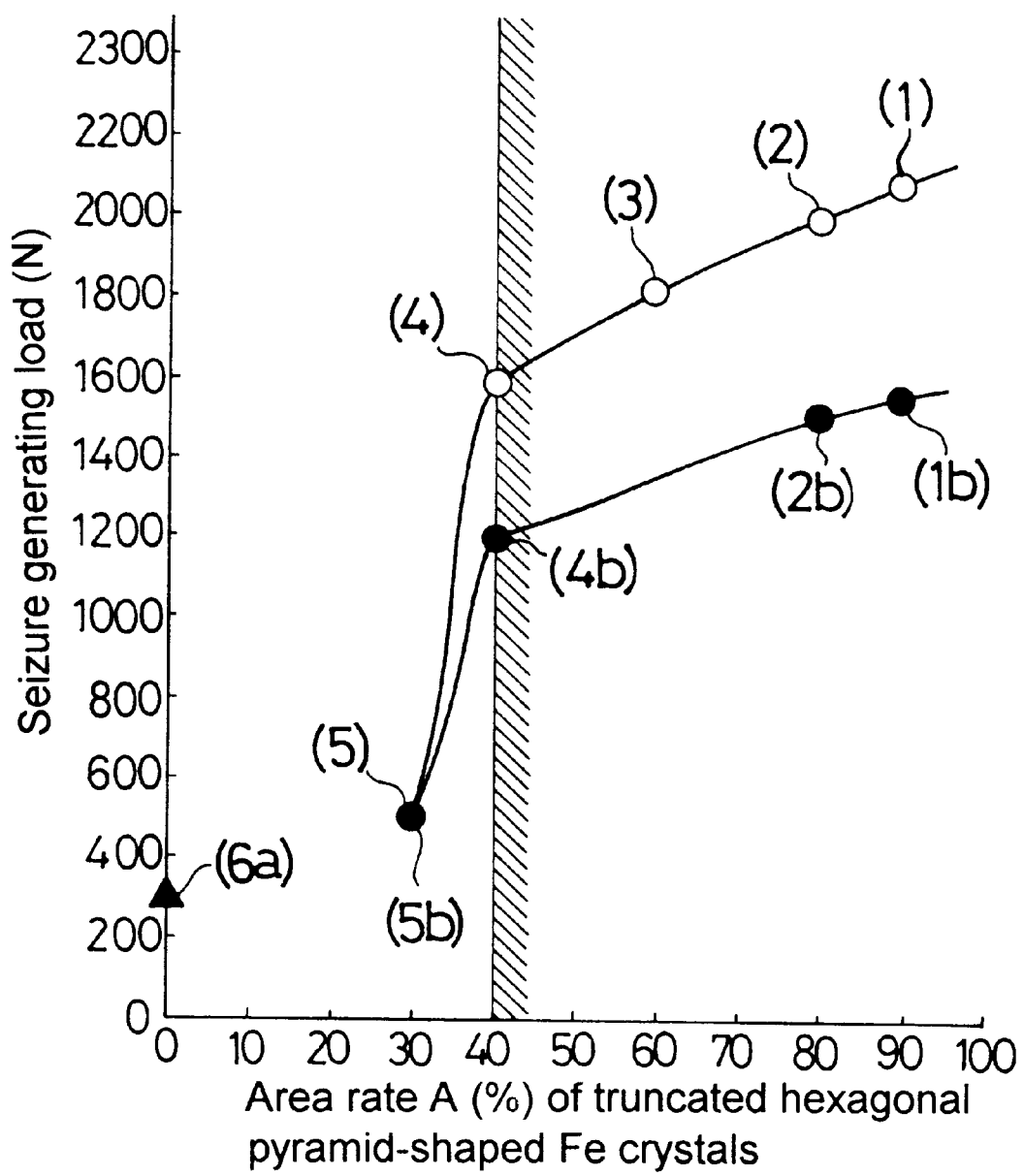
FIG. 67 is a graph illustrating the relationship between the area rate A of hexagonal pyramid-shaped Fe crystals and the seizure generating load.

FIG. 67 shows the relationship between the area rate A of the truncated hexagonal pyramid-shaped Fe crystals and the seizure generating load for the examples 1 to 5, 1b, 2b, 4b, 5b and 6a. It can be seen from FIG. 67 that if the area rate A of the truncated hexagonal pyramid-shaped Fe crystals is set in a range of A≧40% and the top face of the truncated hexagonal pyramid-shaped Fe crystal is comprised of six flat face portions having steps as described above, the slide surface construction exhibits an excellent seizure resistance, as shown by examples 1 to 4.

The examples 1b, 2b and 4b are inferior in seizure resistance to the examples 1, 2 and 4 due to the different structure of the top face. The example 5 and 5b are extremely low in seizure resistance due to the fact that the area rate of the truncated hexagonal pyramid-shaped Fe crystals is lower than 40%, and the example 6a is extremely low in seizure resistance due to the fact that the slide surface is formed of granular Fe crystals.

Then, the sliding test was carried out in the same chip-on-disk manner as that described above to measure the dynamic friction coefficient $\mu$ at the time when each of the examples 1 to 5, 1b, 2b, 4b, 5b and 6a generated a seizure, thereby providing the results given in Table 34.

TABLE 34

| | | Dynamic friction coefficient $\mu$ |
|---|---|---|
| Slide surface construction | Example 1 | 0.008 |
| | Example 2 | 0.008 |
| | Example 3 | 0.0085 |
| | Example 4 | 0.0085 |
| | Example 5 | 0.011 |
| After polishing | Example 1b | 0.009 |
| | Example 2b | 0.009 |
| | Example 4b | 0.01 |
| | Example 5b | 0.011 |
| Deposit layer | Example 6a | 0.014 |

Figure 68:
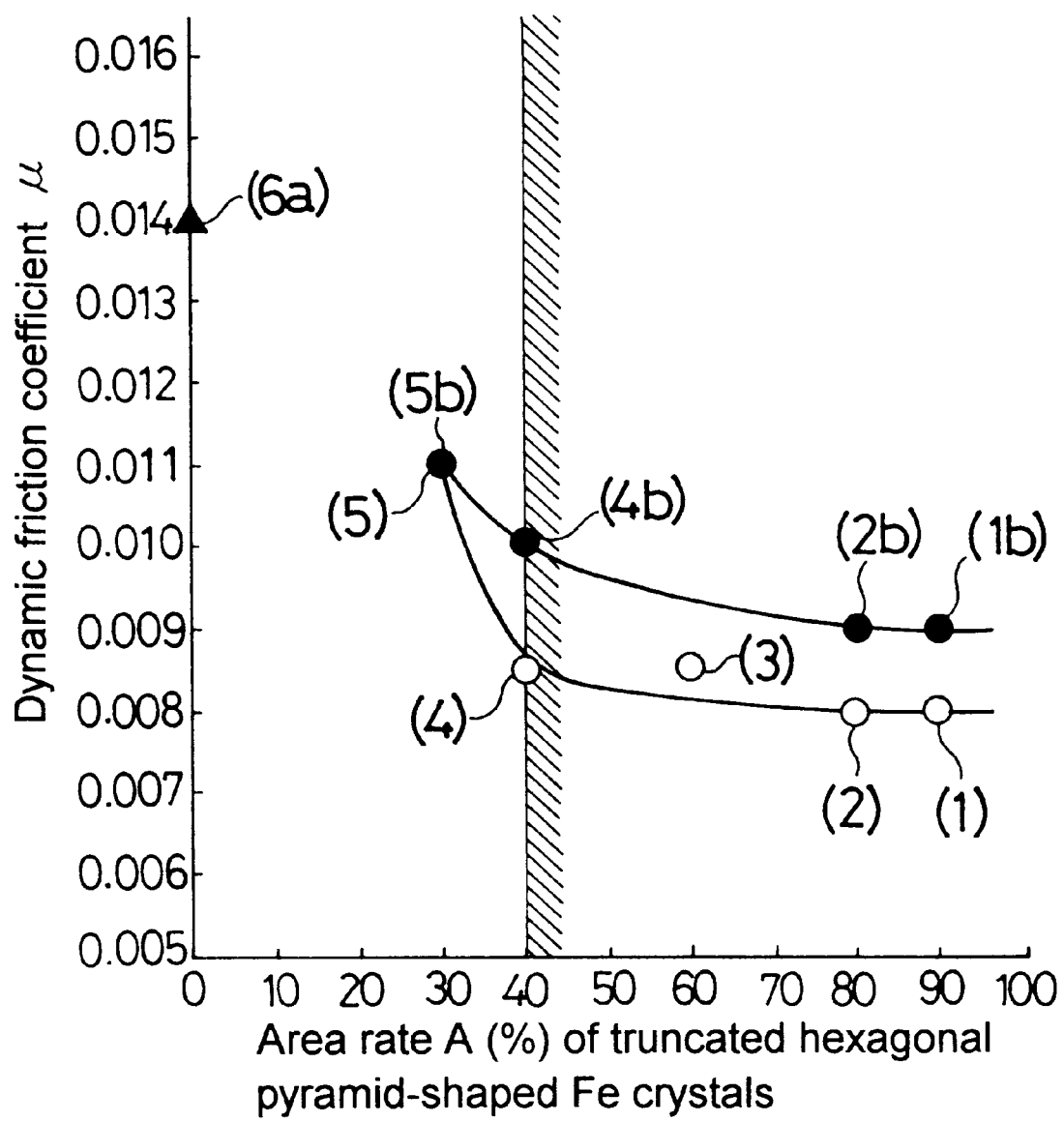
FIG. 68 is a graph illustrating the relationship between the area rate A of hexagonal pyramid-shaped Fe crystals and the dynamic friction coefficient $\mu$.

FIG. 68 shows the relationship between the area rate A of the truncated hexagonal pyramid-shaped Fe crystals and the dynamic friction coefficient $\mu$ for the examples 1 to 5, 1b, 2b, 4b, 5b and 6a. It can be seen in FIG. 68 that if the area rate A of the truncated hexagonal pyramid-shaped Fe crystals is set in a range of A≧40% and the top face of the truncated hexagonal pyramid-shaped Fe crystal is comprised of the six flat face portions having steps, the dynamic friction coefficient $\mu$ can be remarkably reduced, as in the examples 1 to 4.

The examples 1b, 2b and 4b are higher in dynamic friction coefficient $\mu$, as compared with the examples 1, 2 and 4, due to the different structure of the top face. In the examples 5 and 5b, the dynamic friction coefficient $\mu$ is increased due to the area rate of the truncated hexagonal pyramid-shaped Fe crystals being lower than 40%, and in the example 6a, the dynamic friction coefficient $\mu$ is remarkably high due to the fact that the slide surface is formed of granular Fe crystals.

The fourth embodiment is not limited to the piston for the internal combustion engine, and is applicable to various slide members such as a piston pin, a cam shaft, a piston ring, a balancer shaft and the like.

What is claimed is:

1. A slide surface construction formed of an aggregate of Fe crystals including rounded pyramid-shaped Fe crystals, wherein the area rate A of rounded pyramid-shaped Fe crystals in a slide surface is in a range of 40%≦A≦100%, each of the rounded pyramid-shaped Fe crystals having a plurality of ridgelines, each ridgeline having a convex arcuate shape, a slope-correspondence area being defined between adjacent ones of said ridgelines and comprising two band-like regions and a V groove-like region connected between said two band-like regions, wherein each said band-like region is one slope of two slopes forming each said ridgeline, and wherein said V groove-like region has an opening width that gradually reduces from a skirt portion toward an apex of said rounded pyramid-shaped metal crystal.

2. A slide surface construction according to claim 1, wherein said V groove-like region has a valley bottom which assumes a convex arcuate shape to follow said ridgeline.

3. A slide surface construction according to claim 1 or 2, wherein each of said Fe crystals has a body-centered cubic structure, and said rounded pyramid-shaped Fe crystals are at least one of (hhh) oriented Fe crystals with their (hhh) planes (by Miller indices) oriented toward the slide surface, and (2hhh) oriented Fe crystals with their (2hhh) planes (by Miller indices) oriented toward the slide surface.

4. A slide surface construction according to claim 1 or 2, wherein each of said rounded pyramid-shaped Fe crystals is a (hhh) oriented Fe crystal whose (hhh) plane (by Miller indices) is oriented toward the slide surface and which is hexagonal pyramid-shaped.

5. A slide surface construction according to claim 3, wherein each of said rounded pyramid-shaped Fe crystals is a (hhh) oriented Fe crystal whose (hhh) plane (by Miller indices) is oriented toward the slide surface and which is hexagonal pyramid-shaped.

6. A slide surface construction according to claim 1 or 2, wherein each of said rounded pyramid-shaped Fe crystals has an inclination angle Θ formed by the (hhh) plane with respect to a phantom plane of 0°≦Θ≦15°.

7. A slide surface construction according to claim 1 or 2, wherein said slide surface construction is formed by a plating treatment.

8. A slide surface construction according to claim 1 or 2, wherein said slide surface construction is formed by one plating process among an electrolytic plating, a PVD plating process, a CVD plating process, a sputtering process and an ion plating.

* * * * *

UNITED STATES PATENT AND TRADEMARK OFFICE
CERTIFICATE OF CORRECTION

PATENT NO. : 5,897,968
DATED : April 27, 1999
INVENTOR(S) : Dosaka et al.

It is certified that error appears in the above-identified patent and that said Letters Patent is hereby corrected as shown below:

Column 46, line 24, delete "metal" and insert --Fe--.

Signed and Sealed this

Third Day of August, 1999

Q. TODD DICKINSON

*Attest:*

*Attesting Officer*       Acting Commissioner of Patents and Trademarks